US012634932B2

(12) United States Patent
Choi et al.

(10) Patent No.: US 12,634,932 B2
(45) Date of Patent: May 19, 2026

(54) METHOD AND APPARATUS FOR MULTI-CELL SCHEDULING AND HARQ-ACK TRANSMISSION IN WIRELESS COMMUNICATION SYSTEM

(71) Applicant: Samsung Electronics Co., Ltd., Suwon-si (KR)

(72) Inventors: Kyungjun Choi, Suwon-si (KR); Youngbum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 18/305,767

(22) Filed: Apr. 24, 2023

(65) Prior Publication Data

US 2023/0345484 A1 Oct. 26, 2023

(30) Foreign Application Priority Data

Apr. 22, 2022 (KR) ........................ 10-2022-0049990

(51) Int. Cl.
*H04W 72/1273* (2023.01)
*H04L 1/1829* (2023.01)
*H04W 72/232* (2023.01)

(52) U.S. Cl.
CPC ....... *H04W 72/1273* (2013.01); *H04L 1/1854* (2013.01); *H04W 72/232* (2023.01)

(58) Field of Classification Search
CPC ... H04L 1/0025; H04L 1/0075; H04L 1/1614; H04L 1/1819; H04L 1/1822;
(Continued)

(56) References Cited

U.S. PATENT DOCUMENTS 12,003,335 B2 * 6/2024 Yang ...................... H04L 1/1812
12,245,249 B2 * 3/2025 Yi ......................... H04L 5/0094
(Continued)

FOREIGN PATENT DOCUMENTS

WO 2021/034507 A1 2/2021

OTHER PUBLICATIONS

U.S. Appl. No. 63/299,369 (Year: 2022).*
(Continued)

*Primary Examiner* — Dung B Huynh
(74) *Attorney, Agent, or Firm* — Jefferson IP Law, LLP

(57) ABSTRACT

The disclosure relates to a 5th generation (5G) or 6th generation (6G) communication system for supporting a higher data transmission rate. In accordance with an aspect of the disclosure, A method performed by a user equipment (UE) in a communication system is provided. The method includes receiving, from a base station, downlink control information (DCI) scheduling a set of physical downlink shared channels (PDSCHs) in multiple cells, identifying a hybrid automatic repeat request-acknowledgement (HARQ-ACK) feedback timing value based on the DCI, identifying a reference uplink slot based on a PDSCH ending last among the set of PDSCHs in multiple cells, identifying an uplink slot for HARQ-ACK information of the set of PDSCHs in multiple cells based on the HARQ-ACK feedback timing value and the reference uplink slot, and transmitting, to the base station, a physical uplink control channel (PUCCH) including the HARQ-ACK information in the uplink slot.

16 Claims, 25 Drawing Sheets

Semi-static UL symbol

| Slot n-4 | Slot n-3 | Slot n-2 | Slot n-1 | Slot n |
|---|---|---|---|---|

K1=3

PUCCH

(58) Field of Classification Search
 CPC ... H04L 1/1825; H04L 1/1854; H04L 1/1861;
 H04L 1/1896; H04L 5/0044; H04L
 5/0055; H04L 5/001; H04W 72/1273;
 H04W 72/232
 See application file for complete search history.

(56) References Cited

U.S. PATENT DOCUMENTS

| | | | | |
|---|---|---|---|---|
| 2021/0092759 A1* | 3/2021 | Xiong | | H04W 72/0446 |
| 2021/0360667 A1* | 11/2021 | Moon | | H04L 5/0035 |
| 2022/0030615 A1* | 1/2022 | Saber | | H04L 5/0092 |
| 2022/0110066 A1* | 4/2022 | Takeda | | H04L 5/0053 |
| 2022/0159692 A1* | 5/2022 | Lee | | H04W 72/23 |
| 2022/0295484 A1* | 9/2022 | Yi | | H04W 72/0446 |
| 2022/0329391 A1* | 10/2022 | Bae | | H04L 1/1864 |
| 2022/0346104 A1* | 10/2022 | Yi | | H04W 72/56 |
| 2022/0408464 A1* | 12/2022 | MolavianJazi | | H04W 72/0453 |
| 2023/0037061 A1* | 2/2023 | Liu | | H04L 5/0094 |
| 2023/0129120 A1* | 4/2023 | MolavianJazi | | H04L 1/1887 |
| | | | | 370/329 |
| 2023/0139269 A1* | 5/2023 | MolavianJazi | | H04L 5/0044 |
| | | | | 370/329 |
| 2023/0156704 A1* | 5/2023 | Wang | | H04L 1/1861 |
| | | | | 370/329 |
| 2023/0217456 A1* | 7/2023 | Yi | | H04B 7/0626 |
| | | | | 370/329 |
| 2023/0239082 A1* | 7/2023 | Choi | | H04L 1/1854 |
| 2023/0284219 A1* | 9/2023 | Saber | | H04L 1/1854 |
| 2023/0309093 A1* | 9/2023 | Wei | | H04W 72/1268 |
| 2023/0336312 A1* | 10/2023 | Park | | H04L 5/0055 |
| 2024/0032031 A1* | 1/2024 | Yi | | H04W 72/1273 |
| 2024/0064771 A1* | 2/2024 | Sun | | H04W 72/232 |
| 2024/0072975 A1* | 2/2024 | Rastegardoost | | H04W 72/20 |
| 2024/0098756 A1* | 3/2024 | Shi | | H04W 72/232 |
| 2025/0133547 A1* | 4/2025 | Liu | | H04L 1/1864 |
| 2025/0151046 A1* | 5/2025 | Ma | | H04W 72/1273 |
| 2025/0184992 A1* | 6/2025 | Harada | | H04W 72/12 |
| 2025/0185005 A1* | 6/2025 | Yi | | H04L 1/1822 |
| 2025/0287386 A1* | 9/2025 | Yang | | H04L 1/1854 |

OTHER PUBLICATIONS

Samsung, 'PDSCH/PUSCH enhancements for NR from 52.6 GHz to 71 GHz', R1-2106877, 3GPP TSG RAN WG1 #106-e, Aug. 6, 2021.
Asia Pacific Telecom et al., 'Timing relationship enhancements in NTN', R1-2102732, 3GPP TSG RAN WG1 #104bis-e, Apr. 7, 2021.
LG Electronics, 'Discussion on UE feedback enhancement for HARQ-ACK', R1-2107443, 3GPP TSG RAN WG1 #106-e, Aug. 7, 2021.
CATT, 'Discussions on enhancements on multi-beam operation', R1-2106935, 3GPP TSG RAN WG1 #106-e, Aug. 7, 2021.
International Search Report dated Jul. 10, 2023, issued in International Patent Application No. PCT/KR2023/005546.

* cited by examiner

FIG. 10

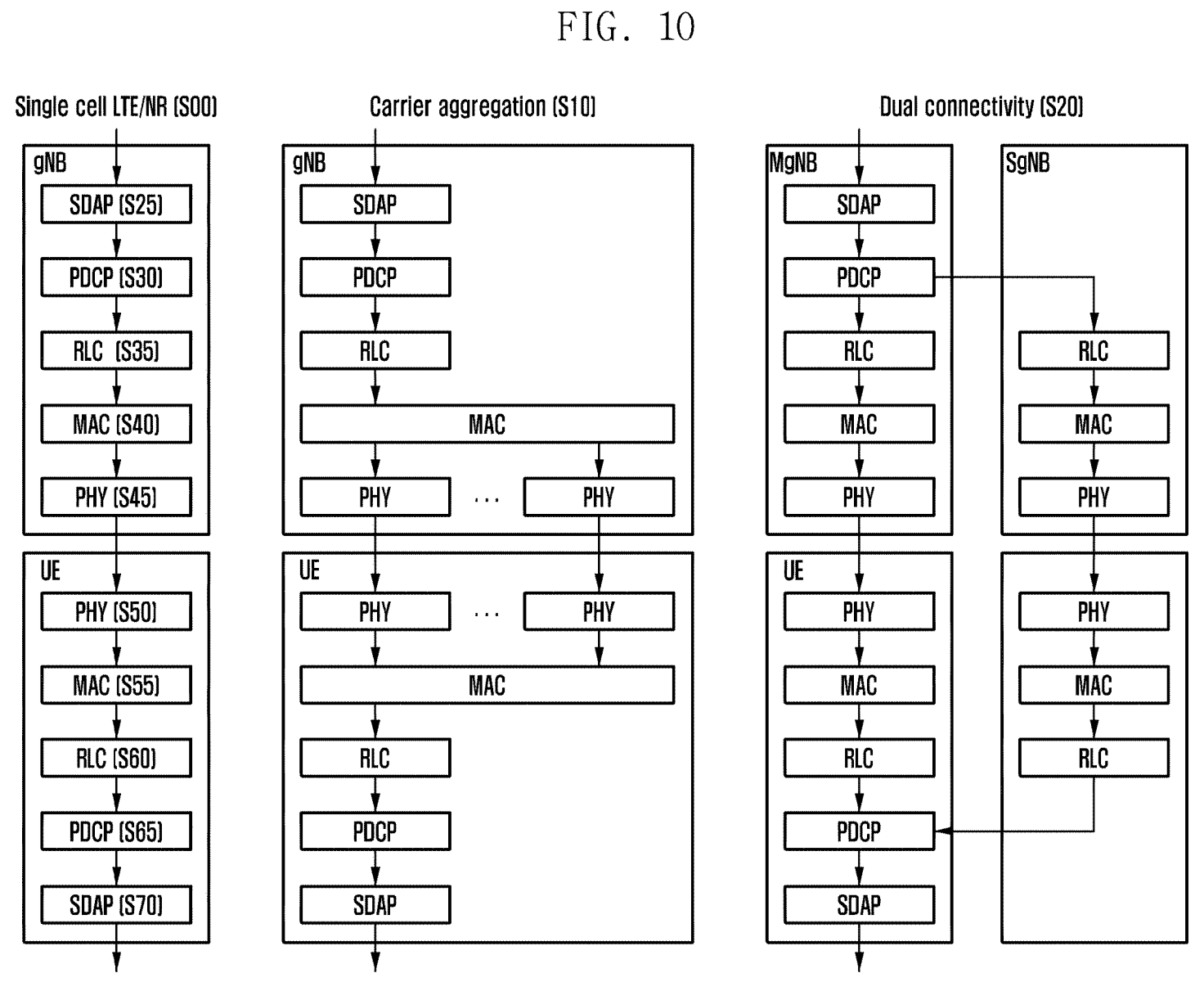

Single cell LTE/NR [S00]

gNB: SDAP [S25] → PDCP [S30] → RLC [S35] → MAC [S40] → PHY [S45]

UE: PHY [S50] → MAC [S55] → RLC [S60] → PDCP [S65] → SDAP [S70]

Carrier aggregation [S10]

gNB: SDAP → PDCP → RLC → MAC → PHY

UE: PHY → MAC → RLC → PDCP → SDAP

Dual connectivity [S20]

SgNB: RLC → MAC → PHY → PHY → MAC → RLC

MgNB: SDAP → PDCP → RLC → MAC → PHY

UE: PHY → MAC → RLC → PDCP → SDAP

METHOD AND APPARATUS FOR MULTI-CELL SCHEDULING AND HARQ-ACK TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0049990, filed on Apr. 22, 2022, in the Korean Intellectual Property Office, the disclosure of which is incorporated by reference herein in its entirety.

BACKGROUND

1. Field

The disclosure relates to operations of a terminal and a base station in a wireless communication system. More particularly, the disclosure relates to a method for transmitting a hybrid automatic repeat request-acknowledgement (HARQ-ACK) by a terminal, the HARQ-ACK indicating whether reception of a physical downlink shared channel for multiple cells using single downlink control information is successful, and an apparatus capable of performing the same.

2. Description of Related Art

5th generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement 6th generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method capable of effectively providing a service in a mobile communication system.

Additional aspects will be set forth in part in the description which follows and, in part, will be apparent from the description, or may be learned by practice of the presented embodiments.

In accordance with an aspect of the disclosure, a method performed by a user equipment (UE) in a communication system is provided. The method includes receiving, from a base station, downlink control information (DCI) scheduling a set of physical downlink shared channels (PDSCHs) in multiple cells, identifying a hybrid automatic repeat request-acknowledgement (HARQ-ACK) feedback timing value based on the DCI, identifying a reference uplink slot based on a PDSCH ending last among the set of PDSCHs in multiple cells, identifying an uplink slot for HARQ-ACK information of the set of PDSCHs in multiple cells based on the HARQ-ACK feedback timing value and the reference uplink slot, and transmitting, to the base station, a physical uplink control channel (PUCCH) including the HARQ-ACK information in the uplink slot.

In accordance with another aspect of the disclosure, a method performed by a base station in a communication system is provided. The method includes transmitting, to a user equipment (UE), downlink control information (DCI) scheduling a set of physical downlink shared channels (PDSCHs) in multiple cells, and receiving, from the UE, a physical uplink control channel (PUCCH) including hybrid automatic repeat request-acknowledgement (HARQ-ACK) information in an uplink slot, wherein the uplink slot for the HARQ-ACK information of the set of PDSCHs in multiple cells is based on a feedback timing value and a reference uplink slot, wherein the feedback timing value is included in the DCI, and wherein the reference uplink slot is defined based on a PDSCH ending last among the set of PDSCHs in multiple cells.

In accordance with another aspect of the disclosure, a user equipment (UE) in a communication system is provided. The UE includes a transceiver, and a controller configured to receive, from a base station, downlink control information (DCI) scheduling a set of physical downlink shared channels (PDSCHs) in multiple cells, identify a hybrid automatic repeat request-acknowledgement (HARQ-ACK) feedback timing value based on the DCI, identify a reference uplink slot based on a PDSCH ending last among the set of PDSCHs in multiple cells, identify an uplink slot for HARQ-ACK information of the set of PDSCHs in multiple cells based on the HARQ-ACK feedback timing value and the reference uplink slot, and transmit, to the base station, a physical uplink control channel (PUCCH) including the HARQ-ACK information in the uplink slot.

In accordance with another aspect of the disclosure, a base station in a communication system is provided. The base station includes a transceiver and a controller configured to transmit, to a user equipment (UE), downlink control information (DCI) scheduling a set of physical downlink shared channels (PDSCHs) in multiple cells, and receive, from the UE, a physical uplink control channel (PUCCH) including hybrid automatic repeat request-acknowledgement (HARQ-ACK) information in an uplink slot, wherein the uplink slot for the HARQ-ACK information of the set of PDSCHs in multiple cells is based on a feedback timing value and a reference uplink slot, wherein the feedback timing value is included in the DCI, and wherein the reference uplink slot is defined based on a PDSCH ending last among the set of PDSCHs in multiple cells.

A disclosed embodiment is to provide an apparatus and a method capable of effectively providing a service in a mobile communication system. In addition, the disclosure proposes a HARQ-ACK transmission method at the time of scheduling multi-cell transmission through single DCI in a wireless communication system. In case in which a PDSCH is scheduled for each of multiple cells, a terminal should collect HARQ-ACKs of the PDSCH and transmit the same through one PUCCH. Here, one slot may be determined based on the last scheduled PDSCH. However, in case that different cells have different subcarrier spacings and at least two scheduled PDSCHs end in the same symbol, the last scheduled PDSCH may be ambiguous. Methods to solve this problem are proposed. The terminal may multiplex and transmit HARQ-ACK information of a PDSCH of each of multiple cells through a PUCCH. To perform multiplexing of the HARQ-ACK information, a Type-1 HARQ-ACK codebook may be used. However, the conventional HARQ-ACK codebook does not support a method for generating a HARQ-ACK codebook for DCI scheduling a PDSCH for each of multiple cells. Therefore, the disclosure proposes a method for generating a HARQ-ACK codebook for DCI scheduling a PDSCH for each of multiple cells.

The disclosed embodiments may provide an apparatus and a method for effectively providing a service in a mobile communication system. The disclosure provides a method for generating an HARQ-ACK transmission slot and a Type-1 HARQ-ACK codebook by a terminal at the time of receiving multi-cell scheduling.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10 illustrates a protocol structure of a base station and a UE in a single cell, carrier aggregation, and dual connectivity situation in a wireless communication system according to an embodiment of the disclosure;

FIG. 16 illustrates another example for explaining a pseudo-code for generating a Type-1 HARQ-ACK codebook according to multi-cell scheduling according to an embodiment of the disclosure;

FIG. 17 illustrates another example for explaining a pseudo-code for generating a Type-1 HARQ-ACK codebook according to multi-cell scheduling according to an embodiment of the disclosure;

The same reference numerals are used to represent the same elements throughout the drawings.

DETAILED DESCRIPTION

Figure 1:
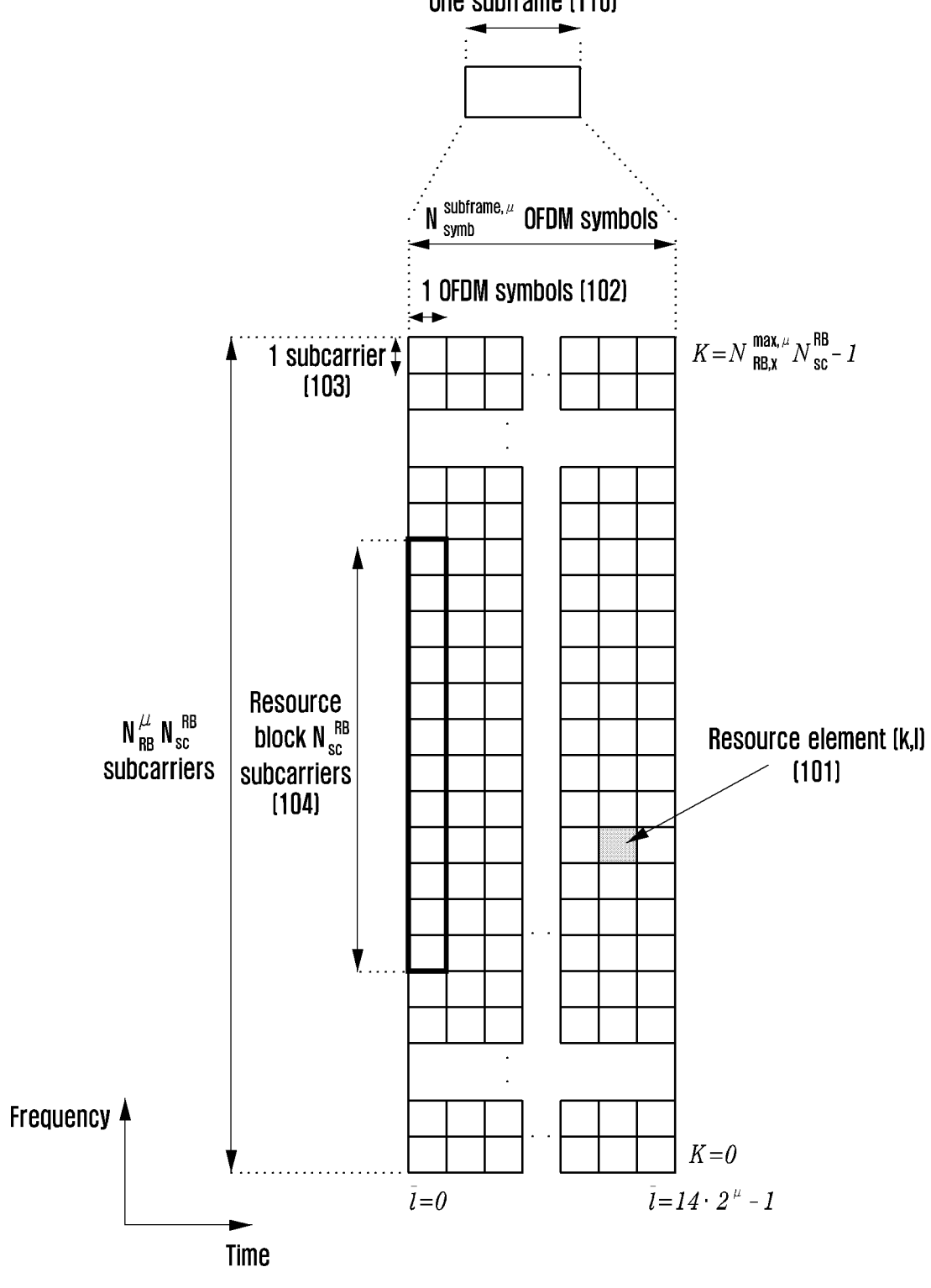
FIG. 1 illustrates a basic structure of a time-frequency domain in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Furthermore, in the following description, long term evolution (LTE) or long term evolution advanced (LTE-A) systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Furthermore, in the embodiments, the "unit" may include one or more processors.

A wireless communication system is advancing to a broadband wireless communication system for providing high-speed and high-quality packet data services using communication standards, such as high-speed packet access (HSPA) of third generation partnership project (3GPP), LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), Institute of Electrical and Electronics Engineers (IEEE) 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme may separate data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

First of all, eMBB aims at providing a data rate higher than that supported by existing LTE, LTE-A, or LTE-Pro. For example, in the 5G communication system, eMBB must provide a peak data rate of 20 gigabits per second (Gbps) in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 megahertz (MHz) in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time, such as 10 to 16 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and must also assign a large number of resources in a frequency band in order to secure reliability of a communication link.

The three 5G services, that is, eMBB, URLLC, and mMTC, may be multiplexed and transmitted in a single system. In this case, different transmission/reception techniques and transmission/reception parameters may be used between services in order to satisfy different requirements of the respective services. Of course, 5G is not limited to the above-described three services.

[NR Time-Frequency Resource]

Hereinafter, the frame structure of a 5G system will be described in more detail with reference to the drawings.

FIG. 1 illustrates the basic structure of one subframe 110 in a time-frequency domain, which is a radio resource domain in which data or a control channel is transmitted in a 5G system according to an embodiment of the disclosure.

Referring to FIG. 1, the horizontal axis represents a time domain, and the vertical axis represents a frequency domain. A basic unit of resources in the time and the frequency domain may be a resource element (RE) 101. The RE 101 may be defined by 1 orthogonal frequency division multiplexing (OFDM) symbol 102 in a time axis and 1 subcarrier 103 in a frequency axis. In the frequency domain, $N_{sc}^{RB}$ (for example, 12) consecutive REs may configure one resource block (RB) 104.

Figure 2:
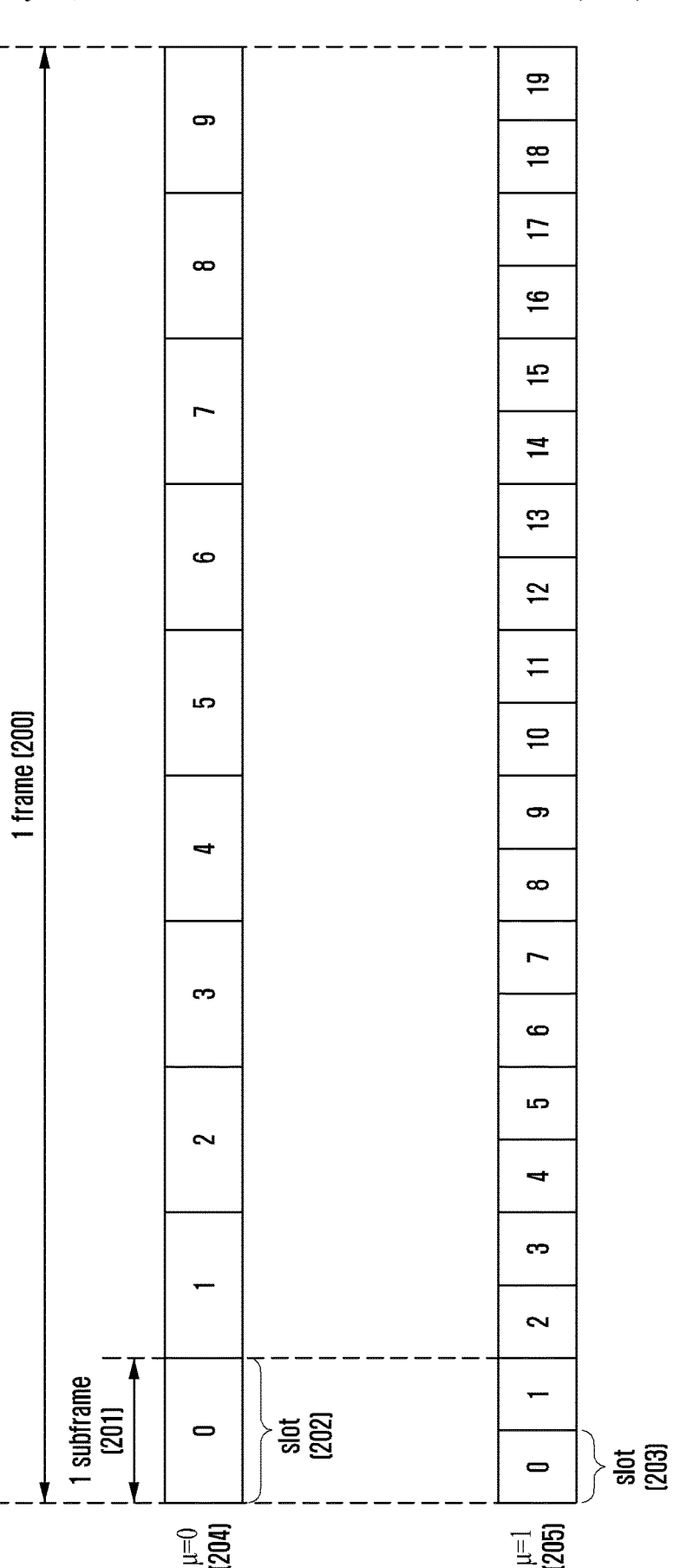
FIG. 2 illustrates the structure of a frame, a subframe, and a slot in a wireless communication system according to an embodiment of the disclosure.

FIG. 2 illustrates the structure of a frame, a subframe, and a slot in a wireless communication system according to an embodiment of the disclosure.

Referring to FIG. 2, an example of the structure of a frame 200, a subframe 201, and a slot 202 is illustrated. 1 frame 200 may be defined as 10 ms. 1 subframe 201 may be defined as 1 ms, and thus 1 frame 200 may be configured by a total of 10 subframes 201. 1 slot 202 or 203 may be defined as 14 OFDM symbols (i.e., the number of symbols for 1 slot ($N_{symb}^{slot}$=14)). 1 subframe 201 may include one or multiple slots 202 and 203, and the number of slots 202 and 203 per 1 subframe 201 may differ according to configuration value 204 or 205 for a subcarrier spacing. In the example of FIG. 2, as the subcarrier spacing configuration value, a case of μ=0, (indicated by reference numeral 204) and a case of μ=1 (indicated by reference numeral 205) are illustrated. In the case of μ=0 (indicated by reference numeral 204), 1 subframe 201 may include one slot 202, and in the case of μ=1 (indicated by reference numeral 205), 1 subframe 201 may include two slots 203. That is, the number of slots per 1 subframe ($N_{slot}^{subframe,\mu}$) may differ according to a subcarrier spacing configuration value, and frame accordingly, the number of slots per 1 frame ($N_{slot}^{frame,\mu}$) may differ. According to each subcarrier spacing configuration μ, $N_{slot}^{subframe,\mu}$, and $N_{slot}^{frame,\mu}$ may be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a bandwidth part (BWP) configuration in a 5G communication system will be described in detail with reference to the drawings.

Figure 3:
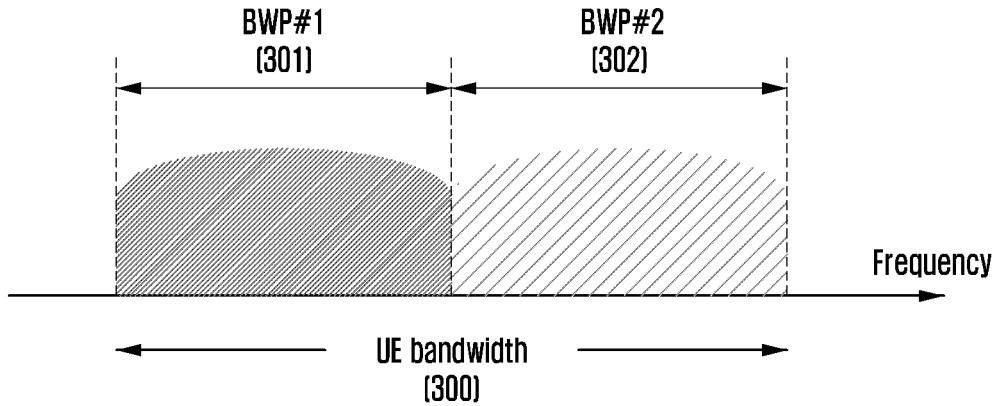
FIG. 3 illustrates an example of configuration a bandwidth part in a wireless communication system according to an embodiment of the disclosure.

FIG. 3 illustrates an example of a bandwidth part (BWP) configuration in a wireless communication system according to an embodiment of the disclosure.

Referring to FIG. 3, an example, in which a UE bandwidth 300 is configured by two BWPs, that is, BWP #1 301 and BWP #2 302, is shown. The base station may configure one or multiple BWPs for the UE, and may configure pieces of information as shown in Table 2 below for each bandwidth part.

TABLE 2

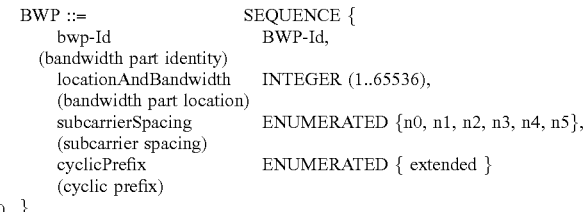

| BWP ::= | SEQUENCE { |
|---|---|
| bwp-Id | BWP-Id, |
| (bandwidth part identity) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

An embodiment of the disclosure is not limited to the above example, and in addition to the configuration information, various parameters related to a BWP may be configured in the UE and some pieces of information may be omitted. The pieces of information may be transmitted by the base station to the UE via higher layer signaling, for example, radio resource control (RRC) signaling. At least one BWP among the configured one or multiple BWPs may be activated. Whether to activate the configured BWP may be semi-statically transmitted from the base station to the UE via RRC signaling or may be dynamically transmitted through downlink control information (DCI).

According to some embodiments, a UE before radio resource control (RRC) connection may be configured with an initial bandwidth part (BWP) for initial access from a base station through a master information block (MIB). More specifically, the UE may receive configuration information about a search apace and a control resource set (CORESET) through which the PDCCH for reception of system information required for initial access (which may correspond to remaining system information (RMSI) or system information block 1 (SIB 1)) may be transmitted through the MIB in an initial access operation. The control resource set (CORESET) and search space, which are configured through the MIB, may be regarded as identity (ID) 0, respectively. The base station may notify the UE of configuration information, such as frequency allocation information, time allocation information, and a numerology for the control resource set #0 through the MIB. In addition, the base station may notify the UE of configuration information regarding the monitoring periodicity and occasion for the control resource set #0, that is, configuration information regarding the search space #0, through the MIB. The UE may regard the frequency domain configured as the control resource set #0, obtained from the MIB, as an initial BWP for initial access. Here, the identity (ID) of the initial BWP may be regarded as zero.

The configuration of the BWP supported by 5G may be used for various purposes.

According to some embodiment, a case, in which a bandwidth supported by the UE is less than a system bandwidth, may be supported through the BWP configuration. For example, the base station configures, in the UE, a frequency location (configuration information 2) of the BWP to enable the UE to transmit or receive data at a specific frequency location within the system bandwidth.

Further, according to some embodiment, the base station may configure multiple BWPs in the UE for the purpose of supporting different numerologies. For example, in order to support both data transmission/reception to/from a predetermined UE by using a subcarrier spacing of 15 kHz and a subcarrier spacing of 30 kHz, two BWPs may be configured to use a subcarrier spacing of 15 kHz and a subcarrier spacing of 30 kHz, respectively. Different BWPs may be frequency division multiplexed, and when attempting to transmit or receive data at a specific subcarrier spacing, the BWP configured with the corresponding subcarrier spacing may be activated.

In addition, according to some embodiments, the base station may configure, in the UE, the BWPs having bandwidths of different sizes for the purpose of reducing power consumption of the UE. For example, when the UE supports a very large bandwidth, for example, a bandwidth of 100 MHz, and always transmits or receives data at the corresponding bandwidth, the transmission or reception may cause very high power consumption in the UE. In particular, when the UE performs monitoring on an unnecessary downlink control channels of a large bandwidth of 100 MHz even when there is no traffic, the monitoring may be very inefficient in terms of power consumption. Therefore, in order to reduce power consumption of the UE, the base station may configure, for the UE, a BWP of a relatively small bandwidth, for example, a BWP of 20 MHz. In a situation without traffic, the UE may perform a monitoring operation on a BWP of 20 MHz. When data to be transmitted or received has occurred, the UE may transmit or receive data in a BWP of 100 MHz according to an indication of the base station.

In a method of configuring the BWP, the UEs before the RRC connection may receive configuration information about the initial bandwidth part through the master information block (MIB) in the initial connection operation. More specifically, the UE may be configured with a control resource set (CORESET) for a downlink control channel through which downlink control information (DCI) for scheduling a system information block (SIB) is transmittable from a MIB of a physical broadcast channel (PBCH). The bandwidth of the control resource set configured through the MIB may be regarded as the initial BWP. The UE may receive, through the configured initial BWP, a physical downlink shared channel (PDSCH) through which the SIB is transmitted. The initial BWP may be used for other system information (OSI), paging, and random access as well as the reception of the SIB.

[Bandwidth Part (BWP) Switch]

When one or more BWPs have been configured for a UE, a base station may indicate the UE to change (or switching, transition) the BWP by using a bandwidth part indicator field in DCI. As an example, in FIG. 3, when the currently activated BWP of the UE is BWP #1 301, the base station may indicate BWP #2 302 to the UE by using the BWP indicator in DCI, and the UE may perform a BWP switch to the BWP #2 302 indicated by the BWP indicator in the received DCI.

As described above, since the DCI-based BWP change may be indicated by the DCI scheduling the PDSCH or PUSCH, when receiving a request to switch the BWP, the UE should smoothly receive or transmit the PDSCH or PUSCH, which is scheduled by the DCI, without difficulty in the switched BWP. To this end, the standard stipulates the requirements for a delay time ($T_{BWP}$) required when switching the BWP, and may be defined, for example, as shown in Table 3 below.

TABLE 3

| μ | NR Slot length (ms) | BWP switch delay $T_{BWP}$ (slots) | |
| | | Type 1[Note 1] | Type 2[Note 1] |
| --- | --- | --- | --- |
| 0 | 1 | 1 | 3 |
| 1 | 0.5 | 2 | 5 |

TABLE 3-continued

| μ | NR Slot length (ms) | BWP switch delay $T_{BWP}$ (slots) | |
| | | Type 1[Note 1] | Type 2[Note 1] |
| --- | --- | --- | --- |
| 2 | 0.25 | 3 | 9 |
| 3 | 0.125 | 6 | 18 |

Note 1

Depends on UE capability.

Note 2:

If the BWP switch involves changing of SCS, the BWP switch delay is determined by the larger one between the SCS before BWP switch and the SCS after BWP switch.

The requirements for the BWP switch delay time support type 1 or type 2 depending on UE capability. The UE may report a BWP delay time type that is supportable to a base station.

When the UE receives the DCI including the BWP switch indicator in slot n according to the requirements for the BWP switch delay time, the UE may complete a switch to a new BWP indicated by the BWP switch indicator at a time not later than slot (n+$T_{BWP}$), and may perform transmission and reception with respect to a data channel scheduled by the corresponding DCI in the switched new BWP. When the base station intends to schedule the data channel to the new BWP, the base station may determine a time domain resource assignment for the data channel by considering the BWP switch delay time ($T_{BWP}$) of the UE. That is, when the base station schedules the data channel to the new BWP, the base station may schedule the corresponding data channel after the BWP switch delay time according to the method for determining time domain resource assignment for the data channel. Therefore, the UE may not expect the DCI indicating the BWP switch to indicate a slot offset (K0 or K2) value less than the BWP switch delay time ($T_{BWP}$).

In case that the UE receives the DCI (for example, DCI format 1_1 or 0_1) indicating the BWP switch, the UE may not perform transmission or reception during a time interval from a third symbol of the slot in which the PDCCH including the DCI is received to a start time of the slot indicated by the slot offset (K0 or K2) value indicated by the time domain resource allocation indicator field in the DCI. For example, in case that the UE has received the DCI indicating the BWP switch in slot n and the slot offset value indicated by the DCI is K, the UE may not perform transmission or reception from the third symbol of the slot n to the symbol prior to slot (n+K) (i.e., the last symbol of slot (n+K−1)).

[Ss/PBCH Block]

Next, a synchronization signal (SS)/PBCH block in 5G will be described.

The SS/PBCH block may refer to a physical layer channel block including a primary SS (PSS), a secondary SS (SSS), and a PBCH. Specifically, the SS/PBCH block is as follows:

PSS: a signal serves as a reference for downlink time/frequency synchronization and provides some information of a cell ID.

SSS: a signal serves as a reference for downlink time/frequency synchronization, and provides the remaining cell ID information that is not provided by the PSS. In addition, the SSS may serve as a reference signal for demodulation of the PBCH.

PBCH: the PBCH provides essential system information required for transmission or reception of a data channel and a control channel of a UE. The essential system information may include search space related control information indicating radio resource mapping information of a control channel, scheduling control information for a separate data channel for transmission of system information, and the like.

SS/PBCH block: the SS/PBCH block includes a combination of a PSS, an SSS, and a PBCH. One or multiple SS/PBCH blocks may be transmitted within 5 ms, and each of the transmitted SS/PBCH blocks may be distinguished by indices.

The UE may detect the PSS and the SSS in the initial access operation, and may decode the PBCH. The UE may obtain the MIB from the PBCH, and may be configured with the control resource set (CORESET) #0 (which may correspond to the control resource set having the CORESET index of 0) therefrom. The UE may monitor the control resource set #0 under the assumption that a demodulation reference signal (DMRS) transmitted in the selected SS/PBCH block and the control resource set #0 is quasi-co-located (QCLed). The UE may receive system information by using downlink control information transmitted from the control resource set #0. The UE may obtain, from the mitted through the PDCCH, the UE may check a CRC by using an assigned RNTI. When a CRC check result is correct, the UE may know that the corresponding message has been transmitted to the UE.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling UE-specific PDSCH or PUSCH may be scrambled by a cell RNTI (C-RNTI).

DCI format 0_0 may be used as a fallback DCI for scheduling a PUSCH. Here, a CRC may be scrambled by a C-RNTI. The DCI format 0_0 in which the CRC is scrambled by the C-RNTI may include, for example, pieces of information such as Table 4 below.

TABLE 4

- Identifier for DCI formats - [1] bit
- Frequency domain resource assignment -[[$\log_2(N_{RB}^{UL, BWP}(N_{RB}^{UL, BWP} + 1)/$
2)] ] bits
  - Time domain resource assignment - X bits
  - Frequency hopping flag - 1 bit.
  - Modulation and coding scheme - 5 bits
  - New data indicator - 1 bit
  - Redundancy version - 2 bits
  - HARQ process number- 4 bits
  - Transmit power control (CPC) command for scheduled PUSCH- [2] bits
  - Uplink (UL)/supplementary UL (SUL) indicator- 0 or 1 bit received system information, configuration information related to a random access channel (RACH) required for initial access. The UE may transmit a physical RACH (PRACH) to the base station by considering the selected SS/PBCH index, and the base station having received the PRACH may obtain information about an SS/PBCH block index selected by the UE. The base station may know which block is selected among the SS/PBCH blocks by the UE, and may know that the control resource set #0 associated therewith is monitored.

[PDCCH: DCI Related]

Next, downlink control information (DCI) in a 5G system will be described in detail.

In the 5G system, scheduling information about uplink data (or physical uplink shared channel (PUSCH) or downlink data (or physical downlink shared channel (PDSCH)) is transmitted from a base station to a UE through the DCI. The UE may monitor a fallback DCI format and a non-fallback DCI format with regard to the PUSCH or the PDSCH. The fallback DCI format may include a fixed field predefined between the base station and the UE, and the non-fallback DCI format may include a configurable field.

The DCI may be transmitted through a PDCCH which is a physical downlink control channel after channel coding and modulation is performed thereon. A cyclic redundancy check (CRC) may be attached to a DCI message payload, and the CRC may be scrambled by a radio network temporary identifier (RNTI) corresponding to the identification information of the UE. Different RNTIs may be used according to the purpose of the DCI message, for example, a UE-specific data transmission, a power control command, or a random access response. That is, the RNTI is not explicitly transmitted, but is included in a CRC calculation process and then transmitted. When receiving the DCI message trans- DCI format 0_1 may be used as a non-fallback DCI for scheduling a PUSCH. Here, a CRC may be scrambled by a C-RNTI. The DCI format 0_1 in which the CRC is scrambled by the C-RNTI may include, for example, pieces of information of Table 5 below.

TABLE 5

Carrier indicator - 0 or 3 bits

UL/SUL indicator - 0 or 1 bit

Identifier for DCI formats - [1] bits

Bandwidth part indicator - 0, 1 or 2 bits

Frequency domain resource assignment

For resource allocation type 0, $\lceil N_{RB}^{UL,BWP} / P \rceil$ bits

For resource allocation type 1, $\lceil \log_2(N_{RB}^{UL,BWP} (N_{RB}^{UL,BWP} + 1)/2) \rceil$
bits Time domain resource assignment - 1, 2, 3, or 4 bits Virtual resource block (VRB)-to-physical resource block (PRB)
mapping - 0 or 1 bit, only for resource allocation type 1.

0 bit if only resource allocation type 0 is configured;

1 bit otherwise.

Frequency hopping flag - 0 or 1 bit, only for resource allocation type 1.

0 bit if only resource allocation type 0 is configured;

1 bit otherwise.

Modulation and coding scheme - 5 bits

New data indicator - 1 bit

Redundancy version - 2 bits

HARQ process number - 4 bits

1st downlink assignment index - 1 or 2 bits 1 bit for semi-static HARQ-ACK codebook;

2 bits for dynamic HARQ-ACK codebook with single HARQ-ACK
    codebook.

TABLE 5-continued

2nd downlink assignment index - 0 or 2 bits
  2 bits for dynamic HARQ-ACK codebook with two HARQ-ACK
  sub-codebooks;
  0 bit otherwise.
TPC command for scheduled PUSCH - 2 bits SRS resource indicator $-\left\lceil\log_2\left(\Sigma_{k=1}^{Lmax}\begin{pmatrix}N_{SRS}\\k\end{pmatrix}\right)\right\rceil$ or $\lceil\log_2(N_{SRS})\rceil$ bits $\left\lceil\log_2\left(\Sigma_{k=1}^{Lmax}\begin{pmatrix}N_{SRS}\\k\end{pmatrix}\right)\right\rceil$ bits for non−codebook based PUSCH transmission;
  $\lceil\log_2(N_{SRS})\rceil$ bits for codebook based PUSCH transmission.
Precoding information and number of layers - up to 6 bits
Antenna ports - up to 5 bits
SRS request - 2 bits
Channel state information (CSI) request - 0, 1, 2, 3, 4, 5, or 6 bits
Code block group (CBG) transmission information - 0, 2, 4, 6, or 8 bits
Phase tracking reference signal (PTRS)-demodulation reference signal
(DMRS) association - 0 or 2 bits.
  beta_offset indicator - 0 or 2 bits
  DMRS sequence initialization - 0 or 1 bit DCI format 1_0 may be used as a fallback DCI for scheduling a PDSCH. Here, a CRC may be scrambled by a C-RNTI. The DCI format 1_0 in which the CRC is scrambled by the C-RNTI may include, for example, the following pieces of information below.

TABLE 6

| |
|---|
| -   Identifier for DCI formats - [1] bit |
| -   Frequency domain resource assignment -$\lceil\log_2$ $(N_{RB}^{DL,BWP}(N_{RB}^{DL,BWP} + 1)/2)\rceil$ ] bits |
| -   Time domain resource assignment - X bits |
| -   VRB-to-PRB mapping - 1 bit. |
| -   Modulation and coding scheme - 5 bits |
| -   New data indicator - 1 bit |
| -   Redundancy version - 2 bits |
| -   HARQ process number - 4 bits |
| -   Downlink assignment index - 2 bits |
| -   TPC command for scheduled PUCCH - [2] bits |
| -   Physical uplink control channel (PUCCH) resource indicator- 3 bits |
| -   PDSCH-to-HARQ feedback timing indicator- [3] bits |

DCI format 1_1 may be used as a non-fallback DCI for scheduling a PDSCH. Here, a CRC may be scrambled by a C-RNTI. The DCI format 1_1 in which the CRC is scrambled by the C-RNTI may include, for example, pieces of information below.

TABLE 7

| |
|---|
| -   Carrier indicator - 0 or 3 bits |
| -   Identifier for DCI formats - [1] bits |
| -   Bandwidth part indicator - 0, 1 or 2 bits |
| -   Frequency domain resource assignment |
|     • For resource allocation type 0, $\lceil N_{RB}^{DL,BWP}/P\rceil$ bits |
|     • For resource allocation type 1, $\lceil\log_2(N_{RB}^{DL,BWP}(N_{RB}^{DL,BWP} + 1)/2)\rceil$ bits |
| -   Time domain resource assignment −1, 2, 3, or 4 bits |
| -   VRB-to-PRB mapping - 0 or 1 bit, only for resource allocation type 1. |
| -     • 0 bit if only resource allocation type 0 is configured; |
|     • 1 bit otherwise. |
| -   Physical resource block (PRB) bundling size indicator - 0 or 1 bit |
| -   Rate matching indicator - 0, 1, or 2 bits |
| -   Zero power (ZP) channel state information (CSI)-reference signal (RS) trigger - 0, 1, or 2 bits |
| For transport block 1: |
|   - Modulation and coding scheme - 5 bits |
|   - New data indicator - 1 bit |
|   - Redundancy version - 2 bits |
| For transport block 2: |
|   - Modulation and coding scheme - 5 bits |
|   - New data indicator - 1 bit |
|   - Redundancy version - 2 bits |
| -   HARQ process number - 4 bits |
| -   Downlink assignment index - 0 or 2 or 4 bits |
| -   TPC command for scheduled PUCCH - 2 bits |
| -   PUCCH resource indicator - 3 bits |
| -   PDSCH-to-HARQ_feedback timing indicator - 3 bits |
| -   Antenna ports - 4, 5 or 6 bits |
| -   Transmission configuration indication- 0 or 3 bits |
| -   SRS request - 2 bits |
| -   CBG transmission information - 0, 2, 4, 6, or 8 bits |
| -   Code block group (CBG) flushing out information- 0 or 1 bit |
| -   DMRS sequence initialization - 1 bit |

[PDCCH: CORESET, REG, CCE, Search Space]

Hereinafter, a downlink control channel in a 5G communication system will be described in more detail with reference to the drawings.

Figure 4:
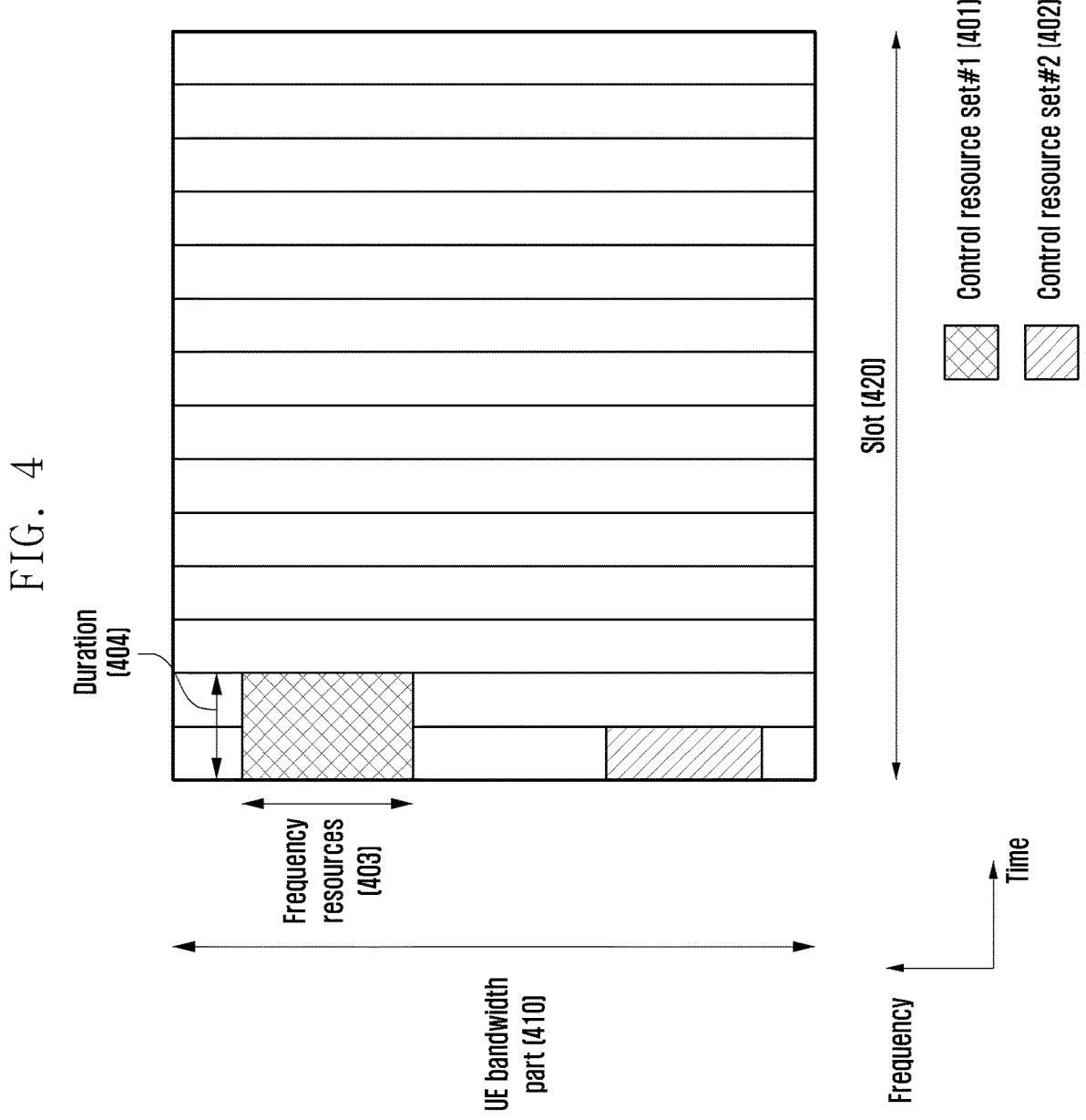
FIG. 4 illustrates an example of configuration of a control resource set of a downlink control channel in a wireless communication system according to an embodiment of the disclosure.

FIG. 4 illustrates an example of configuration of a control resource set (CORESET) of a downlink control channel in a wireless communication system according to an embodiment of the disclosure.

Referring to FIG. 4, it illustrates an example in which a UE bandwidth part (UE BWP) 410 is configured in a frequency axis and two control resource sets (control resource set #1 401 and control resource set #2 402) are configured in 1 slot 420 in a time axis. The control resource sets 401 and 402 may be configured in a specific frequency resource 403 within the entire UE BWP 410 in the frequency domain. The control resource set may be configured with one or multiple OFDM symbols in the time domain, and this may be defined as a control resource set duration 404. Referring to an example illustrated in FIG. 4, the control resource set #1 401 is configured with the control resource set duration of two symbols, and the control resource set #2 402 is configured with the control resource set duration of one symbol.

The above described control resource set in 5G may be configured for the UE by the base station via higher layer signaling (e.g., system information, master information block (MIB), radio resource control (RRC) signaling). Configuration of the control resource set for the UE may be understood as providing information such as a control resource set identity, a frequency location of the control resource set, a symbol length of the control resource set, and the like. The configuration information may include, for example, pieces of information of Table 8.

indices having a quasi-co-located (QCLed) relationship with a DMRS transmitted in the corresponding control resource set or a channel state information reference signal (CSI-RS) index.

Figure 5:
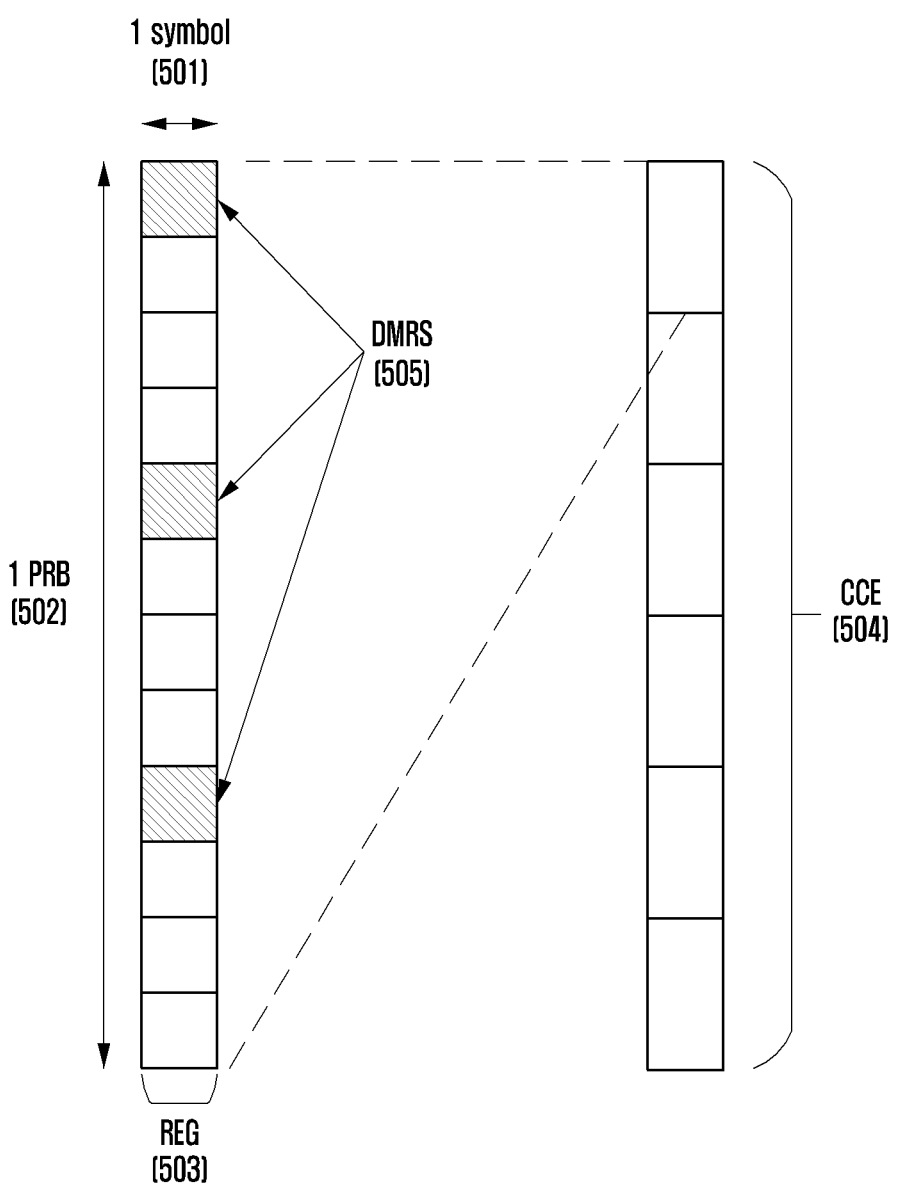
FIG. 5 illustrates a structure of a downlink control channel in a wireless communication system according to an embodiment of the disclosure.

FIG. 5 illustrates an example of a basic unit of time and frequency resources configuring a downlink control channel that can be used in 5G according to an embodiment of the disclosure.

Referring to FIG. 5, the basic unit of time and frequency resources configuring a control channel may be referred to as a resource element group (REG) 503. The REG 503 may be defined by one OFDM symbol 501 in a time domain and one physical resource block (PRB) 502, that is, 12 subcarriers, in a frequency domain. The base station may concatenate the REG 503 to configure a downlink control channel allocation unit.

Referring to FIG. 5, when a basic unit to which a downlink control channel is allocated in 5G is referred to as a control channel element (CCE) 504, one CCE 504 may include multiple REGs 503. When describing the REG 503 illustrated in FIG. 5 as an example, the REG 503 may include 12 resource elements (REs), and when one CCE 504 includes six REGs 503, one CCE 504 may include 72 REs. When the downlink control resource set is configured, the corresponding region may include multiple CCEs 504. A specific downlink control channel may be transmitted after being mapped to one or more CCEs 504 according to an aggregation level (AL) in the control resource set. The CCEs 504 in the control resource set are distinguished by numbers. Here, the numbers of the CCEs 504 may be assigned according to a logical mapping scheme.

Referring to FIG. 5, the basic unit of the downlink control channel, that is, the REG 503 may include both REs to

TABLE 8

```
ControlResourceSet ::=                    SEQUENCE {
    -- Corresponds to L1 parameter 'CORESET-ID'
    controlResourceSetId                  ControlResourceSetId,
    (Control resourece set Identity))
    frequencyDomainResources               BIT STRING (SIZE (45)),
    (frequency axis resource allocation inforamtion)
    duration                              INTEGER (1..maxCoReSetDuration),
    (time axis resource alloation information)
    cce-REG-MappingType                    CHOICE {
    (CCE-to-REG mapping type)
        interleaved                       SEQUENCE {
            reg-BundleSize                ENUMERATED {n2, n3, n6},
            (REG bundel size)
            precoderGranularity            ENUMERATED {sameAsREG-
            bundle, allContiguousRBs},
            interleaverSize               ENUMERATED {n2, n3, n6}
            (interleaver size)
            shiftIndex
            INTEGER(0..maxNrofPhysicalResourceBlocks-1)
                OPTIONAL
            (Interleaver Shift)
        },
        nonInterleaved                    NULL
    },
    tci-StatesPDCCH                        SEQUENCE(SIZE (1..maxNrofTCI-
        StatesPDCCH)) OF TCI-StateId          OPTIONAL,
    (QCL configuration information)
    tci-PresentInDCI                       ENUMERATED {enabled}
                                          OPTIONAL, -- Need S
}
```

In Table 8, tci-StatesPDCCH (simply referred to as transmission configuration indication (TCI) state) configuration information may include information about one or multiple synchronization signal (SS)/physical broadcast channel (PBCH) block (that is, synchronization signal block (SSB))

which DCI is mapped and a region to which a DMRS 505 which is a reference signal for decoding the DCI is mapped. As illustrated in FIG. 5, three DMRSs 505 may be transmitted in one REG 503. The number of CCEs required for transmission of the PDCCH may be 1, 2, 4, 8, or 16 according to the aggregation level (AL). A different number of CCEs may be used to implement link adaptation of the downlink control channel. For example, in a case of AL=L, one downlink control channel may be transmitted through L CCEs. The UE needs to detect a signal in a state in which the UE does not know information about the downlink control channel, and a search space representing a set of CCEs has been defined for blind decoding. The search space is a set of downlink control channel candidates including CCEs that the UE has to attempt to decode at a given AL. Since there are various ALs that make one bundle of 1, 2, 4, 8, or 16 CCEs, the UE may have multiple search spaces. A search space set may be defined as a set of search spaces at all configured ALs.

The search space may be classified into a common search space and a UE-specific search space. A predetermined group of UEs or all the UEs may examine the common search space of the PDCCH so as to receive cell common control information such as dynamic scheduling of system information or a paging message. For example, PDSCH scheduling allocation information for transmission of the SIB including cell operator information and the like may be received by examining the common search space of the PDCCH. In a case of the common search space, since a predetermined group of UEs or all the UEs need to receive the PDCCH, the common search space may be defined as a set of previously appointed CCEs. Scheduling allocation information about the UE-specific PDSCH or PUSCH may be received by examining the UE-specific search space of the PDCCH. The UE-specific search space may be UE-specifically defined as a function of the UE identity and various system parameters.

In 5G, the parameter for the search space of the PDCCH may be configured for the UE by the base station via higher layer signaling (e.g., SIB, MIB, RRC signaling, etc.). For example, the base station may configure, in the UE, the number of PDCCH candidates at each aggregation level L, the monitoring periodicity for the search space, the monitoring occasion of symbol units in the slots for the search space, the search space type (common search space or UE-specific search space), the combination of RNTI and DCI format to be monitored in the search space, the control resource set index to monitor the search space, and the like. For example, the configuration information for the search space of the PDCCH may include the following pieces of information below.

TABLE 9

```
SearchSpace ::=                              SEQUENCE {
  -- Identity of the search space. SearchSpaceId = 0 identifies the SearchSpace
     configured via PBCH (MIB) or ServingCellConfigCommon.
  searchSpaceId                              SearchSpaceId,
(search space identity)
  controlResourceSetId                       ControlResourceSetId,
(control resourece set identity)
  monitoringSlotPeriodicityAndOffset         CHOICE {
(monitoring slot level period)
    sl1                                      NULL,
    sl2                                      INTEGER (0..1),
    sl4                                      INTEGER (0..3),
    sl5                                      INTEGER (0..4),
    sl8                                      INTEGER (0..7),
    sl10                                     INTEGER (0..9),
    sl16                                     INTEGER (0..15),
    sl20                                     INTEGER (0..19)
  }
                                    OPTIONAL,
  duration(monitoring duration)              INTEGER (2..2559)
  monitoringSymbolsWithinSlot                BIT STRING (SIZE (14))
                                             OPTIONAL,
(monitoring symbol within slot)
  nrofCandidates                             SEQUENCE {
(number of PDCCH candidates within aggregation level)
    aggregationLevel1                        ENUMERATED {n0, n1, n2, n3, n4,
    n5, n6, n8},
    aggregationLevel2                        ENUMERATED {n0, n1, n2, n3, n4,
    n5, n6, n8},
    aggregationLevel4                        ENUMERATED {n0, n1, n2, n3, n4,
    n5, n6, n8},
    aggregationLevel8                        ENUMERATED {n0, n1, n2, n3, n4,
    n5, n6, n8},
    aggregationLevel16                       ENUMERATED {n0, n1, n2, n3, n4,
    n5, n6, n8}
  },
  search Space Type                          CHOICE {
(search space type)
    -- Configures this search space as common search space (CSS) and DCI formats
    to monitor.
    common                                   SEQUENCE {
(common search space)
  }
    ue-Specific                              SEQUENCE {
(UE-specific search space)
      -- Indicates whether the UE monitors in this USS for DCI formats 0-0 and 1-
      0 or for formats 0-1 and 1-1.
      formats                                ENUMERATED {formats0-0-And-
      1-0, formats0-1-And-1-1},
      . . .
  }
```

The base station may configure one or more search space sets for the UE according to configuration information. According to some embodiments, the base station may configure search space set 1 and search space set 2 in the UE. The base station may configure the search space set 1 in the UE so that DCI format A scrambled by an X-RNTI is monitored in the common search space. The base station may configure the search space set 2 in the UE so that DCI format B scrambled by a Y-RNTI is monitored in the UE-specific search space.

According to the configuration information, one or multiple search space sets may exist in the common search space or the UE-specific search space. For example, search space set #1 and search space set #2 may be configured as the common search space, and search space set #3 and search space set #4 may be configured as the UE-specific search space.

In the common search space, the following combinations of the DCI format and the RNTI may be monitored. However, the disclosure is not limited thereto.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of the DCI format and the RNTI may be monitored. However, the disclosure is not limited thereto.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and usages described below.

Cell RNTI (C-RNTI): For UE-specific PDSCH scheduling

Temporary Cell RNTI (TC-RNTI): For UE-specific PDSCH scheduling

Configured Scheduling RNTI (CS-RNTI): For semi-statically configured UE-specific PDSCH scheduling Random access RNTI (RA-RNTI): For PDSCH scheduling in random access operation Paging RNTI (P-RNTI): For scheduling of PDSCH through which paging is transmitted System information RNTI (SI-RNTI): For PDSCH scheduling in which system information is transmitted Interruption RNTI (INT-RNTI): For notifying of whether to puncture PDSCH Transmit power control for PUSCH RNTI (TPC-PUSCH-RNTI): For indication of power control command for PUSCH Transmit Power control for PUCCH RNTI (TPC-PUCCH-RNTI): For indication of power control command for PUCCH Transmit Power control for SRS RNTI (TPC-SRS-RNTI): For indication of power control command for SRS The above-described specified DCI formats may follow the definitions shown in Table 10 below.

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be expressed by the following Equation 1.

$$L \cdot \left\{ \left( \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right) \right\} + i \qquad \text{Equation 1}$$

L: Aggregation level $n_{CI}$: Carrier index $N_{CCE,p}$: Total number of CCEs existing in the control resource set p $n_{s,f}^{\mu}$:

Slot index $M_{s,max}^{(L)}$:

Number of PDCCH candidates of aggregation level L $m_{s,n_{CI}} = 0, \ldots,$ $M_{s,max}^{(L)} - 1$:

PDCCH candidate group index of aggregation level L i=0, . . . , L−1

$$Y_{p,n_{s,f}^{\mu}} = \left( A_p \cdot Y_{p,n_{s,f}^{\mu}-1} \right)$$

mod $D, Y_{p,-1} = n_{RNTI} \neq 0, A_p = 39827$ for $p \bmod 3 = 0, A_p = 39829$ for $p \bmod 3 = 1, A_p = 39839$ for $p \bmod 3 = 2, D = 65537$ $n_{RNTI}$: UE identifier The $Y_{p,n_{s,f}^{\mu}}$ value may correspond to zero in the common search space.

In a case of the UE-specific search space, the $Y_{p,n_{s,f}^{\mu}}$ value may correspond to a value that changes according to the UE identity (C-RNTI or ID configured by the base station for the UE) and the time index.

In 5G, multiple search space sets may be configured with different parameters (e.g., parameters in Table 9), and accordingly, the set of search space sets monitored by the UE may differ at each time point. For example, if search space set #1 is configured with the X-slot period, search space set #2 is configured with the Y-slot period, and X and Y are different, the UE may monitor both search space set #1 and space set #2 in a specific slot, and may monitor one of search space set #1 and search space set #2 in a specific slot.

[PDCCH: Bd/Cce Limit]

When multiple search space sets are configured for a UE, the following conditions may be considered in a method for determining a search space set configured to be monitored by the UE.

In case that the UE is configured with the value of monitoringCapabilityConfig-r16, which is higher layer signaling, as r15monitoringcapability, the UE defines the number of PDCCH candidates that can be monitored and the maximum value of the number of CCEs configuring the entire search space (here, the entire search space refers to the entire CCE set corresponding to the union area of multiple search space sets) for each slot. Further, if the value of monitoringCapabilityConfig-r16 is configured with r16monitoringcapability, the UE defines the number of PDCCH candidates that can be monitored and the maximum value of the number of CCEs configuring the entire search space (here, the entire search space refers to the entire CCE set corresponding to the union area of multiple search space sets) for each span.

[Condition 1: Limit the Maximum Number of PDCCH Candidates]

As described above, according to the configuration value of higher layer signaling, $M^{\mu}$, which is the maximum number of PDCCH candidate groups that the UE can monitor, may be defined by the following Table 11 if the same is defined on a slot basis in a cell configured with a subcarrier spacing of $15 \cdot 2^{\mu}$ kHz, and if the same is defined on a span basis, M may be defined by the following Table 12.

TABLE 11

| μ | Maximum number of PDCCH candidates per slot and per serving cell ($M^{\mu}$) |
|---|---|
| 0 | 44 |
| 1 | 36 |
| 2 | 22 |
| 3 | 20 |

TABLE 12

| | Maximum number $M^{\mu}$ of monitored PDCCH candidates per span for combination (X, Y) and per serving cell | | |
|---|---|---|---|
| μ | (2, 2) | (4, 3) | (7, 4) |
| 0 | 14 | 28 | 44 |
| 1 | 12 | 24 | 36 |

[Condition 2: Limit the Maximum Number of CCEs]

As described above, according to the configuration value of higher layer signaling, $C^{\mu}$, which is the maximum number of CCEs configuring the entire search space (here, the entire search space denotes the entire set of CCEs corresponding to the union region of multiple search space sets), may be defined by the following Table 13 if the same is defined on a slot basis in a cell configured with a subcarrier spacing of $15 \cdot 2^{\mu}$ kHz, and if the same is defined on a span basis, $C^{\mu}$ may be defined by the following Table 14.

TABLE 13

| μ | Maximum number of non-overlapped CCEs per slot and per serving cell ($C^{\mu}$) |
|---|---|
| 0 | 56 |
| 1 | 56 |
| 2 | 48 |
| 3 | 32 |

TABLE 14

| | Maximum number $C^{\mu}$ of non-overlapped CCEs per span for combination (X, Y) and per serving cell | | |
|---|---|---|---|
| μ | (2, 2) | (4, 3) | (7, 4) |
| 0 | 18 | 36 | 56 |
| 1 | 18 | 36 | 56 |

For the convenience of description, a situation in which both conditions 1 and 2 are satisfied at a specific time point is defined as "condition A". Therefore, not satisfying condition A may refer to not satisfying at least one of the above conditions 1 and 2.

[PDCCH: Overbooking]

According to the configuration of the search space sets of the base station, a case in which condition A is not satisfied at a specific time point may occur. In case that condition A is not satisfied at a specific time point, the UE may select and monitor only some of the search space sets configured to satisfy condition A at the corresponding time point, and the base station may transmit PDCCH to the selected search space sets.

A method of selecting some search spaces in the entire configured search space set may conform to the following method.

In case that condition A for PDCCH is not satisfied at a specific time point (slot), the UE (or base station) may select a search space set, in which a search space type is configured to be a common search space, from among search space sets existing at a corresponding time point, preferentially over a search space set in which a search space type is configured to be a UE-specific search space.

In case that all search space sets configured to be common search spaces are selected (i.e., in case that condition A is satisfied even after all search spaces configured to be common search spaces are selected), the UE (or base station) may select the search space sets configured to have UE-specific search spaces. Here, if there are multiple search space sets configured to be UE-specific search spaces, a search space set having a low search space set index may have a higher priority. In consideration of the priority, the UE-specific search space sets may be selected within a range in which condition A is satisfied.

[Rate Matching/Puncturing Related]

Hereinafter, a rate matching operation and a puncturing operation will be described in detail.

When time and frequency resource A for transmission of predetermined symbol sequence A overlaps predetermined time and frequency resource B, a rate matching or puncturing operation may be considered as the transmission/reception operation of channel A in consideration of resource C corresponding to a region in which the resource A and the resource B overlap. A specific operation may follow the details below.

Rate Matching Operation

A base station may map the channel A to only the remaining resource regions except for resource C among the entire resource A for transmission of symbol sequence A to a UE, the resource C corresponding to a region in which the resource B overlap the resource A, and transmit the same. For example, when symbol sequence A is configured by {symbol #1, symbol #2, symbol #3, symbol 4}, the resource A is configured by {resource #1, resource #2, resource #3, resource #4}, and resource B is configured by {resource #3, resource #5}, the base station may sequentially map the symbol sequence A to {resource #1, resource #2, resource #4}, which are the remaining resources except for {resource #3} corresponding to the resource C among the resource A, and transmit the same. As a result, the base station may map the symbol sequence {symbol #1, symbol #2, symbol #3} to {resource #1, resource #2, resource #4}, respectively, and transmit the same.

The UE may determine the resource A and the resource B through scheduling information for symbol sequence A, from the base station, and accordingly, the UE may determine resource C corresponding to a region where the resource A and the resource B overlap. The UE may receive the symbol sequence A under an assumption that the symbol sequence A is mapped to the remaining regions except for the resource C among the entire resource A and transmitted. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may receive the symbol sequence A under an assumption that the symbol sequence A is sequentially mapped to the remaining resources {resource #1, resource #2, resource #4} except for {resource #3} corresponding to the resource C among the resource A. As a result, the UE assumes that the symbol sequence {symbol #1, symbol #2, symbol #3} are mapped to {resource #1, resource #2, resource #4}, respectively, and transmitted, and may perform a subsequent series of reception operations.

Puncturing Operation

When there is resource C corresponding to a region, in which resource B overlaps the resource A for transmission of symbol sequence A to a UE, a base station may map the symbol sequence A to the entire resource A. However, the base station may not perform transmission in a resource region corresponding to the resource C, and may perform transmission to only the remaining resource regions except for the resource C among the entire resource A. For example, when symbol sequence A is configured by {symbol #1, symbol #2, symbol #3, symbol 4}, resource A is configured by {resource #1, resource #2, resource #3, resource #4}, and resource B is configured by {resource #3, resource #5}, the base station may map the symbol sequence A {symbol #1, symbol #2, symbol #3, symbol #4} to the resource A {resource #1, resource #2, resource #3, resource #4}, respectively. Further, the base station may transmit only the corresponding symbol sequence {symbol #1, symbol #2, symbol #4} to {resource #1, resource #2, resource #4}, which are the remaining resources except for {resource #3} corresponding to the resource C among the entire resource A, and may not transmit {symbol #3} mapped to {resource #3} corresponding to the resource C. As a result, the base station may map the symbol sequence {symbol #1, symbol #2, symbol #4} to {resource #1, resource #2, resource #4}, respectively, and transmit the same.

The UE may determine the resource A and the resource B through scheduling information for symbol sequence A, from the base station, and accordingly, the UE may determine the resource C corresponding to a region where the resource A and the resource B overlap. The UE may receive the symbol sequence A under an assumption that the symbol sequence A is mapped to the entire resource A but transmitted in the remaining regions except for the resource C among the resource A. For example, when the symbol sequence A is configured by {symbol #1, symbol #2, symbol #3, symbol 4}, the resource A is configured by {resource #1, resource #2, resource #3, resource #4}, and the resource B is configured by {resource #3, resource #5}, the UE may assume that the symbol sequence A {symbol #1, symbol #2, symbol #3, symbol 4} are mapped to {resource #1, resource #2, resource #3, resource #4}, respectively, and that {symbol #3} mapped to {resource #3} corresponding to resource C is not transmitted, and the UE may receive the symbol sequence A under an assumption that the corresponding symbol sequence {symbol #1, symbol #2, symbol #4} are mapped to {resource #1, resource #2, resource #4}, which are the remaining resources except for {resource #3} corresponding to resource C among resource A, and transmitted. As a result, the UE assumes that the symbol sequence {symbol #1, symbol #2, symbol #4} are mapped to {resource #1, resource #2, resource #4}, respectively, and transmitted, and may perform a subsequent series of reception operations.

Hereinafter, a method of configuring a rate matching resource to perform rate matching in a 5G communication system will be described. The rate matching refers to controlling the size of a signal by considering the amount of resources capable of transmitting the signal. For example, the rate matching of a data channel may be understood as that the size of data is adjusted without mapping and transmitting the data channel with respect to a specific time and frequency resource region.

Figure 6:
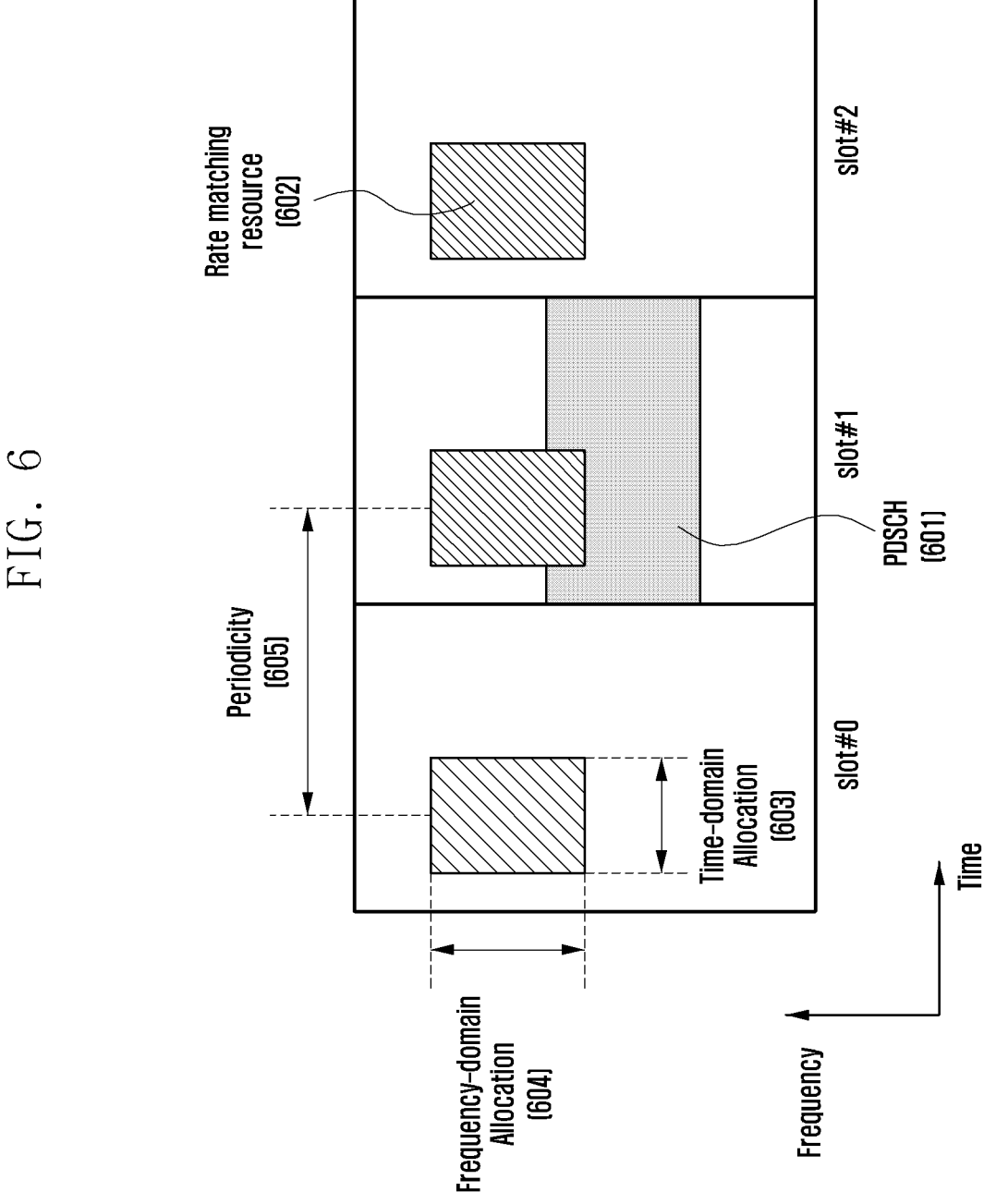
FIG. 6 illustrates a method in which a base station and a terminal performs data transmission and reception by considering a downlink data channel and a rate matching resource in a wireless communication system according to an embodiment of the disclosure.

FIG. 6 illustrates a method in which a base station and a UE perform data transmission or reception by considering a downlink data channel and a rate matching resource according to an embodiment of the disclosure.

FIG. 6 shows a downlink data channel (PDSCH) 601 and a rate matching resource 602. The base station may configure one or more rate matching resources 602 in the UE through higher layer signaling (e.g., RRC signaling). Configuration information of the rate matching resource 602 may include time-domain resource allocation information 603, frequency-domain resource allocation information 604, and period information 605. In the following description, a bitmap corresponding to the frequency-domain resource allocation information 604 is called a "first bitmap", a bitmap corresponding to the time-domain resource allocation information 603 is called a "second bitmap", and a bitmap corresponding to the period information 605 is called a "third bitmap". If some or all of the time and frequency resources of the scheduled data channel 601 overlap the configured rate matching resource 602, a base station may rate-match the data channel 601 in the rate matching resource part 602 and transmit the same. A UE may perform data reception and decoding after assuming that the data channel 601 has been rate-matched in the rate matching resource part 602.

The base station may dynamically notify the UE of whether the data channel will be rate-matched in the configured rate matching resource part through DCI through an additional configuration (corresponding to a "rate matching indicator" in the DCI format described above). Specifically, the base station may select some of the configured rate matching resources, may group the selected resources into a rate matching resource group, and may indicate whether the data channel has been rate-matched with each rate matching resource group through DCI using a bitmap method to the UE. For example, when four rate matching resources RMR #1, RMR #2, RMR #3 and RMR #4 have been configured, the base station may configure RMG #1={RMR #1, RMR #2} and RMG #2={RMR #3, RMR #4} as rate matching groups, and may indicate whether rate matching in each of RMG #1 and RMG #2 has been performed using 2 bits of a DCI field to the UE in the form of a bitmap. For example, the base station may indicate "1" if rate matching needs to be performed, and may indicate "0" if rate matching does not need to be performed.

5G supports the granularity of "RE level" and "RB symbol level" as a method of configuring the above-described rate matching resource in the UE. More specifically, the following configuration method may be followed.

RB Symbol Level

The UE may receive up to four RateMatchPattern for each bandwidth part via higher layer signaling, and one RateMatchPattern may include the following contents.

A reserved resource in a bandwidth part may include a resource, in which a time and frequency resource region of the corresponding reserved resource is configured as a combination of an RB-level bitmap and a symbol-level bitmap on the frequency axis. The reserved resource may span over one or two slots. The UE may be additionally configured with a time-domain pattern (periodicityAndPattern) in which the time and frequency domain including a pair of RB level and symbol level bitmaps are repeated.

A time and frequency domain resource region configured as a control resource set in a bandwidth part and a resource region corresponding to a time-domain pattern configured as a search space configuration in which the resource region is repeated may be included.

RE Level

The UE may be configured with the following information through higher layer signaling.

The number of ports (nrofCRS-Ports) and LTE-CRS-vshift(s) value (v-shift) of LTE CRS as configuration information (lte-CRS-ToMatchAround) for RE corresponding to an LTE cell-specific reference signal or common reference signal (CRS) pattern, center subcarrier location information (carrierFreqDL) of an LTE carrier from the reference frequency point (e.g., reference point A), the bandwidth size (carrierBandwidthDL) information of the LTE carrier, subframe configuration information (mbsfn-SubframConfigList) corresponding to a multicast-broadcast single-frequency network (MBSFN), and the like may be included. The UE may determine the location of the CRS in the NR slot corresponding to the LTE subframe based on the above-described information.

Configuration information for a resource set corresponding to one or multiple zero power (ZP) CSI-RSs in the bandwidth part may be included.

[LTE CRS Rate Match Related]

Next, the rate match process for the above-described LTE CRS will be described in detail. For the coexistence of long term evolution (LTE) and new RAT (NR) (LTE-NR coexistence), NR provides a function of configuring a cell specific reference signal (CRS) pattern of LTE to an NR UE. More specifically, the CRS pattern may be provided by RRC signaling including at least one parameter in ServingCellConfig information element (IE) or ServingCellConfigCommon IE. The parameter may include lte-CRS-ToMatchAround, lte-CRS-PatternList1-r16, lte-CRS-PatternList2-r16, crs-RateMatch-PerCORESETPoolIndex-r16, and the like, for example.

Rel-15 NR provides a function in which one CRS pattern can be configured per serving cell through the lte-CRS-ToMatchAround parameter. In Rel-16 NR, the above function has been extended to enable configuration of a plurality of CRS patterns per serving cell. More specifically, one CRS pattern per one LTE carrier may be configured in a single transmission and reception point (TRP) configuration terminal, and two CRS patterns per one LTE carrier may be configured in a multi-TRP configuration terminal. For example, in the single-TRP configuration terminal, up to three CRS patterns per serving cell may be configured through the lte-CRS-PatternList1-r16 parameter. For another example, a CRS may be configured for each TRP in the multi-TRP configuration terminal. That is, a CRS pattern for TRP1 may be configured through the lte-CRS-PatternList1-r16 parameter, and a CRS pattern for TRP2 may be configured through the lte-CRS-PatternList2-r16 parameter. On the other hand, when two TRPs are configured as described above, whether to apply both the CRS patterns of TRP1 and TRP2 to a specific physical downlink shared channel (PDSCH) or whether to apply only the CRS pattern for one TRP is determined through crs-RateMatch-PerCORESETPoolIndex-r16 parameter. When the crs-RateMatch-PerCORESETPoolIndex-r16 parameter is configured to "enabled", only one TRP CRS pattern is applied, and in other cases, both TRP CRS patterns are applied.

Table 15 shows the ServingCellConfig IE including the CRS pattern, and Table 16 shows the RateMatchPatternLTE-CRS IE including at least one parameter for the CRS pattern.

TABLE 15

| | |
|---|---|
| ServingCellConfig ::= | SEQUENCE { |
| tdd-UL-DL-ConfigurationDedicated | TDD-UL-DL-ConfigDedicated |
| OPTIONAL, -- Cond TDD | |
| initialDownlinkBWP | BWP-DownlinkDedicated |
| OPTIONAL, -- Need M | |
| downlinkBWP-ToReleaseList | SEQUENCE (SIZE (1..maxNrofBWPs)) OF |
| BWP-Id | OPTIONAL, -- Need N |
| downlinkBWP-ToAddModList | SEQUENCE (SIZE (1..maxNrofBWPs)) |
| OF BWP-Downlink | OPTIONAL, -- Need N |
| firstActiveDownlinkBWP-Id | BWP-Id |
| OPTIONAL, -- Cond SyncAndCellAdd | |
| bwp-InactivityTimer | ENUMERATED {ms2, ms3, ms4, ms5, ms6, ms8, |
| ms10, ms20, ms30, | |
| | ms40,ms50, ms60, ms80,ms100, ms200,ms300, |
| ms500, | |

TABLE 15-continued

```
                                       ms750, ms1280, ms1920, ms2560, spare10, spare9,
spare8,
                                      spare7, spare6, spare5, spare4, spare3, spare2,
spare1 }    OPTIONAL, -- Need R
    defaultDownlinkBWP-Id                                                      BWP-Id
OPTIONAL, -- Need S
    uplinkConfig               UplinkConfig                                 OPTIONAL,
-- Need M
    supplementaryUplink                                                  UplinkConfig
OPTIONAL, -- Need M
    pdcch-ServingCellConfig                    SetupRelease { PDCCH-ServingCellConfig }
OPTIONAL, -- Need M
    pdsch-ServingCellConfig                    SetupRelease { PDSCH-ServingCellConfig }
OPTIONAL, -- Need M
    csi-MeasConfig                                SetupRelease { CSI-MeasConfig }
OPTIONAL, -- Need M
    sCellDeactivationTimer                     ENUMERATED {ms20, ms40, ms80, ms160,
ms200, ms240,
                                       ms320, ms400, ms480, ms520, ms640, ms720,
                                       ms840, ms1280, spare2,spare1 }      OPTIONAL, -
- Cond ServingCellWithoutPUCCH
    crossCarrierSchedulingConfig                          CrossCarrierSchedulingConfig
OPTIONAL, -- Need M
    tag-Id                     TAG-Id,
    dummy                                          ENUMERATED {enabled}
OPTIONAL, -- Need R
    pathlossReferenceLinking                         ENUMERATED {spCell, sCell}
OPTIONAL, -- Cond SCellOnly
    servingCellMO          MeasObjectId                                     OPTIONAL,
-- Cond MeasObject
    . . . ,
    [[
    lte-CRS-ToMatchAround                     SetupRelease { RateMatchPatternLTE-CRS }
OPTIONAL, -- Need M
    rateMatchPatternToAddModList                             SEQUENCE (SIZE
(1..maxNrofRateMatchPatterns)) OF RateMatchPattern      OPTIONAL, -- Need N
    rateMatchPatternToReleaseList                            SEQUENCE (SIZE
(1..maxNrofRateMatchPatterns)) OF RateMatchPatternId      OPTIONAL, -- Need
N
    downlinkChannelBW-PerSCS-List                 SEQUENCE (SIZE (1..maxSCSs)) OF
SCS-SpecificCarrier                  OPTIONAL -- Need S
    ]],
    [[
    supplementary UplinkRelease                          ENUMERATED { true }
OPTIONAL, -- Need N
    tdd-UL-DL-ConfigurationDedicated-IAB-MT-r16                           TDD-UL-DL-
ConfigDedicated-IAB-MT-r16                   OPTIONAL, -- Cond TDD_IAB
    dormantBWP-Config-r16                 SetupRelease { DormantBWP-Config-r16 }
OPTIONAL, -- Need M
    ca-SlotOffset-r16                  CHOICE {
        refSCS15kHz                    INTEGER (-2..2),
        refSCS30KHz                    INTEGER (-5..5),
        refSCS60KHz                    INTEGER (-10..10),
        refSCS120KHz                   INTEGER (-20..20)
    }                                                            OPTIONAL,
-- Cond AsyncCA
    channelAccessConfig-r16                 SetupRelease { ChannelAccessConfig-r16 }
OPTIONAL, -- Need M
    intraCellGuardBandsDL-List-r16                      SEQUENCE (SIZE (1..maxSCSs)) OF
IntraCellGuardBandsPerSCS-r16                 OPTIONAL, -- Need S
    intraCellGuardBandsUL-List-r16                      SEQUENCE (SIZE (1..maxSCSs)) OF
IntraCellGuardBandsPerSCS-r16                 OPTIONAL, -- Need S
    csi-RS-ValidationWith-DCI-r16                          ENUMERATED {enabled}
OPTIONAL, -- Need R
    lte-CRS-PatternList1-r16                     SetupRelease { LTE-CRS-PatternList-r16 }
OPTIONAL, -- Need M
    lte-CRS-PatternList2-r16                     SetupRelease { LTE-CRS-PatternList-r16 }
OPTIONAL, -- Need M
    crs-RateMatch-PerCORESETPoolIndex-r16                    ENUMERATED {enabled}
OPTIONAL, -- Need R
    enableTwoDefaultTCI-States-r16                          ENUMERATED {enabled}
OPTIONAL, -- Need R
    enableDefaultTCI-StatePerCoresetPoolIndex-r16                    ENUMERATED {enabled}
OPTIONAL, -- Need R
    enableBeam Switch Timing-r16                           ENUMERATED {true}
OPTIONAL, -- Need R
```

TABLE 15-continued

| | |
|---|---|
| cbg-TxDiffTBsProcessingType1-r16 OPTIONAL, -- Need R | ENUMERATED {enabled} |
| cbg-TxDiffTBsProcessingType2-r16 OPTIONAL -- Need R ]] } | ENUMERATED {enabled} |

TABLE 16

```
        - RateMatchPatternLTE-CRS
The IE RateMatchPatternLTE-CRS is used to configure a pattern to rate match around LTE
CRS. See TS 38.214 [19], clause 5.1.4.2.
        RateMatchPatternLTE-CRS information element
-- ASN1START
-- TAG-RATEMATCHPATTERNLTE-CRS-START
RateMatchPatternLTE-CRS ::=        SEQUENCE {
    carrierFreqDL              INTEGER (0..16383),
    carrierBandwidthDL               ENUMERATED {n6, n15, n25, n50, n75, n100, spare2,
spare1},
    mbsfn-SubframeConfigList                     EUTRA-MBSFN-SubframeConfigList
OPTIONAL, -- Need M
    nrofCRS-Ports            ENUMERATED {n1, n2, n4},
    v-Shift               ENUMERATED {n0, n1, n2, n3, n4, n5}
}
LTE-CRS-PatternList-r16 ::=        SEQUENCE (SIZE (1..maxLTE-CRS-Patterns-r16)) OF
RateMatchPatternLTE-CRS
-- TAG-RATEMATCHPATTERNLTE-CRS-STOP
-- ASN1STOP
RateMatchPatternLTE-CRS field descriptions
carrierBandwidthDL
BW of the LTE carrier in number of PRBs (see TS 38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause
5.1.4.2).
v-Shift
Shifting value v-shift in LTE to rate match around LTE CRS (see TS 38.214 [19], clause
5.1.4.2).
```

[PDSCH: Frequency-Domain Resource Allocation Related]

Figure 7:
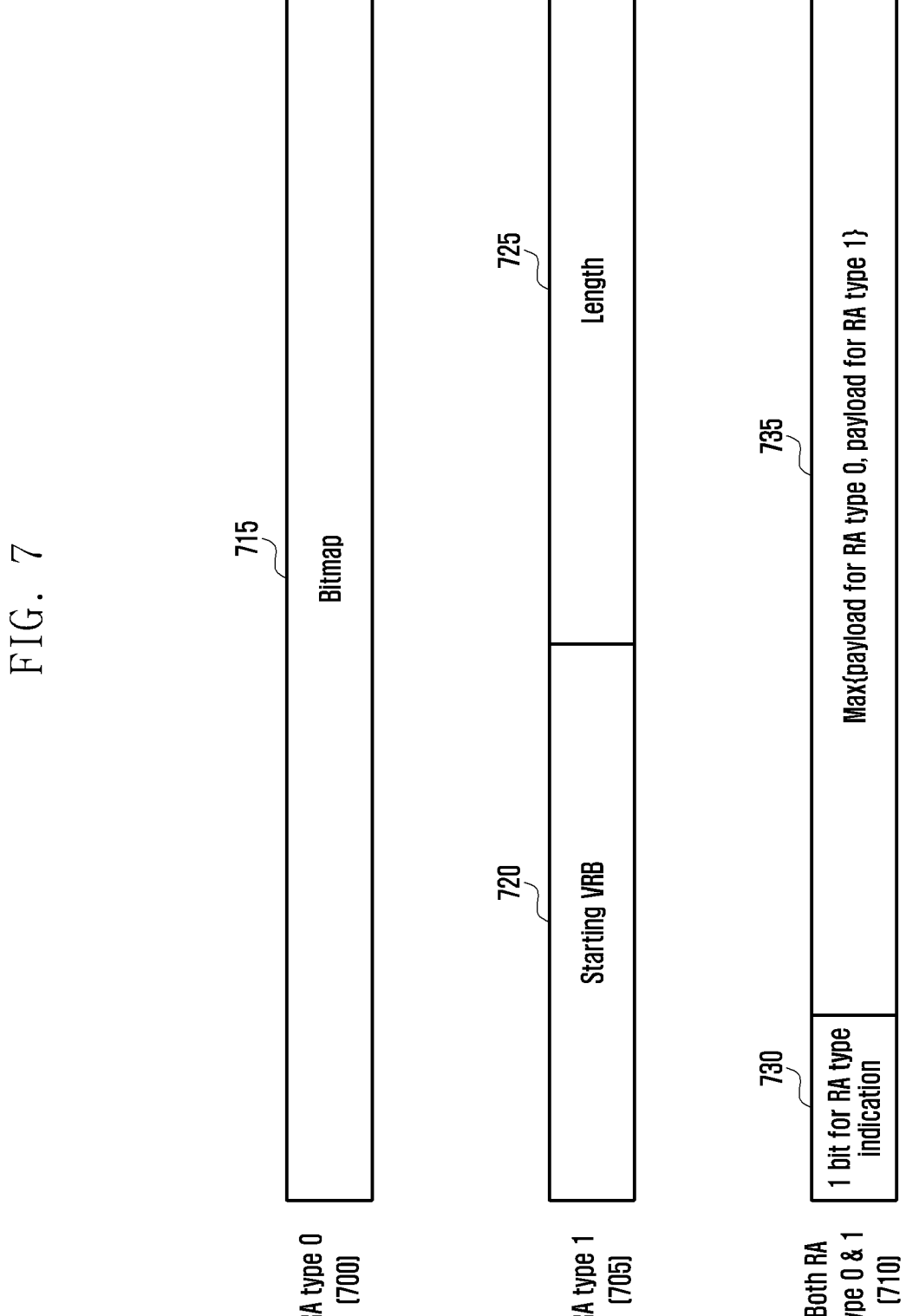
FIG. 7 illustrates an example of frequency-domain resource allocation of a PDSCH in a wireless communication system according to an embodiment of the disclosure.

FIG. 7 illustrates an example of frequency-domain resource allocation of a physical downlink shared channel (PDSCH) in a wireless communication system according to an embodiment of the disclosure.

FIG. 7 shows three frequency-domain resource allocation methods of type 0 700, type 1 705, and dynamic switch 710 configurable through a higher layer in an NR wireless communication system.

Referring to FIG. 7, in case that a UE is configured to use only resource type 0 via higher layer signaling (indicated by reference numeral 700), some downlink control information (DCI) for allocation of PDSCH to the corresponding UE includes a bitmap formed of NRBG bits. Conditions for this will be described again later. Here, NRBG denotes the number of resource block groups (RBGs) determined as shown in Table 17 below according to a BWP size allocated by a BWP indicator and a higher layer parameter rbg-Size, and data is transmitted to RBG indicated as "1" in the bitmap.

TABLE 17

| Bandwidth Part Size | Configuration 1 | Configuration 2 |
|---|---|---|
| 1-36 | 2 | 4 |
| 37-72 | 4 | 8 |

TABLE 17-continued

| Bandwidth Part Size | Configuration 1 | Configuration 2 |
|---|---|---|
| 73-144 | 8 | 16 |
| 145-275 | 16 | 16 |

In case that the UE is configured to use only resource type 1 via higher layer signaling (indicated by reference numeral 705), some DCI for allocation of the PDSCH to the UE includes frequency-domain resource allocation information configured by $\lceil \log_2(N_{RB}{}^{DL,BWP}(N_{RB}{}^{DL,BWP}+1)/2) \rceil$ bits. Conditions for this will be described again later. Through this information, the base station may configure a starting VRB 720 and the length of frequency-domain resources 725 continuously allocated therefrom.

In case that the UE is configured to use both resource type 0 and resource type 1 via higher layer signaling (indicated by reference numeral 710), some DCI for allocation of PDSCH to the UE includes frequency-domain resource allocation information configured by bits of a greater value 735 among a payload 715 for configuration of resource type 0 and payloads 720 and 725 for configuration of resource type 1, a condition for which will be described later. Here, one bit 730 is added to the most significant bit (MSB) of the frequency-domain resource allocation information in the DCI, if the corresponding bit has a value of "0", 0 indicates that resource type 0 is used, and if the corresponding bit has a value of "1", 1 indicates that resource type 1 is used.

[PDSCH/PUSCH: Time-Domain Resource Allocation Related]

Hereinafter, a method of allocating time domain resources for a data channel in a next-generation mobile communication system (5G or NR system) will be described.

A base station may configure, for a UE, a table for time-domain resource allocation information for a downlink data channel (physical downlink shared channel (PDSCH)) and an uplink data channel (physical uplink shared channel (PUSCH)) via higher layer signaling (e.g., RRC signaling). For PDSCH, a table including maxNrofDL-Allocations=16 entries may be configured, and for PUSCH, a table including maxNrofUL-Allocations=16 entries may be configured. In an embodiment, the time-domain resource allocation information may include PDCCH-to-PDSCH slot timing (corresponding to a time interval in slot units between a time point at which a PDCCH is received and a time point at which a PDSCH scheduled by the received PDCCH is transmitted, and denoted by K0), PDCCH-to-PUSCH slot timing (corresponding to a time interval in slot units between a time point at which a PDCCH is received and a time point at which a PUSCH scheduled by the received PDCCH is transmitted, and denoted by K2), information on the position and length of a start symbol in which the PDSCH or PUSCH is scheduled within a slot, a mapping type of PDSCH or PUSCH, and the like. For example, information such as Table 18 or Table 19 below may be transmitted from the base station to the UE.

TABLE 18

PDSCH-TimeDomainResourceAllocationList information element

```
PDSCH-TimeDomainResourceAllocationList ::= SEQUENCE (SIZE(1..maxNrofDL-
Allocations)) OF PDSCH-TimeDomainResourceAllocation
PDSCH-TimeDomainResourceAllocation ::= SEQUENCE {
    k0                    INTEGER(0..32)
OPTIONAL, -- Need S
    mappingType                 ENUMERATED {typeA, typeB},
    startSymbolAndLength          INTEGER (0..127)
}
```

TABLE 19

PUSCH-TimeDomainResourceAllocation information element

```
PUSCH-TimeDomainResourceAllocationList ::= SEQUENCE (SIZE(1..maxNrofUL-
Allocations)) OF PUSCH-TimeDomainResourceAllocation
PUSCH-TimeDomainResourceAllocation ::= SEQUENCE {
    k2           INTEGER(0..32)       OPTIONAL, -- Need S
    mappingType            ENUMERATED {typeA, typeB },
    startSymbolAndLength      INTEGER (0..127)
}
```

The base station may notify one of the entries in the above-described table representing the time-domain resource allocation information to the UE via L1 signaling (e.g., DCI) (e.g., may be indicated by a "time-domain resource allocation" field in DCI). The UE may acquire time-domain resource allocation information for the PDSCH or PUSCH based on the DCI received from the base station.

Figure 8:
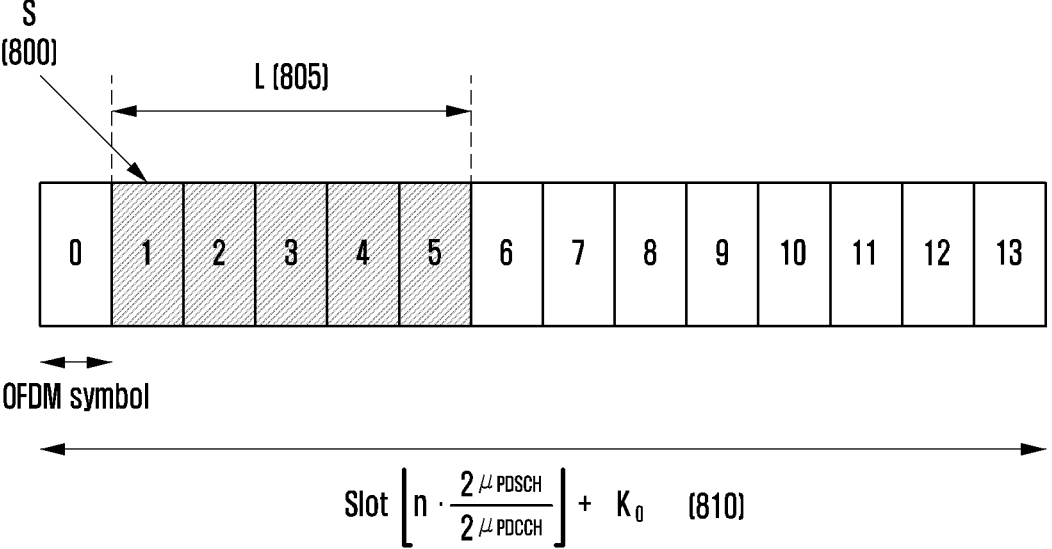
FIG. 8 illustrates an example of time-domain resource allocation of a PDSCH in a wireless communication system according to an embodiment of the disclosure.

FIG. 8 illustrates an example of time-domain resource allocation of a PDSCH in a wireless communication system according to an embodiment of the disclosure.

Referring to FIG. 8, a base station may indicate a time-domain position of a PDSCH resource according to a start position 800 and a length 805 of an OFDM symbol in one slot 810 dynamically indicated based on the subcarrier spacing (SCS) ($\mu_{PDSCH}$, $\mu_{PDCCH}$) of a data channel and a control channel configured using a higher layer, a scheduling offset (K0) value, and DCI.

Figure 9:
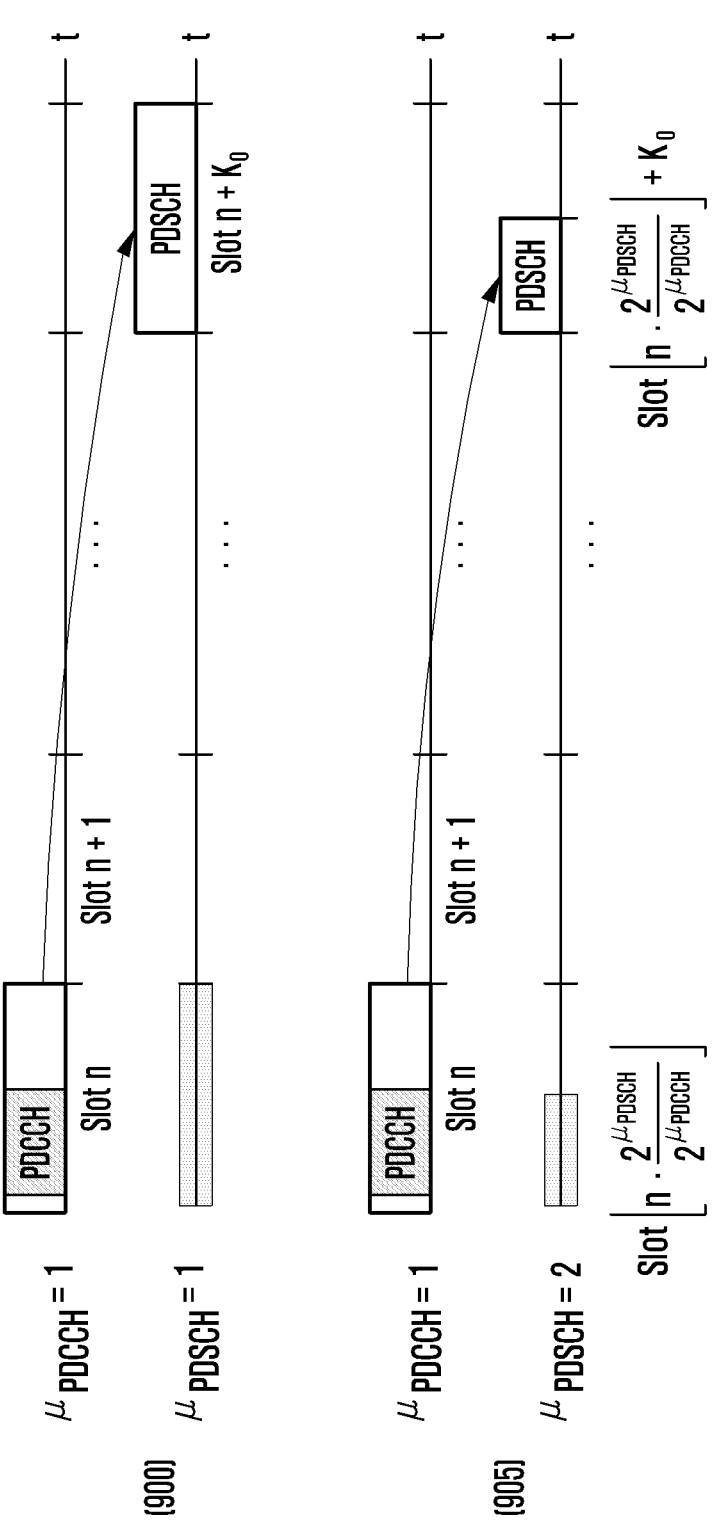
FIG. 9 illustrates an example of time-domain resource allocation according to subcarrier spacings of a data channel and a control channel in a wireless communication system according to an embodiment of the disclosure.

FIG. 9 illustrates an example of time-domain resource allocation according to the subcarrier spacings of a data channel and a control channel in a wireless communication system according to an embodiment of the disclosure.

Referring to FIG. 9, if a data channel and a control channel have the same subcarrier spacing (900, $\mu_{PDSCH}=\mu_{PDCCH}$), since a data slot number and a control slot number are the same, a base station and a UE may generate a scheduling offset adjusted according to predetermined slot offset K0. On the other hand, when the subcarrier spacing of the data channel and the subcarrier spacing of the control channel are different (905, $\mu_{PDSCH}\neq\mu_{PDCCH}$), since a data slot number and a control slot number are different, the base station and the UE may generate a scheduling offset adjusted according to the predetermined slot offset K0 based on the subcarrier spacing of the PDCCH.

[PUSCH: Transmission Method Related]

Next, a method of scheduling PUSCH transmission will be described. PUSCH transmission may be dynamically scheduled by a UL grant in DCI or may be operated by a configured grant Type 1 or Type 2. Dynamic scheduling indication for PUSCH transmission is possible using DCI format 0_0 or 0_1.

Configured grant Type 1 PUSCH transmission does not receive a UL grant in DCI, and may be semi-statically configured through reception of configuredGrantConfig including rrc-ConfiguredUplinkGrant of Table 20 via higher layer signaling. Configured grant Type 2 PUSCH transmission may be semi-persistently scheduled by UL grant in DCI after reception of configuredGrantConfig that does not include the rrc-ConfiguredUplinkGrant of Table 20 via higher layer signaling. When PUSCH transmission is operated by a configured grant, parameters applied to PUSCH transmission are applied through configuredGrantConfig, which is higher layer signaling of Table 20, except for dataScramblingIdentityPUSCH, txConfig, codebookSubset, maxRank, and scaling of UCI-OnPUSCH, which are provided by pusch-Config of Table 21, which is higher layer signaling. When the UE is provided with transformPrecoder in configuredGrantConfig, which is higher layer signaling of Table 20, the UE applies tp-pi2BPSK in the pusch-Config of Table 21 with regagrd to PUSCH transmission operated by the configured grant.

TABLE 20

```
ConfiguredGrantConfig ::=                  SEQUENCE {
    frequencyHopping                       ENUMERATED {intraSlot, interSlot}
OPTIONAL, -- Need S,
    cg-DMRS-Configuration                      DMRS-UplinkConfig,
    mcs-Table                              ENUMERATED {qam256, qam64LowSE}
OPTIONAL, -- Need S
    mcs-TableTransformPrecoder                     ENUMERATED {qam256, qam64LowSE}
OPTIONAL, -- Need S
    uci-OnPUSCH                        SetupRelease { CG-UCI-OnPUSCH }
OPTIONAL, -- Need M
    resourceAllocation                     ENUMERATED { resourceAllocationType0,
resourceAllocationType1, dynamicSwitch },
    rbg-Size                           ENUMERATED {config2}
OPTIONAL, -- Need S
    powerControlLoopToUse                      ENUMERATED {n0, n1},
    p0-PUSCH-Alpha                         P0-PUSCH-AlphaSetId,
    transformPrecoder                      ENUMERATED {enabled, disabled}
OPTIONAL, -- Need S
    nrofHARQ-Processes                         INTEGER(1..16),
    repK                               ENUMERATED {n1, n2, n4, n8},
    repK-RV                                ENUMERATED {s1-0231, s2-0303, s3-0000}
OPTIONAL, -- Need R
    periodicity                            ENUMERATED {
                                           sym2, sym7, sym1x14, sym2x14, sym4x14, sym5x14,
sym8x14, sym10x14, sym16x14, sym20x14,
                                           sym32x14, sym40x14, sym64x14, sym80x14,
sym128x14, sym160x14, sym256x14, sym320x14, sym512x14,
                                           sym640x14, sym1024x14, sym1280x14, sym2560x14,
sym5120x14,
                                           sym6, sym1x12, sym2x12, sym4x12, sym5x12, sym8x12,
sym10x12, sym16x12, sym20x12, sym32x12,
                                           sym40x12, sym64x12, sym80x12, sym128x12,
sym160x12, sym256x12, sym320x12, sym512x12, sym640x12,
                                           sym1280x12, sym2560x12
    },
    configuredGrantTimer               INTEGER (1..64)
OPTIONAL, -- Need R
    rrc-ConfiguredUplinkGrant                  SEQUENCE {
        timeDomainOffset                   INTEGER (0..5119),
        timeDomainAllocation                   INTEGER (0..15),
        frequencyDomainAllocation              BIT STRING (SIZE(18)),
        antennaPort                    INTEGER (0..31),
        dmrs-SeqInitialization             INTEGER (0..1)
OPTIONAL, -- Need R
        precodingAndNumberOfLayers             INTEGER (0..63),
        srs-ResourceIndicator              INTEGER (0..15)
OPTIONAL, -- Need R
        mcsAndTBS                  INTEGER (0..31),
        frequencyHoppingOffset                 INTEGER (1..
maxNrofPhysicalResourceBlocks-1)                   OPTIONAL, -- Need R
        pathlossReferenceIndex             INTEGER (0..maxNrofPUSCH-
PathlossReferenceRSs-1),
        . . .
    }                                          OPTIONAL, --
Need R
    . . .
}
```

Next, a PUSCH transmission method will be described. A DMRS antenna port for PUSCH transmission is the same as an antenna port for SRS transmission. PUSCH transmission may be dependent on a codebook-based transmission method and a non-codebook-based transmission method, respectively, depending on whether the value of txConfig in pusch-Config of Table 21, which is higher layer signaling, is "codebook" or "nonCodebook".

As described above, PUSCH transmission may be dynamically scheduled through DCI format 0_0 or 0_1, and may be semi-statically configured by a configured grant. If the UE receives an indication to schedule PUSCH transmis-sion through DCI format 0_0, the UE performs beam configuration for PUSCH transmission by using pucch-spatialRelationInfoID corresponding to the UE-specific PUCCH resource corresponding to the minimum ID in the uplink BWP activated in a serving cell, and here, PUSCH transmission is based on a single antenna port. The UE does not expect scheduling for PUSCH transmission through DCI format 0_0 within a BWP in which the PUCCH resource including the pucch-spatialRelationInfo is not configured. If the UE has not configured with txConfig in pusch-Config of Table 21, the UE does not expect to receive scheduling through DCI format 0_1.

TABLE 21

```
PUSCH-Config ::=            SEQUENCE {
   dataScramblingIdentityPUSCH      INTEGER (0..1023)
OPTIONAL, -- Need S
   txConfig            ENUMERATED {codebook, nonCodebook}
OPTIONAL, -- Need S
   dmrs-UplinkForPUSCH-MappingTypeA      SetupRelease { DMRS-UplinkConfig }
OPTIONAL, -- Need M
   dmrs-UplinkForPUSCH-MappingTypeB      SetupRelease { DMRS-UplinkConfig }
OPTIONAL, -- Need M
   pusch-PowerControl         PUSCH-PowerControl
OPTIONAL, -- Need M
   frequencyHopping         ENUMERATED {intraSlot, interSlot}
OPTIONAL, -- Need S
   frequencyHoppingOffsetLists         SEQUENCE (SIZE (1..4)) OF INTEGER (1..
maxNrofPhysicalResourceBlocks-1)
                                          OPTIONAL, --
Need M
   resourceAllocation                ENUMERATED { resourceAllocationType0,
resourceAllocation Type1, dynamicSwitch},
   pusch-TimeDomainAllocationList         SetupRelease { PUSCH-
TimeDomainResourceAllocationList }          OPTIONAL, -- Need M
   pusch-AggregationFactor         ENUMERATED { n2, n4, n8 }
OPTIONAL, -- Need S
   mcs-Table            ENUMERATED {qam256, qam64LowSE}
OPTIONAL, -- Need S
   mcs-TableTransformPrecoder            ENUMERATED {qam256, qam64LowSE}
OPTIONAL, -- Need S
   transformPrecoder         ENUMERATED {enabled, disabled}
OPTIONAL, -- Need S
   codebookSubset                ENUMERATED { fullyAndPartialAndNonCoherent,
partial AndNonCoherent, nonCoherent}
                                    OPTIONAL, -- Cond
codebookBased
   maxRank            INTEGER (1..4)
OPTIONAL, -- Cond codebookBased
   rbg-Size            ENUMERATED { config2}
OPTIONAL, -- Need S
   uci-OnPUSCH            SetupRelease { UCI-OnPUSCH}
OPTIONAL, -- Need M
   tp-pi2BPSK            ENUMERATED {enabled}
OPTIONAL, -- Need S
   . . .
}
```

Next, codebook-based PUSCH transmission will be described. Codebook-based PUSCH transmission may be dynamically scheduled through DCI format 0_0 or 0_1, and may operate semi-statically by a configured grant. When the codebook-based PUSCH is dynamically scheduled by DCI format 0_1 or is configured semi-statically by a configured grant, the UE determines a precoder for PUSCH transmission based on an SRS resource indicator (SRI), a transmission precoding matrix indicator (TPMI), and a transmission rank (the number of PUSCH transport layers).

Here, the SRI may be given through a field SRS resource indicator in DCI or may be configured through srs-ResourceIndicator, which is higher layer signaling. The UE is configured with at least one SRS resource when transmitting a codebook-based PUSCH, and may be configured with up to two SRS resources. When the UE is provided with an SRI through DCI, the SRS resource indicated by the corresponding SRI denotes an SRS resource corresponding to the SRI among SRS resources transmitted before the PDCCH including the corresponding SRI. In addition, TPMI and transmission rank may be given through field precoding information and number of layers in DCI, or may be configured through precodingAndNumberOfLayers, which is higher layer signaling. TPMI is used to indicate a precoder applied to PUSCH transmission. If the UE is configured with one SRS resource, the TPMI is used to indicate a precoder to be applied in the configured one SRS resource. If the UE is configured with multiple SRS resources, the TPMI is used to indicate a precoder to be applied in the SRS resource indicated through the SRI.

A precoder to be used for PUSCH transmission is selected from an uplink codebook having the same number of antenna ports as the value of SRS-Ports in SRS-Config, which is higher layer signaling. In codebook-based PUSCH transmission, the UE determines a codebook subset based on the TPMI and codebookSubset in pusch-Config, which is higher layer signaling. CodebookSubset in pusch-Config, which is higher layer signaling, may be configured with one of "fullyAndPartialAndNonCoherent", "partialAndNonCoherent", or "nonCoherent" based on the UE capability reported by the UE to the base station. If the UE reports "partialAndNonCoherent" as UE capability, the UE does not expect that the value of codebookSubset, which is higher layer signaling, is configured to be "fullyAndPartialAndNonCoherent". In addition, if the UE reports "nonCoherent" as UE capability, the UE does not expect that the value of codebookSubset, which is higher layer signaling, is configured to be "fullyAndPartialAndNonCoherent" or "partialAndNonCoherent". When nrofSRS-Ports in SRS-ResourceSet, which is higher layer signaling, indicates two SRS antenna ports, the UE does not expect that the value of codebookSubset, which is higher layer signaling, is configured to be "partialAndNonCoherent".

The UE may be configured with one SRS resource set in which the value of usage in the SRS-ResourceSet, which is higher layer signaling, is configured to be "codebook", and one SRS resource in the corresponding SRS resource set may be indicated through SRI. If multiple SRS resources are configured in the SRS resource set in which the usage value in the SRS-ResourceSet, which is higher layer signaling, is configured to be "codebook", the UE expects that the values of nrofSRS-Ports in the SRS-Resource, which is higher layer signaling, are configured to be the same value with respect to all SRS resources.

The UE may transmit, to the base station, one or multiple SRS resources included in the SRS resource set in which the value of usage is configured to be "codebook" according to higher layer signaling, and the base station indicates the UE to perform PUSCH transmission by selecting one of the SRS resources transmitted by the UE and using transmission beam information of the corresponding SRS resource. Here, in the codebook-based PUSCH transmission, the SRI is used as information for selection of the index of one SRS resource and is included in the DCI. Additionally, the base station includes, in the DCI, information indicating a rank and a TPMI to be used by the UE for PUSCH transmission. The UE performs PUSCH transmission by using the SRS resource indicated by the SRI and applying a rank indicated based on the transmission beam of the SRS resource and a precoder indicated by the TPMI.

Next, non-codebook-based PUSCH transmission will be described. Non-codebook-based PUSCH transmission may be dynamically scheduled through DCI format 0_0 or 0_1, and may be semi-statically operated by a configured grant. When at least one SRS resource is configured in the SRS resource set in which the value of usage in the SRS-ResourceSet, which is higher layer signaling, is configured to be "nonCodebook", the UE may be scheduled with non-codebook-based PUSCH transmission through DCI format 0_1.

For the SRS resource set in which the value of usage in the SRS-ResourceSet, which is higher layer signaling, is configured to be "nonCodebook", the UE may be configured with one connected NZP CSI-RS resource (non-zero power CSI-RS). The UE may perform calculation of the precoder for SRS transmission by measuring the NZP CSI-RS resource connected to the SRS resource set. If the difference between the last received symbol of the aperiodic NZP CSI-RS resource connected to the SRS resource set and the first symbol of aperiodic SRS transmission in the UE is less than 42 symbols, the UE does not expect information on the precoder for SRS transmission to be updated.

When the value of resourceType in the SRS-ResourceSet, which is higher layer signaling, is configured to be "aperiodic", the connected NZP CSI-RS is indicated by SRS request, which is a field in DCI format 0_1 or 1_1. Here, if the connected NZP CSI-RS resource is an aperiodic NZP CSI-RS resource, the connected NZP CSI-RS exists when the value of the SRS request field in DCI format 0_1 or 1_1 is not "00". In this case, the DCI should not indicate cross carrier or cross BWP scheduling. In addition, when the value of the SRS request indicates the existence of the NZP CSI-RS, the corresponding NZP CSI-RS is located in a slot in which a PDCCH including the SRS request field is transmitted. Here, TCI states configured via the scheduled subcarrier are not configured to be QCL-TypeD.

If a periodic or semi-persistent SRS resource set is configured, the connected NZP CSI-RS may be indicated through associatedCSI-RS in the SRS-ResourceSet, which is higher layer signaling. For non-codebook-based transmission, the UE does not expect that spatialRelationInfo, which is higher layer signaling for SRS resource, and associatedCSI-RS in SRS-ResourceSet, which is higher layer signaling, are configured together.

When the UE is configured with multiple SRS resources, the UE may determine a precoder to be applied to PUSCH transmission and a transmission rank, based on the SRI indicated by the base station. Here, the SRI may be indicated through a field SRS resource indicator in DCI or may be configured through srs-ResourceIndicator, which is higher layer signaling. As in the above-described codebook-based PUSCH transmission, when the UE is provided with an SRI through DCI, an SRS resource indicated by the SRI denotes an SRS resource corresponding to the SRI among SRS resources transmitted before the PDCCH including the SRI. The UE may use one or multiple SRS resources for SRS transmission, and the maximum number of SRS resources that can be simultaneously transmitted in the same symbol in one SRS resource set are determined by UE capability reported by the UE to the base station. Here, the SRS resources simultaneously transmitted by the UE occupy the same RB. The UE configures one SRS port for each SRS resource. Only one SRS resource set in which the value of usage in the SRS-ResourceSet, which is higher layer signaling, is configured to be "nonCodebook" can be configured, and up to four SRS resources for non-codebook-based PUSCH transmission may be configured.

The base station transmits one NZP-CSI-RS connected to the SRS resource set to the UE, and the UE performs calculation of a precoder to be used for transmission of one or multiple SRS resources in the corresponding SRS resource set based on a result of measurement at the time of reception of the NZP-CSI-RS. The UE applies, to the base station, the calculated precoder when transmitting one or multiple SRS resources in the SRS resource set in which usage is configured to be "nonCodebook", and the base station selects one or multiple SRS resources among the received one or multiple SRS resources. In this case, in non-codebook-based PUSCH transmission, the SRI indicates an index capable of expressing one or a combination of multiple SRS resources, and the SRI is included in the DCI. Here, the number of SRS resources indicated by the SRI transmitted by the base station may be the number of transmission layers of the PUSCH, and the UE performs PUSCH transmission by applying a precoder applied for SRS resource transmission to each layer.

[PUSCH: Preparation Procedure Time]

Next, a PUSCH preparation procedure time will be described. When the base station is configured to schedule transmission of a PUSCH using DCI format 0_0, 0_1, or 0_2 to the UE, the UE may require a PUSCH preparation procedure time for transmission of a PUSCH by applying transmission methods indicated through DCI (a transmission precoding method of SRS resource, the number of transmission layers, or a spatial domain transmission filter). In NR, the PUSCH preparation procedure time is defined in consideration of the above methods. The PUSCH preparation procedure time of UE may follow Equation 2 below.

$$T_{proc,2} = \max((N_2 + d_{2,1} + d_2)(2048 + 144)\kappa 2^{-\mu} T_c + T_{ext} + T_{switch}, d_{2,2}) \qquad \text{Equation 2}$$

Each variable in $T_{proc,2}$ described above in Equation 2 may have the following meaning.

$N_2$: the number of symbols determined according to numerology $\mu$ and UE processing capability 1 or 2 according to the UE capability. When UE processing capability 1 is reported according to the capability report of the UE, N2 may have the value of Table 22. Further, when UE processing capability 2 is reported and it is configured that UE processing capability 2 may be used via higher layer signaling, N2 may have the value of Table 23.

TABLE 22

| μ | PUSCH preparation time $N_2$ [symbols] |
|---|---|
| 0 | 10 |
| 1 | 12 |
| 2 | 23 |
| 3 | 36 |

TABLE 23

| μ | PUSCH preparation time $N_2$ [symbols] |
|---|---|
| 0 | 5 |
| 1 | 5.5 |
| 2 | 11 for frequency range 1 |

$d_{2,1}$: the number of symbols configured to be 0 when all resource elements of the first OFDM symbol of PUSCH transmission are configured to include only DM-RS, and otherwise, the number of symbols configured to be 1.

κ: 64

μ: follows a value, by which $T_{proc,2}$ becomes larger, among $\mu_{DL}$ or $\mu_{UL}$. $\mu_{DL}$ denotes a numerology of DL through which a PDCCH including DCI for scheduling a PUSCH is transmitted, and $\mu_{UL}$ denotes a numerology of UL through which a PUSCH is transmitted.

$T_c$: has $1/(\Delta f_{max}*N_f)$, $\Delta f_{max}=480*10^3$ Hz, $N_f=4096$ $d_{2,2}$: follows BWP switching time when DCI for scheduling PUSCH indicates BWP switching, and otherwise $d_{2,2}$ has the value of 0.

$d_2$: when OFDM symbols of a PUCCH, a PUSCH having a high priority index, and a PUCCH having a low priority index overlap in time, the $d_2$ value of the PUSCH having a high priority index is used. Otherwise, $d_2$ has the value of 0.

$T_{ext}$: when a UE uses a shared spectrum channel access method, the UE may calculate $T_{ext}$ and apply the calculated text to PUSCH preparation procedure time. Otherwise, $T_{ext}$ is assumed to be 0.

$T_{switch}$: when the uplink switching interval is triggered, $T_{switch}$ is assumed to be a switching spacing time. Otherwise, $T_{switch}$ is assumed to be 0.

The base station and the UE may determine that the PUSCH preparation procedure time is not sufficient, when considering time-domain resource mapping information of the PUSCH scheduled through DCI and timing advance effect between uplink and downlink, in case that the first symbol of the PUSCH starts earlier than the first uplink symbol where the CP starts after $T_{proc,2}$ from the last symbol of the PDCCH including the DCI for scheduling the PUSCH. If not, the base station and the UE determine that the PUSCH preparation procedure time is sufficient. The UE may transmit the PUSCH only if the PUSCH preparation procedure time is sufficient, and may ignore the DCI for scheduling the PUSCH when the PUSCH preparation procedure time is not sufficient.

[CA/DC Related]

FIG. 10 illustrates a radio protocol structure of a base station and a UE in a single cell, carrier aggregation, and dual connectivity situation in a wireless communication system according to an embodiment of the disclosure.

Referring to FIG. 10, the radio protocol of the next generation mobile communication system includes, for each of a UE and an NR base station, NR service data adaptation protocols (NR SDAPs) S25 and S70, NR packet data convergence protocols (NR PDCPs) S30 and S65, and NR radio link controls (NR RLCs) S35 and S60, and NR medium access control (NR MACs) S40 and S55.

The main functions of the NR SDAPs S25 and S70 may include some of the following functions:

Transfer of user plane data

Mapping between a QoS flow and a data bearer (DRB) for both DL and UL

Marking QoS flow ID in both DL and UL packets

Reflective QoS flow to DRB mapping for the UL SDAP PDUs.

With respect to the SDAP layer device, a UE may receive, through an RRC message, a configuration associated with whether to use a header of the SDAP layer device or whether to use a function of the SDAP layer device, according to each PDCP layer device, each bearer, and each logical channel. If the SDAP header is configured, the UE is instructed by a one-bit NAS reflective QoS indicator (NAS reflective QoS) and a one-bit AS reflective QoS indicator (AS reflective QoS) of the SDAP header to update or reconfigure mapping information between a data bearer and a QoS flow of uplink and downlink. The SDAP header may include QoS flow ID information indicating QoS. The QoS information may be used as a data processing priority for supporting smooth services, scheduling information, or the like.

The main functions of the NR PDCPs S30 and S65 may include some of the following functions:

Header compression and decompression: ROHC only

Transfer of user data

In-sequence delivery of higher layer PDUs

Out-of-sequence delivery of higher layer PDUs

PDCP PDU reordering for reception

Duplicate detection of lower layer SDUs

Retransmission of PDCP SDUs

Ciphering and deciphering

Timer-based SDU discard in uplink

In the above, a reordering function of the NR PDCP device refers to a function of sequentially reordering PDCP PDUs, received from a lower layer, based on a PDCP sequence number (SN), and may include a function of transmitting data to a higher layer in the sequence of reordering. Alternatively, the reordering function of the NR PDCP device may include a function of transmitting data without considering the sequence, a function of reordering the sequence and recording missing PDCP PDUs, a function of providing a state report on the missing PDCP PDUs to a transmission side, and a function of requesting retransmission for the missing PDCP PDUs.

The main functions of the NR RLCs S35 and S60 may include some of the following functions:

Transfer of higher layer PDUs

In-sequence delivery of higher layer PDUs

Out-of-sequence delivery of higher layer PDUs

Error Correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

The in-sequence delivery function of the NR RLC device refers to a function of transmitting RLC SDUs, received from a lower layer, to a higher layer in the sequence of reception. The in-sequence delivery function of the NR RLC device may include: if one RLC SDU is originally segmented into multiple RLC SDUs and received, a function of reassembling and transmitting the multiple RLC SDUs; a function of reordering the received RLC PDUs based on an RLC sequence number (SN) or PDCP SN; a function of reordering the sequence and recording missing RLC PDUs; a function of providing a state report on the missing RLC PDUs to a transmission side; and a function of requesting retransmission for the missing RLC PDUs. If the missing RLC SDU occurs, the in-sequence delivery function of the NR RLC device may include a function of sequentially transmitting only the RLC SDUs prior to the missing RLC SDU to a higher layer or sequentially transmitting all the RLC SDUs received before a timer starts to a higher layer if a predetermined timer expires although there is a missing RLC SDU. Alternatively, the in-sequence delivery function of the NR RLC device may include a function of sequentially transmitting all RLC SDUs received so far to a higher layer if a predetermined timer expires although there is a missing RLC SDU. In addition, the RLC PDUs may be processed in the sequence that the RLC PDUS are received (in the sequence of arrival regardless of the sequence of serial number and sequence number), and may be transmitted to a PDCP device out of sequence delivery. In a case of segments, the in-sequence delivery function may include a function of receiving segments stored in a buffer or segments to be received later, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be replaced by a multiplexing function of the NR MAC layer.

In the above, the out-of-sequence delivery function of the NR RLC device refers to a function of directly transmitting the RLC SDUs, received from the lower layer, to a higher layer regardless of the order, and may include, if one RLC SDU has been originally segmented into multiple RLC SDUs and received, a function of reassembling the multiple RLC SDUs and transmitting the same, and a function of storing the RLC SNs or PDCP SNs of the received RLC PDUs, reordering the sequence, and recording the missing RLC PDUs.

The NR MACs S40 and S55 may be connected to multiple NR RLC layer devices configured in one UE, and the main functions of the NR MAC may include some of the following functions:

Mapping between logical channels and transport channels

Multiplexing/de-multiplexing of MAC SDUs

Scheduling information reporting

Error correction through HARQ

Priority handling between logical channels of one UE

Priority handling between UEs by means of dynamic scheduling

MBMS service identification

Transport format selection

Padding

The NR PHY layers S45 and 550 may perform an operation of channel-coding and modulating higher layer data, generating the higher layer data into an OFDM symbol, transmitting the OFDM symbols via a radio channel, or demodulating and channel decoding of the OFDM symbols received via the radio channel, and transferring the OFDM symbol to a higher layer.

The detailed structure of the radio protocol structure may be variously changed according to a carrier (or cell) management method. For example, when the base station performs single carrier (or cell)-based data transmission to the UE, the base station and the UE use a protocol structure, which has a single structure for each layer, such as 500. On the other hand, when the base station transmits data to the UE based on carrier aggregation (CA) using multiple carriers in a single TRP, the base station and the UE has a single structure up to RLC but uses a protocol structure of multiplexing a PHY layer through a MAC layer, such as S10. As another example, when the base station transmits data to the UE based on dual connectivity (DC) using multiple carriers in multiple TRP, the base station and the UE have a single structure up to RLC, but use a protocol structure of multiplexing a PHY layer through a MAC layer, such as 520.

Referring to the descriptions related to PDCCH and beam configuration described above, since PDCCH repetitive transmission is not currently supported in Rel-15 and Rel-16 NRs, it is difficult to achieve the required reliability in scenarios requiring high reliability, such as URLLC. The disclosure proposes a method for improving PDCCH reception reliability of a UE by providing a PDCCH repetitive transmission method through multiple transmission points (TRP). Specific methods are described in detail in the following embodiments.

Hereinafter, embodiments of the disclosure will be described in detail with reference to the accompanying drawings. The contents of the disclosure are applicable to frequency division duplex (FDD) and time division duplex (TDD) systems. Hereinafter, in the disclosure, higher signaling (or higher layer signaling) is a signal transmission method in which data is transmitted from a base station to a UE using a downlink data channel of a physical layer or transmitted from a UE to a base station using an uplink data channel of a physical layer, and may be referred to as RRC signaling, PDCP signaling, or medium access control (MAC) control element (CE) (MAC CE).

Hereinafter, in the disclosure, in determining whether to apply coordinated communication, a UE may use various methods such as a method in which PDCCH(s) for allocating PDSCH to which coordinated communication is applied has a specific format, a method in which the PDCCH(s) for allocating PDSCH to which coordinated communication is applied includes a specific indicator for informing whether coordinated communication is applied, a method in which the PDCCH(s) for allocating PDSCH to which coordinated communication is applied is scrambled by a specific RNTI, or a method in which it is assumed that coordinated communication is applied in a specific section indicated by a higher layer. Hereinafter, for convenience of description, a case in which a UE receives a PDSCH to which coordinated communication is applied based on conditions similar to the above will be referred to as an NC-JT case.

Hereinafter, in the disclosure, determining a priority between A and B refers to selecting one having a higher priority according to a predetermined priority rule to perform an operation corresponding thereto or omitting (or dropping) an operation for the other one having a lower priority.

Hereinafter, in the disclosure, the above-examples will be described through a plurality of embodiments, but the examples are not independent and one or more embodiments can be applied at the same time or in combination.

Hereinafter, embodiments of the disclosure will be described in detail with accompanying drawings. Hereinafter, a base station is a subject that performs resource allocation of a UE, and may be at least one of a gNode B, a gNB, an eNode B, a Node B, a base station (BS), a radio access unit, a base station controller, or a node on a network. The UE may include a user equipment (UE), a mobile station (MS), a cellular phone, a smart phone, a computer, or a multimedia system capable of performing a communication function. Hereinafter, an embodiment of the disclosure will be described using a 5G system as an example, but the embodiment of the disclosure may be applied to other communication systems having a similar technical background or channel type. For example, LTE or LTE-A mobile communication and mobile communication technology developed after 5G may be included therein. Accordingly, the embodiments of the disclosure may be applied to other communication systems through some modifications within a range that does not significantly depart from the scope of the disclosure as determined by those of ordinary skill in the art. The contents of the disclosure are applicable to FDD and TDD systems.

In addition, in the description of the disclosure, in case that it is determined that a detailed description of a related function or configuration may unnecessarily obscure the subject matter of the disclosure, the detailed description thereof will be omitted. In addition, the terms to be described later are terms defined considering functions in the disclosure, which may vary according to intentions or customs of users and operators. Therefore, the definition should be made based on the content throughout this specification.

Hereinafter, in describing the disclosure, higher layer signaling may be signaling corresponding to at least one or a combination of one or more of the following signaling.

Master information block (MIB)

System information block (SIB) or SIB X (X=1, 2, . . . )

Radio resource control (RRC)

Medium access control (MAC) control element (CE)

In addition, L1 signaling may be signaling corresponding to at least one or a combination of one or more of signaling methods using the following physical layer channel or signaling.

Physical downlink control channel (PDCCH)

Downlink control information (DCI)

UE-specific DCI

Group common DCI

Common DCI

Scheduling DCI (for example, DCI used for scheduling downlink or uplink data)

Non-scheduling DCI (for example, DCI not for the purpose of scheduling downlink or uplink data)

Physical uplink control channel (PUCCH)

Uplink control information (UCI)

Hereinafter, in the disclosure, determining the priority between A and B is variously referred to as selecting one having a higher priority according to a predetermined priority rule and performing an operation corresponding thereto or omitting or dropping an operation corresponding to one having a lower priority.

Hereinafter, in the disclosure, the above examples will be described through multiple embodiments, but these are not independent and it is possible that one or more embodiments may be applied simultaneously or in combination.

[Multi-PDSCH/PUSCH Scheduling Related]

A new scheduling method has been introduced in Rel-17 new radio (NR) of the $3^{rd}$ generation partnership project (3GPP). The disclosure relates to the new scheduling method. The new scheduling method introduced in Rel-17 NR is 'Multi-PDSCH scheduling' by which single DCI may schedule one or multiple PDSCHs and 'Multi-PUSCH scheduling' by which single DCI may schedule one or multiple PUSCHs. Here, in multiple PDSCHs or multiple PUSCHs, each PDSCH or PUSCH transmits a different transport block (TB). In the case of using sing the multi-PDSCH scheduling and multi-PUSCH scheduling, downlink control channel overhead can be reduced because multiple DCIs are not required for multiple PDSCH or multiple PUSCH scheduling. However, since one piece of DCI for the multi-PDSCH scheduling and multi-PUSCH scheduling should include scheduling information for multiple PDSCHs or multiple PUSCHs, the size of the DCI may be increased. To this end, a method for preferably interpreting DCI by a UE, when multi-PDSCH scheduling and multi-PUSCH scheduling are configured for the UE, is required.

Although multi-PDSCH scheduling is described in this disclosure, the idea of the technology proposed in this disclosure may be used in multi-PUSCH scheduling.

A base station may configure multi-PDSCH scheduling for a UE. The base station may explicitly configure multi-PDSCH scheduling for the UE via a higher layer signal (e.g., a radio resource control (RRC) signal). Alternatively, the base station may implicitly configure multi-PDSCH scheduling via a higher layer signal (e.g., RRC signal) in the UE.

The base station may configure a time domain resource assignment (TDRA) table via a higher layer signal (e.g., an RRC signal) to perform multi-PDSCH scheduling to the UE, as follows. The TDRA table may include one or multiple rows. The number of rows may be configured up to N_row, and each row may be assigned a unique index. The unique index may have the value of one of 1, 2, . . . , N_row. For example, N_row may have a value of 16. One or multiple pieces of scheduling information may be configured for each row. Here, when one piece of scheduling information is configured in one row, the row schedules one PDSCH. That is, when the row, in which one piece of scheduling information is scheduled, is indicated, this may be interpreted as that single-PDSCH scheduling has been indicated. When multiple pieces of scheduling information are configured in one row, the multiple pieces of scheduling information sequentially schedule multiple PDSCHs. That is, when the row, in which multiple pieces of scheduling information are scheduled, is indicated, this may be interpreted as that multi-PDSCH scheduling has been indicated.

The scheduling information may include K0, starting and length indicator value (SLIV), and PDSCH mapping type. That is, when multi-PDSCH scheduling is indicated, a row may include multiple pieces of scheduling information (K0, SLIV, PDSCH mapping type). Among the multiple pieces of scheduling information, N_th scheduling information (K0, SLIV, PDSCH mapping type) is scheduling information of the N_th PDSCH. For reference, one row may include up to N_pdsch pieces of scheduling information (K0, SLIV, PDSCH mapping type). For example, N_pdsch may be 8 (N_pdsch=8). That is, one row may schedule up to 8 PDSCHs.

Here, K0 indicates a slot in which a PDSCH is scheduled, and represents a slot difference (offset) between a slot in which a PDCCH that transmits DCI for scheduling the PDSCH is received and a slot in which the PDSCH is scheduled. That is, if K0=0, a slot in which a PDSCH is received and a slot in which a PDCCH is received are the same slot. A starting and length indicator value (SLIV) represents an index of a symbol in which a PDSCH starts within one slot and the number of consecutive symbols to which the PDSCH is allocated. The PDSCH mapping type indicates information related to the location of a first DMRS (front-loaded DMRS) of the PDSCH. In the case of PDSCH mapping type A, the first DMRS (front-loaded DMRS) of the PDSCH starts from the 3rd symbol to the 4th symbol of a slot, and in the case of PDSCH mapping type B, the first DMRS (front-loaded DMRS) of the PDSCH starts from the first symbol of symbols for which the PDSCH has been scheduled.

At the time of configuring a row of the TDRA table via a higher layer signal, some of K0, SLIV, and PDSCH mapping types of scheduling information may be omitted. In this case, omitted information may be interpreted as a default value. For example, when K0 is omitted, the value of K0 may be interpreted as 0. In addition, at the time of configuring a row of the TDRA table, information other than K0, SLIV, and PDSCH mapping type may be additionally configured.

In the following description, multi-PDSCH scheduling is configured for a UE. Here, multi-PDSCH scheduling configuration implies that multiple pieces of scheduling information are configured in at least one row of the TDRA table. For reference, one piece of scheduling information may be configured in another row of the TDRA table. Therefore, even if multi-PDSCH scheduling is configured for the UE, the UE may be indicated to perform single-PDSCH scheduling or multi-PDSCH scheduling according to a TDRA field of the received DCI. In other words, the multi-PDSCH scheduling indication corresponds to a case in which a row of the TDRA table, which is received by the UE through the DCI, includes multiple pieces of scheduling information, and the single-PDSCH scheduling indication corresponds to a case in which a row of the TDRA table, which is received by the UE through the DCI, includes one piece of scheduling information.

In the case of a single-PDSCH scheduling indication, one PDSCH is scheduled, and the one PDSCH scheduling requires information such as a modulation coding scheme (MCS), a new data indicator (NDI), a redundancy version (RV), and a HARQ process number (HPN). To this end, the DCI indicating scheduling of the single-PDSCH should include information such as MCS, NDI, RV, and HPN for the one PDSCH. More specifically,
   DCI indicating scheduling of a single-PDSCH may include one MCS field. The MCS indicated in the MCS field (i.e., a modulation scheme and code rate of a channel code) may be applied to one PDSCH scheduled by the DCI.
   DCI indicating scheduling of single-PDSCH may include a 1-bit NDI field. An NDI value may be obtained from the 1-bit NDI field, and based on the NDI value, determination as to whether one PDSCH transmits a new transport block or retransmits a previous transport block may be made.
   DCI indicating scheduling of single-PDSCH may include a 2-bit RV field. An RV value may be obtained from the 2-bit RV field, and a redundancy version of one PDSCH may be determined based on the RV value.
   DCI scheduling single-PDSCH may include one HPN field. The one HPN field may be 4 bits. (For reference, when a UE supports up to 32 HARQ processes, the HPN field is extended to 5 bits, but the HPN field is assumed to be 4 bits for convenience of explanation of the disclosure). One HARQ process ID may be indicated through the one HPN field. The one HARQ process ID may be a HARQ process ID of one scheduled PDSCH.

When multi-PDSCH scheduling is indicated, since multiple PDSCHs are scheduled, each PDSCH requires information such as MCS, NDI, RV, and HPN. To this end, DCI indicating multi-PDSCH scheduling should include information such as MCS, NDI, RV, and HPN for each scheduled PDSCH. More specifically,
   DCI indicating multi-PDSCH scheduling may include one MCS field. The MCS indicated in the MCS field (i.e., a modulation scheme and a code rate of a channel code) may be equally applied to all PDSCHs scheduled by the DCI. That is, DCI for multi-PDSCH scheduling is unable to schedule different PDSCHs by using different MCSs.
   DCI indicating multi-PDSCH scheduling may include a K-bit NDI field. Here, K may be the largest value among the numbers of scheduling information included in respective rows of the TDRA table. For example, in case that the TDRA table includes two rows, the first row includes 4 pieces of scheduling information, and the second row includes 8 pieces of scheduling information, the value of K (K=8) may be obtained. The k-th bit of the K-bit NDI field may indicate an NDI value of a PDSCH corresponding to the k-th scheduling information. That is, the k-th PDSCH may obtain an NDI value from the k-th bit of the K-bit NDI field, and based on the NDI value, determination as to whether the k-th PDSCH transmits a new transport block or retransmits a previous transport block may be made.
   DCI indicating multi-PDSCH scheduling may include a K-bit RV field. The k-th bit of the K-bit RV field may indicate the RV value of the PDSCH corresponding to the k-th scheduling information. That is, the k-th PDSCH may obtain an RV value from the k-th bit of the K-bit RV field, and may determine the redundancy version of the k-th PDSCH based on the RV value.
   DCI indicating multi-PDSCH scheduling may include one HPN field. The one HPN field may be 4 bits. (For reference, if a UE supports up to 32 HARQ processes, the HPN field may be extended to 5 bits, but in the embodiment of the disclosure, it is assumed to be 4 bits for convenience of explanation). One HARQ process ID may be indicated through the one HPN field. The one HARQ process ID may be the HARQ process ID of the first PDSCH among PDSCHs scheduled by the DCI indicating multi-PDSCH scheduling. Here, the first PDSCH corresponds to the first scheduling information. Then, the HPNs of the PDSCHs are sequentially increased by 1. That is, in the case of the second PDSCH (corresponding to the second scheduling information), the HPN is a value obtained by increasing the HARQ process ID of the first PDSCH by 1. For reference, in case that the HARQ process ID exceeds the maximum number of HARQ process IDs (numOf-HARQProcessID) configured in a UE, a modulo calculation is performed. In other words, when the HARQ process ID indicated by the DCI is 'x', the HARQ process ID of the kth PDSCH is determined as follows.
   HPN of the kth PDSCH=(x+k−1) modulo numOfHAR-QProcessID As described above, when single-PDSCH scheduling is indicated, DCI includes a 1-bit NDI field or a 2-bit RV field, and when multi-PDSCH scheduling is indicated, DCI includes a K-bit NDI field or includes K-bit RV field. For reference, the single-PDSCH scheduling indication or the multi-PDSCH scheduling indication is indicated in the TDRA field of the DCI (that is, whether it is a single-PDSCH scheduling indication or multi-PDSCH scheduling indication is determined according to the number of scheduling information included in the row of the indicated TDRA field). Therefore, single DCI should support both single-PDSCH scheduling and multi-PDSCH scheduling. When the length of the DCI for the single-PDSCH scheduling indication and the length of the DCI for the multi-PDSCH scheduling indication are different from each other, '0' may be padded to the DCI of the shorter length to have the same length.

A DCI interpretation procedure of a UE is as follows. The UE receives DCI. In this case, the length of DCI may be assumed to be a larger value among the length of DCI for single-PDSCH scheduling indication and the length of DCI for multi-PDSCH scheduling indication. The UE may know the location of the TDRA field in the DCI. The location of the TDRA field may be the same in the DCI for single-PDSCH scheduling indication and the DCI for multi-PDSCH scheduling indication. The UE may determine whether the DCI received through the TDRA field is DCI for single-PDSCH scheduling indication or DCI for multi-PDSCH scheduling indication. When the number of scheduling information included in the indicated row of the TDRA field is one, the UE may determine the DCI for the single-PDSCH scheduling indication, and if the number of scheduling information included in the row of the TDRA field is two or more, the UE may determine the DCI for the multi-PDSCH scheduling indication. When the UE determines DCI as the single-PDSCH scheduling indication, the DCI may be interpreted according to the determination. That is, the DCI may be interpreted such that the NDI field is 1 bit and the RV field is 2 bits. When the UE determines DCI as the multi-PDSCH scheduling indication, the DCI may be interpreted according to the determination. That is, the DCI may be interpreted such that the NDI field is K bits and the RV field is K bits. For reference, locations of other fields in the DCI may differ according to the lengths of the NDI field or the RV field. Therefore, other fields may have the same bit length but have different locations within the DCI according to whether they are single-PDSCH scheduling indication or multi-PDSCH scheduling indication.

Figure 11A:
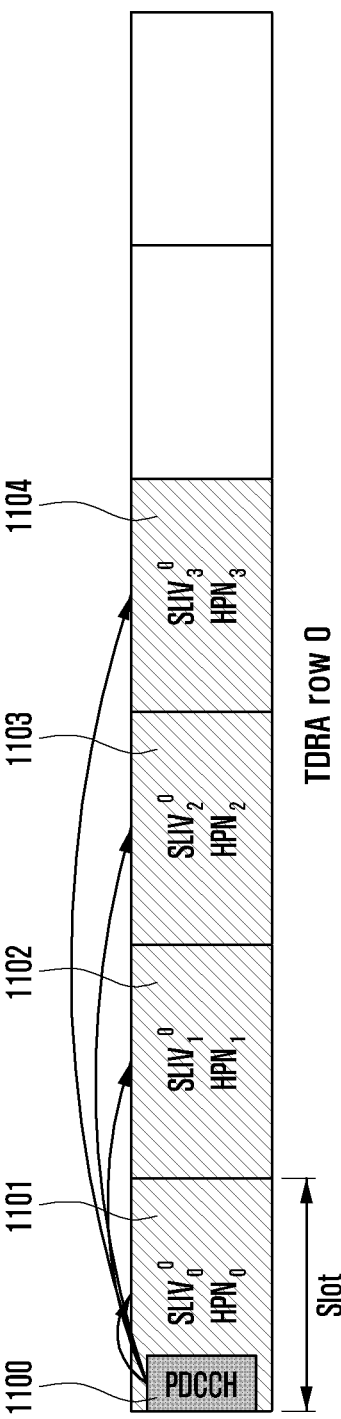
FIGS. 11A, 11B, and 11C illustrate an example of scheduling one or more PDSCHs according to various embodiments of the disclosure.
Figure 11B:
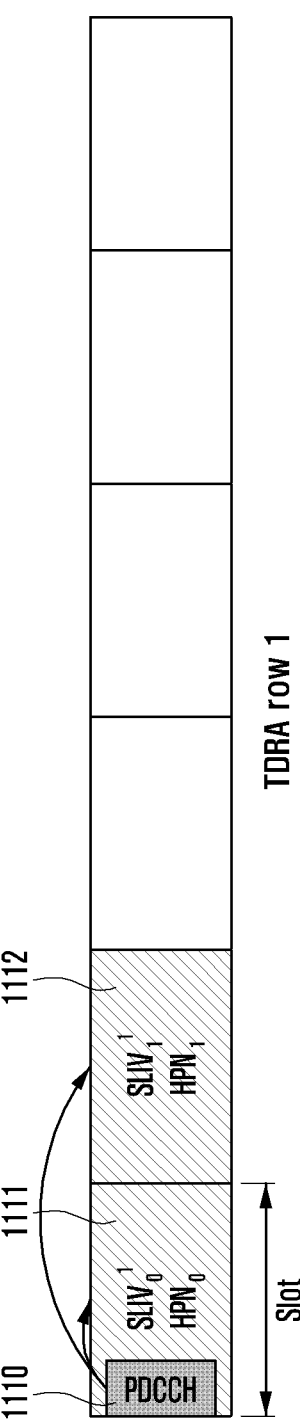
Figure 11C:
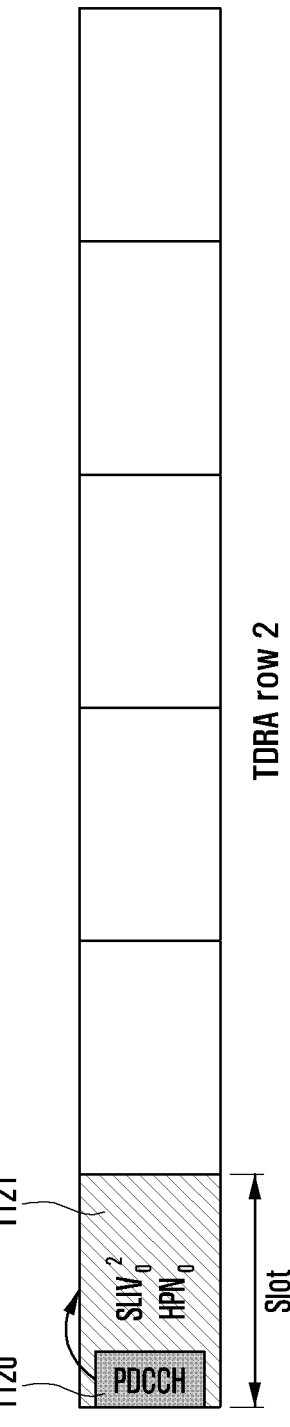

FIGS. 11A, 11B, and 11C illustrate a PDSCH scheduling scheme according to the above description according to various embodiments of the disclosure.

The first row (row 0) of a TDRA table includes four scheduling information (K0, SLIV, PDSCH mapping type). Here, the first SLIV is called $SLIV^0_0$, the second SLIV is called $SLIV^0_1$, the third SLIV is called $SLIV^0_2$, and the fourth SLIV is $SLIV^0_3$. Accordingly, when receiving an indication of the first row (row 0) of the TDRA table, a UE may determine that multi-PDSCH scheduling has been indicated.

The second row (row 1) of the TDRA table includes two scheduling information (K0, SLIV, PDSCH mapping type). Here, the first SLIV is called $SLIV^1_0$ and the second SLIV is called $SLIV^1_1$. Therefore, when receiving an indication of the second row (row 1) of the TDRA table, the UE may determine that multi-PDSCH scheduling has been indicated.

The third row (row 2) of the TDRA table includes one piece of scheduling information (K0, SLIV, PDSCH mapping type). Here, SLIV is referred to as $SLIV^{20}$. Therefore, when receiving an indication of the third row (row 2) of the TDRA table, the UE may determine that single-PDSCH scheduling has been indicated.

FIG. 11A illustrates a case in which a UE receives an indication of the first row (row 0) of the TDRA table. A TDRA field of DCI received by the UE on a PDCCH 1100 may indicate the first row (row 0) of the TDRA table. Accordingly, the UE may receive four PDSCHs based on four scheduling information (K0, SLIV, PDSCH mapping type) of the first row (row 0). The UE may determine symbols for reception of a first PDSCH 1101 based on $SLIV^0_0$ which is the first SLIV, may determine symbols for reception of a second PDSCH 1102 based on $SLIV^0_1$, which is the second SLIV, may determine symbols for reception of a third PDSCH 1103 based on $SLIV^0_2$, which is the third SLIV, and may determine symbols for reception of a fourth PDSCH 1104 based on $SLIV^0_3$, which is the fourth SLIV. Each of the four PDSCHs may have a unique HARQ process ID. That is, the first PDSCH may have $HPN_0$ as the HARQ process ID, the second PDSCH may have $HPN_1$ as the HARQ process ID, the third PDSCH may have $HPN_2$ as the HARQ process ID, and the fourth PDSCH may have $HPN_3$ as the HARQ process ID. Here, the DCI may indicate the HARQ process ID of the first PDSCH. For example, the DCI may indicate $HPN_0=0$ as the HARQ process ID of the first PDSCH. In this case, $HPN_1=1$ may be indicated as the HARQ process ID of the second PDSCH, $HPN_1=2$ may be indicated as the HARQ process ID of the third PDSCH, and $HPN_1=3$ may be indicated as the HARQ process ID of the fourth PDSCH.

FIG. 11B illustrates a case in which a UE receives an indication of the second row (row 1) of the TDRA table. A TDRA field of DCI received by the UE on a PDCCH 1110 may indicate the second row (row 1) of the TDRA table. Accordingly, the UE may receive two PDSCHs based on two scheduling information (K0, SLIV, PDSCH mapping type) of the second row (row 1). The UE may determine symbols for reception of a first PDSCH 1111 based on $SLIV^1_0$ which is the first SLIV, and may determine symbols for reception of a second PDSCH 1112 based on $SLIV^1_1$, which is the second SLIV. Each of the two PDSCHs may have a unique HARQ process ID. That is, the first PDSCH may have $HPN_0$ as the HARQ process ID, and the second PDSCH may have $HPN_1$ as the HARQ process ID. Here, the DCI may indicate the HARQ process ID of the first PDSCH. For example, $HPN_0=0$ may be indicated as the HARQ process ID of the first PDSCH through the DCI. In this case, $HPN_1=1$ may be indicated as the HARQ process ID of the second PDSCH.

FIG. 11C illustrates a case in which a UE receives an indication of the third row (row 2) of the TDRA table. A TDRA field of DCI received by the UE on a PDCCH 1120 may indicate the third row (row 2) of the TDRA table. Accordingly, the UE may receive one PDSCH based on one piece of scheduling information (K0, SLIV, PDSCH mapping type) of the third row (row 2). The UE may determine symbols for reception of one PDSCH 1121 based on $SLIV^2_0$ which is a single SLIV. The HARQ process ID of one PDSCH, that is, $HPN_0$ is indicated through DCI. For example, the DCI may indicate $HPN_0=0$ as the HARQ process ID of the first PDSCH.

Hereafter, unless otherwise specified, PDSCH assumes single-codeword transmission. In case that two-codeword transmission is configured for a UE, fields of DCI are related to a first codeword unless otherwise specified.

A UE may monitor DCI format (e.g., DCI format 1_0, DCI format 1_1, DCI format 1_2) to receive PDSCH reception scheduling. For reference, the UE may be configured to monitor one or multiple DCI formats (e.g., DCI format 1_0, DCI format 1_1, DCI format 1_2) in a specific search space. Among the DCI formats, DCI format 1_1 may be used for multi-PDSCH scheduling. However, DCI format 1_0 and DCI format 1_2 may be configured not to be used for multi-PDSCH scheduling.

More specifically, TDRA tables for PDSCH reception for each DCI format by a UE are shown in Tables 24 to 25. The UE may receive four TDRA tables configured from a base station as follows.

PDSCH-ConfigCommon Includes Pdsch-TimeDomainAllo-cationList

Since PDSCH-ConfigCommon is included in system information block 1 (SIB1), pdsch-TimeDomainAllocation-List is a cell common TDRA table. The pdsch-TimeDomain-AllocationList may include up to 16 rows, and the rows include a value of K0, a value of SLIV, or a PDSCH mapping type. Here, the value of SLIV is one, and therefore may be configured not to be used for multi-PDSCH sched-uling.

PDSCH-Config Includes Pdsch-TimeDomainAllocationList

Since PDSCH-Config is included in RRC parameter of a UE, pdsch-TimeDomainAllocationList is a UE-specific TDRA table. The pdsch-TimeDomainAllocationList may include up to 16 rows, and the rows include a value of K0, a value of SLIV, or a PDSCH mapping type. Here, the value of SLIV is one, and therefore may be configured not to be used for multi-PDSCH scheduling.

PDSCH-Config Includes Pdsch-TimeDomainAllocation-ListForMultiPDSCH-r17

Since PDSCH-Config is included in RRC parameter of a UE, pdsch-TimeDomainAllocationListForMultiPDSCH-r17 is a UE-specific TDRA table. The pdsch-TimeDomain-AllocationListForMultiPDSCH-r17 may include up to 64 rows, and the rows include a value of K0, a value of SLIV, and a PDSCH mapping types. Here, the value of K0 and the value of SLIV may be one or plural, and therefore may be used for multi-PDSCH scheduling.

PDSCH-Config Includes Pdsch-TimeDomainAllocation-ListForDCI-Format1-2

Since PDSCH-Config is included in RRC parameter of a UE, pdsch-TimeDomainAllocationListForDCI-Format1-2 is a UE-specific TDRA table. The pdsch-TimeDomainAllo-cationList may include up to 16 rows, and the rows include a value of K0, a value of SLIV, or a PDSCH mapping type. Here, the value of SLIV is one, and therefore may be configured not to be used for multi-PDSCH scheduling. In addition, pdsch-TimeDomainAllocationListForDCI-For-mat1-2 applies only to DCI format 1_2.

Referring to Tables 24 and 25, in case that a UE receives the above four configurations for the TDRA table, the TDRA tables of DCI format 1_0, DCI format 1_1, and DCI format 1_2 monitored by the UE to perform PDSCH reception may be determined as follows.

Table 24 shows a TDRA table of DCI format 1_0 and DCI format 1_1. First, in case that DCI format 1_0 and DCI format 1_1 are monitored in a common search space of CORESET0, in a case of being configured with 'PDSCH-ConfigCommon includes pdsch-TimeDomainAllocation-List', the UE determines a TDRA table according to con-figuration of 'PDSCH-ConfigCommon includes pdsch-TimeDomainAllocationList' and in a case of not being configured with 'PDSCH-ConfigCommon includes pdsch-TimeDomainAllocationList', the UE may use a Default A TDRA table. Here, the Default A TDRA table is a TDRA table that may be used by a UE without a separate configu-ration and is described in the 3GPP standard document TS38.214. In case that DCI format 1_0 and DCI format 1_1 are monitored in a common search space of a CORESET other than CORESET0 or a UE-specific search space, when 'PDSCH-Config includes pdsch-TimeDomainAllocation-ListForMultiPDSCH If-r17' is configured, the UE may determine a TDRA table according to the configuration of 'PDSCH-Config includes pdsch-TimeDomainAllocation-ListForMultiPDSCH-r17'. In case that 'PDSCH-Config includes pdsch-TimeDomainAllocationListForMulti-PDSCH-r17' is not configured and 'PDSCH-Config includes pdsch-TimeDomainAllocationList' is configured, the UE may determine a TDRA table according to the configuration of 'PDSCH-Config includes pdsch-TimeDomainAllocation-List'. In case that 'PDSCH-Config includes pdsch-TimeDo-mainAllocationListForMultiPDSCH-r17' and 'PDSCH-Config includes pdsch-TimeDomainAllocationList' are not configured and 'PDSCH-ConfigCommon includes pdsch-TimeDomainAllocationList' is configured, the UE may determine a TDRA table according to 'PDSCH-ConfigCom-mon includes pdsch-TimeDomainAllocationList' and, when 'PDSCH-ConfigCommon includes pdsch-TimeDomainAl-locationList' is not configured, the UE may use the default A TDRA table.

TABLE 24

| RNTI | PDCCH search space | PDSCH-ConfigCommon includes pdsch-TimeDomainAllo-cationList | PDSCH-Config includes pdsch-TimeDomainAllo-cationList | PDSCH-Config includes pdsch-TimeDomainAllo-cationListForMultiPDSCH-r17 | PDSCH time domain resource allocation to apply |
|---|---|---|---|---|---|
| C-RNTI, MCS-C-RNTI, CS-RNTI | Any common search space associated with CORESET 0 | No Yes | — | — | Default A pdsch-TimeDomainAllocationList provided in PDSCH-ConfigCommon |
| C-RNTI, MCS-C-RNTI, CS-RNTI | Any common search space not associated with CORESET 0 | No Yes | No No | — | Default A pdsch-TimeDomainAllocationList provided in PDSCH-ConfigCommon |
| | UE specific search space | No/Yes | Yes | — | pdsch-TimeDomainAllocationList provided in PDSCH-Config |

TABLE 24-continued

| RNTI | PDCCH search space | PDSCH-ConfigCommon includes pdsch-TimeDomainAllocationList | PDSCH-Config includes pdsch-TimeDomainAllocationList | PDSCH-Config includes pdsch-TimeDomainAllocationListForMultiPDSCH-r17 | PDSCH time domain resource allocation to apply |
|---|---|---|---|---|---|
|  |  | No/Yes | — | Yes | pdsch-TimeDomainAllocationListForMultiPDSCH-r17 provided in PDSCH-Config |

Table 25 shows a TDRA table of DCI format 1_2. In case that 'PDSCH-Config includes pdsch-TimeDomainAllocationListForDCI-Format1-2' is configured, a UE may determine a TDRA table according to the configuration of 'PDSCH-Config includes pdsch-TimeDomainAllocationListForDCI-Format1-2'. In case that 'PDSCH-Config includes pdsch-TimeDomainAllocationListForDCI-Format1-2' is not configured and 'PDSCH-Config includes pdsch-TimeDomainAllocationList' is configured, the UE may determine a TDRA table according to the configuration of 'PDSCH-Config includes pdsch-TimeDomainAllocationList'. In case that 'PDSCH-Config includes pdsch-TimeDomainAllocationListForDCI-Format1-2' and 'PDSCH-Config includes pdsch-TimeDomainAllocationList' are not configured, and 'PDSCH-ConfigCommon includes pdsch-TimeDomainAllocationList' is configured, the UE may determine a TDRA table according to the configuration of 'PDSCH-ConfigCommon includes pdsch-TimeDomainAllocationList' and, when 'PDSCH-ConfigCommon includes pdsch-TimeDomainAllocationList' is not configured, the UE may use the default A TDRA table.

The UE may receive 'pdsch-AggregationFactor in pdsch-config' or 'pdsch-AggregationFactor in sps-Config' as a configuration for a PDSCH repetition reception from a base station through a higher layer. If the UE receives the configuration, the UE may repeatedly receive a PDSCH according to the configuration. For example, pdsch-AggregationFactor may be configured to be a value of one of 2, 4, and 8. According to the above configuration, the PDSCH may be repeatedly received in consecutive slots, and a symbol for reception of the PDSCH in each slot may be determined to have the same SLIV. In addition, the same transport block (TB) may be repeatedly received in the contiguous slots.

The 'pdsch-AggregationFactor in pdsch-config' may be applied to a PDSCH scheduled by DCI format 1_1 or DCI format 1_2 in which CRC is scrambled by C-RNTI, MCS-C-RNTI, CS-RNTI with NDI=1. However, the 'pdsch-AggregationFactor in pdsch-config' is not applied to DCI format 1_0. In addition, when multi-PDSCH scheduling ('PDSCH-Config includes pdsch-TimeDomainAllocationListForMultiPDSCH-r17') is configured in DCI format 1₁,

TABLE 25

| PDSCH-ConfigCommon includes pdsch-TimeDomainAllocationList | PDSCH-Config includes pdsch-TimeDomainAllocationList | PDSCH-Config includes pdsch-TimeDomainAllocationListForDCI-Format1-2 | PDSCH time domain resource allocation to apply |
|---|---|---|---|
| No | No | No | Default A |
| Yes | No | No | pdsch-TimeDomainAllocationList provided in PDSCH-ConfigCommon |
| No/Yes | Yes | No | pdsch-TimeDomainAllocationList provided in PDSCH-Config |
| No/Yes | No/Yes | Yes | pdsch-TimeDomainAllocationListDCI-1-2 provided in PDSCH-Config |

Based on Tables 24 and 25, when a UE receives 'PDSCH-Config includes pdsch-TimeDomainAllocationListForMultiPDSCH-r17', which is TDRA table configuration information for multi-PDSCH scheduling, the UE may apply the 'PDSCH-Config includes pdsch-TimeDomainAllocationListForMultiPDSCH-r17' to DCI format 1_1. However, the UE may be configured not to apply the 'PDSCH-Config includes pdsch-TimeDomainAllocationListForMultiPDSCH-r17' to DCI format 1_0 to DCI format 1_2. Therefore, DCI format 1_0 and DCI format 12 may be configured not to be used for multi-PDSCH scheduling.

the 'pdsch-AggregationFactor in pdsch-config' is not applied to DCI format 1_1. In other words, when multi-PDSCH scheduling ('PDSCH-Config includes pdsch-TimeDomainAllocationListForMultiPDSCH-r17') is configured in DCI format 1_1, 'pdsch-AggregationFactor in pdsch-config' is applied only in DCI format 1_2.

The 'pdsch-AggregationFactor in sps-Config' may be applied to a PDSCH scheduled by DCI format 1_1 or DCI format 1_2 scrambled by CS-RNTI with NDI=1 and a PDSCH scheduled using sps-Config without PDCCH transmission. However, 'pdsch-AggregationFactor in sps-Config' is not applied to DCI format 1_0. In addition, when multi-PDSCH scheduling ('PDSCH-Config includes pdsch-TimeDomainAllocationListForMultiPDSCH-r17') is configured in DCI format 1_1, the 'pdsch-AggregationFactor in sps-Config' is not applied to DCI format 1_1. In other words, when multi-PDSCH scheduling ('PDSCH-Config includes pdsch-TimeDomainAllocationListForMultiPDSCH-r17') is configured in DCI format 1_1, 'pdsch-AggregationFactor in sps-Config' is applied only in DCI format 1_2.

[Related to Multi-Cell Multi-PDSCH/PUSCH Scheduling]

In Rel-18, multi-cell multi-PDSCH scheduling in which single DCI schedules PDSCHs for each of multiple cells or multi-cell multi-PUSCH scheduling in which single DCI schedules PUSCHs for each of multiple cells is being discussed. Here, single DCI may schedule only one PDSCH or one PUSCH for one cell. That is, in a case of multi-cell multi-PDSCH scheduling, when PDSCHs are scheduled for multiple cells, only one PDSCH may be scheduled at most for each cell. In a case of multi-cell multi-PUSCH scheduling, when PUSCHs are scheduled for multiple cells, only one PUSCH may be scheduled for each cell at most.

Figure 12:
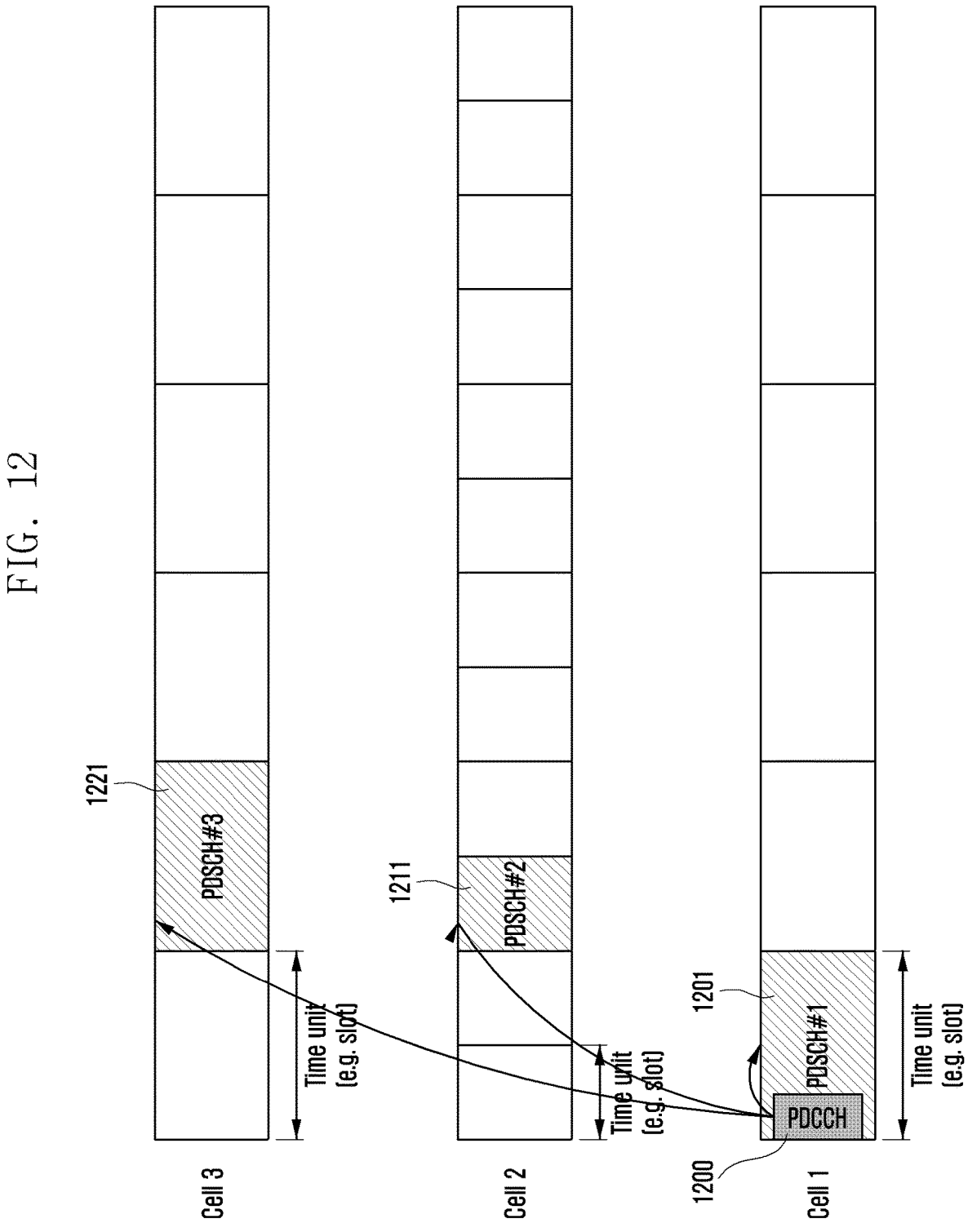
FIG. 12 illustrates multi-cell scheduling according to an embodiment of the disclosure.

FIG. 12 illustrates multi-cell scheduling according to an embodiment of the disclosure.

Referring to FIG. 12, a UE may receive a PDCCH 1200 in one cell. The PDCCH 1200 may schedule multiple cells. In the example of FIG. 12, the PDCCH 1200 may schedule PDSCHs for three cells (cell 1, cell 2, and cell 3). The PDCCH 1200 may schedule PDSCH #1 1201 for cell 1, schedule PDSCH #2 1211 for cell 2, and schedule PDSCH #1 1221 for cell 3.

When receiving PDSCHs in multiple cells, the UE may transmit HARQ-ACK of the received PDSCHs through one PUCCH. For example, referring to FIG. 12, the UE assumes that one PDSCH is scheduled for each of three cells. The UE may multiplex HARQ-ACKs of the three PDSCHs 1201, 1211, and 1221 on one PUCCH and transmit the same. Thereafter, the disclosure proposes two methods for a solution as follows.

> Method for determining a slot in which PUCCH is transmitted
>
> Method for designing Type-i HARQ-ACK codebook Unless otherwise specified in the disclosure, the multi-cell multi-PDSCH scheduling DCI format may receive a TDRA table configured as shown in Table 26 below.

TABLE 26

| Index | First scheduling information | Second scheduling information | Third scheduling information |
|---|---|---|---|
| 1 | cell index 1__1, BWP index 1__1, K0 1__1, SLIV 1__1, mapping type 1__1 | cell index 1__2, BWP index 1__2, K0 1__2, SLIV 1__2, mapping type 1__2 | cell index 1__3, BWP index 1__3, K0 1__3, SLIV 1__3, mapping type 1__3 |
| 2 | cell index 2__1, BWP index 2__1, K0 2__1, SLIV 2__1, mapping type 2__1 | cell index 2__2, BWP index 2__2, K0 2__2, SLIV 2__2, mapping type 2__2 | |
| 3 | cell index 3__1, BWP index 3__1, K0 3__1, SLIV 3__1, mapping type 3__1 | cell index 3__2, BWP index 3__2, K0 3__2, SLIV 3__2, mapping type 3__2 | |
| 4 | cell index 4__1, BWP index 4__1, K0 4__1, SLIV 4__1, mapping type 4__1 | | |

In Table 26, x of X_Y is an index of a TDRA row, and y is an index of scheduling information.

Cell index: an index of a cell for which a PDSCH is scheduled according to scheduling information. A unique index is configured for each cell, and one of the indices is indicated. In case that multiple pieces of scheduling information exist in the same TDRA row, the cell indices of the multiple pieces of scheduling information may all be different.

BWP index: BWP index of a cell for which a PDSCH is scheduled according to scheduling information. Up to four BWPs may be configured in each cell, and each BWP may be assigned a unique index. Here, the unique index is one of 0, 1, 2, and 3.

K0: may indicate a difference between a slot in which a PDCCH is received and a slot in which a PDSCH is scheduled. In case that PDCCH is received in slot n, a slot in which a PDSCH corresponding to a value of K0 is scheduled is $$\left\lfloor n \cdot \frac{2^{\mu_{PDSCH}}}{2^{\mu_{PDCCH}}} \right\rfloor + K_0.$$

Here, the value of K0 is $K_0$, and $\mu_{PDSCH}$ and $\mu_{PDCCH}$ are subcarrier configurations of PDSCH and PDCCH. When the subcarrier configuration is, this corresponds to a subcarrier spacing of $15*2^\mu$ kHz.

SLIV: SLIV represents a symbol occupied by a PDSCH in a slot in which a PDSCH is scheduled. SLIV indicates the location and length (number of consecutive symbols) of a start symbol in a slot.

Mapping type: The mapping type indicates the location of a first DMRS symbol and DMRS configuration of PDSCH. When mapping type A is indicated, the first DMRS may be located in the 3rd or 4th symbol of the slot, and when mapping type B is indicated, the first DMRS may be located in a first symbol of symbols occupied by a PDSCH determined by SLIV.

In Table 26, each TDRA row may include different numbers of scheduling information. In case that the number of scheduling information included in each TDRA row is 1 (the row of index 4 in Table 26), only one PDSCH is scheduled. Therefore, this may be called single-cell scheduling. In case that the number of scheduling information included in each TDRA row is two or more (the rows of indices 1, 2, and 3 in Table 26), multiple PDSCHs are scheduled. Therefore, this may be called multi-cell scheduling.

Hereafter, the disclosure assumes a case in which multi-cell scheduling is indicated.

[Method for Determining a Slot in which PUCCH is Transmitted]

In a case of receiving DCI for scheduling a PDSCH, a UE may obtain a value of K1 from the DCI in order to determine an uplink slot for transmitting HARQ-ACK of the PDSCH. Here, an uplink slot (reference uplink slot) corresponding to K1 (K1=0) may be the last slot among uplink slots overlapping a slot in which a PDSCH is scheduled. An uplink slot corresponding to K1 (K1=k) may be an uplink slot located after k-th slot from an uplink slot (reference uplink slot) corresponding to k1 (K1=0). That is, if the index of the uplink slot (reference uplink slot) corresponding to k1 (K1=0) is n, an uplink slot having an index of (n+k) may be determined as a slot in which the PUCCH is transmitted.

When the UE receives the DCI scheduling the multi-cell multi-PDSCH, the UE may obtain a value of K1 from the DCI in order to determine an uplink slot for transmitting HARQ-ACK of the multiple PDSCHs. Here, an uplink slot (reference uplink slot) corresponding to K1 (K1=0) should be determined. The problem is that since the UE is scheduled with multiple PDSCHs, it may be ambiguous to determine a PDSCH, which is used to determine an uplink slot having the value of k1 (K1=0), among multiple PDSCHs. Therefore, a method for solving this problem is disclosed.

As a first embodiment, a reference uplink slot may be determined based on a PDSCH that ends last.

More specifically, it is assumed that the UE is scheduled with PDSCHs for multiple cells. In this case, the UE may determine a last symbol of each of the PDSCHs scheduled for multiple cells. The UE may determine a PDSCH that ends last in the last symbols of the respective multiple PDSCHs. The UE may determine an uplink slot (reference uplink slot) having a value of K1 (K1=0) based on a slot of the PDSCH that ends last.

Figure 13:
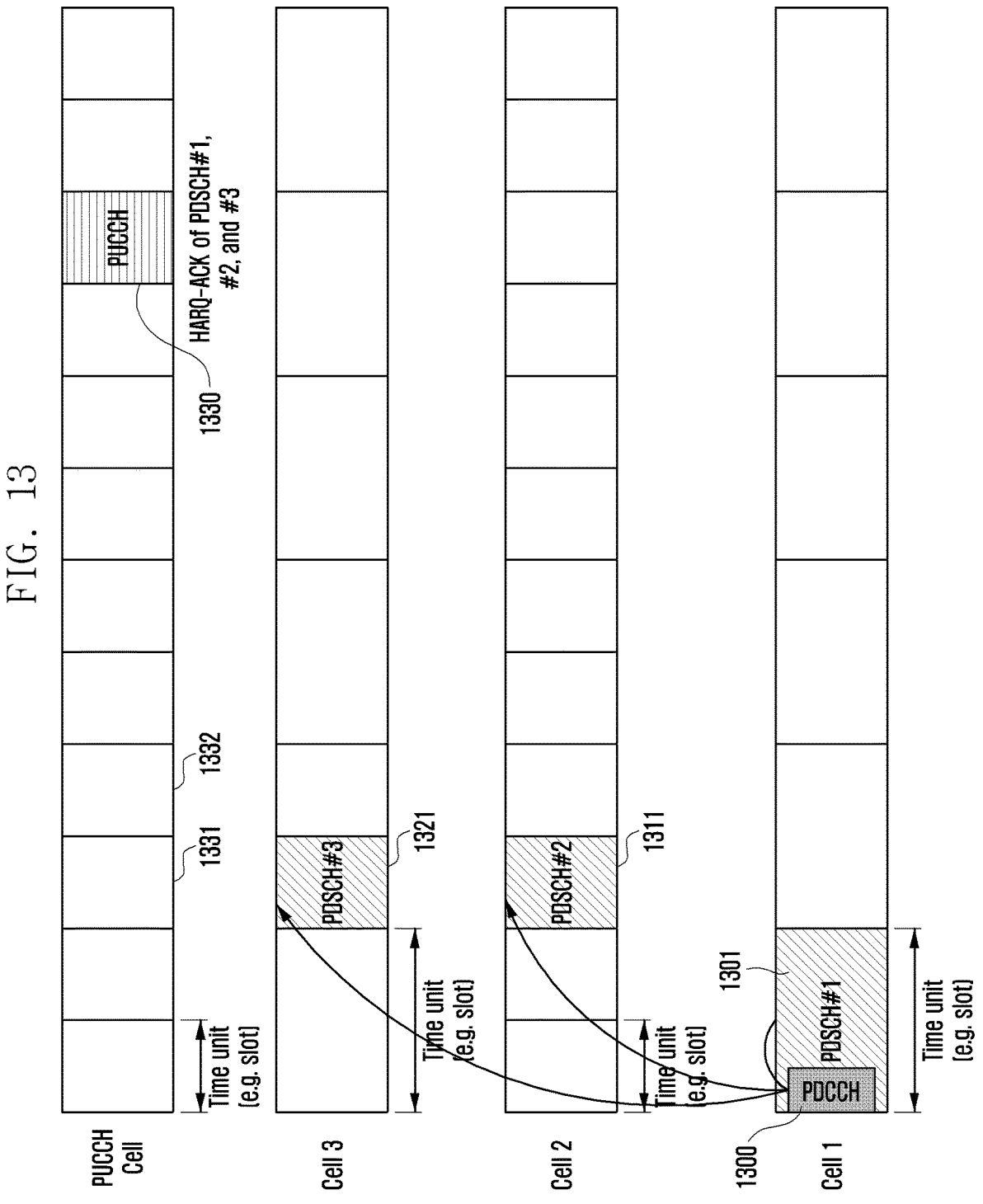
FIG. 13 illustrates HARQ-ACK transmission at the time of receiving multi-cell scheduling according to an embodiment of the disclosure.

FIG. 13 illustrates HARQ-ACK transmission at the time of receiving multi-cell scheduling according to an embodiment of the disclosure.

However, in this first embodiment, the UE may not be able to select one PDSCH that ends last. For example, referring to FIG. 13, a UE may receive a PDCCH 1300 that schedules PDSCH #1 1301 of a first cell, PDSCH #2 1311 of a second cell, and PDSCH #3 1321 of a third cell. HARQ-ACK information for the PDSCH #1 1301, PDSCH #2 1311, and PDSCH #3 1321 may be transmitted through a PUCCH 1330. Here, PDSCH #2 1311 of the second cell and PDSCH #3 1321 of the third cell may end at the same time point. For reference, it is assumed here that PDSCH #2 occupies symbols 0 to 13 having a subcarrier spacing of 30 kHz, and PDSCH #3 occupies symbols 0 to symbol 6 having a subcarrier spacing of 15 kHz. Therefore, both PDSCHs may end at the same time point.

If the reference PUCCH slot is determined based on PDSCH #2, a third slot 1331 of a PUCCH cell overlapping the slot of PDSCH #2 may be determined as the reference PUCCH slot. In case that the reference PUCCH slot is determined based on PDSCH #3, a temporally latest slot 1332 among the two slots 1331 and 1332 of a PUCCH cell overlapping the slot of PDSCH #3 may be determined as the reference PUCCH slot. Accordingly, when two PDSCHs that end at the same time have different subcarrier spacings, different reference PUCCH slots may be determined. Therefore, the UE may still have a problem in determining the reference PUCCH slot.

If there are two or more PDSCHs that end at the same time, the UE should select one of them. To this end, the UE may apply one of the following methods. Subcarrier spacing of PDSCHs that end at the same time may be different from each other.

In the first embodiment, when different timing advance (TA) is configured between different cells, the TA value may be additionally considered. That is, when different TA values are configured in cells of two PDSCHs that end at the same time, the UE may determine a PDSCH that ends later by considering the TA value. For reference, although the TA value is used for uplink transmission, the TA value is determined by a transmission delay between a base station and a UE, and thus the UE may determine a later PDSCH based on the TA value.

As a second embodiment, a reference uplink slot may be determined based on a PDSCH scheduled according to scheduling information configured last.

Multiple pieces of scheduling information may be configured in each row of a TDRA table. In addition, the multiple pieces of scheduling information may indicate PDSCH scheduling information of each of multiple cells. When the UE is configured with multiple pieces of PDSCH scheduling information in one row, they may be configured in order. That is, for example, when two pieces of scheduling information are configured in one row, first scheduling information may be configured first, and then second scheduling information may be configured. Therefore, the UE may determine which scheduling information among the pieces of scheduling information is the latest scheduling information.

The UE may determine a reference PUCCH slot based on the latest scheduling information. That is, if the second scheduling information among the first scheduling information and the second scheduling information is configured later, the UE may determine, as the reference PUCCH slot, the latest slot of uplink slots overlapping a slot of a PDSCH scheduled based on the second scheduling information.

For reference, a PDSCH scheduled by the first scheduling information may end later than a PDSCH scheduled by the second scheduling information. That is, the scheduling information configured first may not schedule the PDSCH first in time. In this case, since the UE determines a reference PUCCH slot based on a slot of a PDSCH that ends earlier, the reference PUCCH slot may be located before a PDSCH that ends last in time. That is, when a value of K1=0 is indicated, since a slot in which a PUCCH is transmitted is located before a PDSCH, HARQ-ACK of the PDSCH may not be transmitted to the PUCCH. Therefore, the UE may expect to receive an indication of a PUCCH slot that does not precede the last PDSCH. That is, a PUCCH slot corresponding to K1 that can be received by the UE should be a slot that does not end later than the last PDSCH. Therefore, the UE may expect not to receive the K1 value indicating the PUCCH slot as the slot preceding the last PDSCH, and the K1 value may not be considered at the time of generating HARQ-ACK corresponding to the K1 value. For example, at the time of generating a Type-1 HARQ-ACK codebook, the HARQ-ACK of the K1 value may not be included in the Type-1 HARQ-ACK codebook.

As a third embodiment, a reference uplink slot may be determined based on a PDSCH scheduled for a cell of a specific subcarrier spacing.

In the previous example, a problem has occurred in case that two or more PDSCHs that end at the same time are included in cells having different subcarrier spacings. Therefore, this problem may be solved when a reference uplink slot is determined based on a cell having one subcarrier spacing.

In the third embodiment of the disclosure, one subcarrier spacing may be selected. Here, a method of selecting the subcarrier spacing may correspond to at least one of the following.

As a first method, the highest subcarrier spacing may be selected. That is, when single DCI schedules multiple PDSCHs, a UE may determine a PDSCH scheduled for a cell having the highest subcarrier spacing among subcarrier spacings of a cell for which the PDSCH is scheduled. The UE may determine a reference uplink slot based on a slot of the PDSCH scheduled for the cell having the highest subcarrier spacing.

As a second method, the lowest subcarrier spacing may be selected. That is, when single DCI schedules multiple PDSCHs, the UE may determine a PDSCH scheduled for a cell having the lowest subcarrier spacing among subcarrier spacings of the cell for which the PDSCH is scheduled. The UE may determine a reference uplink slot based on a slot of the PDSCH scheduled for the cell having the lowest subcarrier spacing.

As a third method, when there are two or more PDSCHs that end at the same time, the highest subcarrier spacing may be selected. That is, when single DCI schedules multiple PDSCHs, the UE may determine a PDSCH that ends last among the PDSCHs. Here, when one PDSCH that ends last is determined, the UE may determine a reference uplink slot based on a slot of the PDSCH. When it is determined that the number of PDSCHs that end last is two or more and the subcarrier spacings of the two or more PDSCHs are different, the UE may determine the PDSCH scheduled for the cell having the highest subcarrier spacing among the subcarrier spacings, and may determine the reference uplink slot based on a slot of the PDSCH scheduled for the cell having the highest subcarrier spacing.

As a fourth method, when there are two or more PDSCHs that end at the same time, the lowest subcarrier spacing may be selected. That is, when single DCI schedules multiple PDSCHs, the UE may determine a PDSCH that ends last among the PDSCHs. Here, when one PDSCH that ends last is determined, the UE may determine a reference uplink slot based on the slot of the PDSCH. When it is determined that the number of PDSCHs that end last is two or more and the subcarrier spacings of the two or more PDSCHs are different, the UE may determine a PDSCH scheduled for a cell having the lowest subcarrier spacing among the subcarrier spacings, and may determine the reference uplink slot based on a slot of the PDSCH scheduled for the cell having the lowest subcarrier spacing.

As a fifth method, a base station may configure a specific subcarrier spacing. In addition, the base station may determine a reference uplink slot based on a PDSCH scheduled for a cell of the subcarrier spacing.

As a sixth method, a UE may determine a reference PUCCH slot based on a PDSCH received in a cell having the same subcarrier spacing as the subcarrier spacing of a cell in which a PUCCH is transmitted.

As a seventh method, a UE may determine a reference PUCCH slot based on a PDSCH received in a cell having the same subcarrier spacing as the subcarrier spacing of a cell in which a PDCCH is transmitted. That is, this method prioritizes the subcarrier spacing of the cell having received the PDCCH over other subcarrier spacings.

In the first to seventh methods, the UE may determine two or more PDSCHs. For example, in the first method, in case that multiple cells having the highest subcarrier spacing exist and a PDSCH is scheduled for each of the cells, the UE should determine a reference uplink slot based on the multiple PDSCHs. In order to solve this problem, the first embodiment, the second embodiment, the fourth embodiment, and the fifth embodiment may be employed.

As the fourth embodiment, a reference uplink slot may be determined based on a PDSCH scheduled for a cell having a specific cell index.

The above problem may be solved by determining a reference uplink slot based on a specific cell because only one PDSCH is scheduled for one cell.

In the fourth embodiment of the disclosure, one cell may be selected. Here, a method of selecting a cell may correspond to at least one of the followings.

As a first method, a cell having the lowest index may be selected. That is, when single DCI schedules multiple PDSCHs, a UE may determine a PDSCH scheduled for a cell having the lowest index among cell indices for which the PDSCH is scheduled. The UE may determine a reference uplink slot based on a slot of the PDSCH scheduled for the cell having the lowest index.

As a second method, a cell having the highest index may be selected. That is, when single DCI schedules multiple PDSCHs, a UE may determine a PDSCH scheduled for a cell having the highest index among cell indices for which the PDSCH is scheduled. The UE may determine a reference uplink slot based on a slot of the PDSCH scheduled for the cell having the highest index.

As a third method, when there are two or more PDSCHs that end at the same time, a cell having the lowest index may be selected. That is, when single DCI schedules multiple PDSCHs, the UE may determine a PDSCH that ends last among the PDSCHs. Here, when one PDSCH that ends last is determined, the UE may determine a reference uplink slot based on the slot of the PDSCH. When it is determined that the number of PDSCHs that end last is two or more, the UE may determine a PDSCH scheduled for a cell having the lowest index among the two or more PDSCHs, and may determine a reference uplink slot based on the slot of the PDSCH scheduled for the cell having the lowest index. This process may be used when the subcarrier spacings of the two or more PDSCHs are different.

As a fourth method, when there are two or more PDSCHs that end at the same time, a cell having the highest index may be selected. That is, when single DCI schedules multiple PDSCHs, a UE may determine a PDSCH that ends last among the PDSCHs. Here, when one PDSCH that ends last is determined, the UE may determine a reference uplink slot based on the slot of the PDSCH. When it is determined that the number of PDSCHs that end last is two or more, the UE may determine a PDSCH scheduled for a cell having the highest index among the two or more PDSCHs, and may determine a reference uplink slot based on the slot of the PDSCH scheduled for the cell having the highest index. This process may be used when the subcarrier spacings of the two or more PDSCHs are different.

As a fifth method, a base station may configure the index of a specific cell. In addition, a reference uplink slot may be determined based on a PDSCH scheduled for the cell of the index.

As a sixth method, a UE may determine a reference PUCCH slot based on a PDSCH received in a cell in which a PDCCH is transmitted. That is, this method prioritizes the cell having received the PDCCH over other cells.

[Type-1 HARQ-ACK Codebook Design Method]

In the NR system, Type-1 HARQ-ACK codebook is also called a semi-static HARQ-ACK codebook.

The following description relates to a situation in which the number of PUCCHs through which a UE can transmit HARQ-ACK information is limited to one within one time unit (e.g., a slot, a sub-slot, a mini-slot). Unless otherwise specified, the time unit is described as a slot, but the time unit may be extended to a sub-slot, a mini-slot, and the like.

The UE may be configured with a semi-static HARQ-ACK codebook from a base station. Here, the configuration may be configured via a higher layer signal (e.g., an RRC signal). The UE may receive a DCI format from the base station. The UE may transmit HARQ-ACK information of PDSCH, SPS PDSCH release, or Scell dormancy indication, which are scheduled by the DCI format, in a slot indicated by the value of a PDSCH-to-HARQ_feedback timing indicator field in the DCI format. In case that the UE is indicated to transmit multiple pieces of HARQ-ACK information in one slot, the UE may generate the HARQ-ACK information as a HARQ-ACK codebook according to a predetermined rule and transmit the HARQ-ACK codebook via one PUCCH in the slot.

A rule for generating a more specific semi-static HARQ-ACK codebook is as follows.

A UE may report an HARQ-ACK information bit value, as NACK, in the HARQ-ACK codebook in a slot that is not indicated by the PDSCH-to-HARQ_feedback timing indicator field in a DCI format.

In case that the UE reports only HARQ-ACK information for one SPS PDSCH release or one PDSCH reception in all $M_{A,c}$ cases for candidate PDSCH reception, and the report is scheduled by a DCI format 1_0 including information indicating that a counter DACI field in a Pcell indicates 1, the UE may determine one HARQ-ACK codebook for the SPS PDSCH release or the PDSCH reception.

Oher than the above case, an HARQ-ACK codebook determination method according to a method described in detail below is employed.

In the disclosure, for convenience, the value of PDSCH-to-HARQ_feedbak timing indicator will be referred to as a K1 value. The UE may be configured with multiple K1 values, and the multiple K1 values are collectively called a K1 set.

A set of PDSCH reception candidate occasions in a serving cell c is referred to as $M_{A,c}$, and a method for obtaining $M_{A,c}$ will be described later.

<Type-1 HARQ-ACK Codebook for Single PDSCH Reception>

First, it is assumed that a PDSCH scheduled by a DCI format is received in one slot. This may include a case where pdsch-AggregationFactor is not configured from a higher layer.

At the time of transmitting a PUCCH or PUSCH carrying a Type-1 HARQ-ACK codebook in slot n, a pseudo-code for this is as follows.

[Pseudo-Code 1: (No PDSCH Repeated Reception)]

Preparation stage: set R is a set of pieces of scheduling information (information of a slot to which a PDSCH is mapped (hereinafter referred to as a value of K0), and start symbol and length information (hereinafter referred to as starting and length value (SLIV)) configured in a time domain resource assignment (TDRA) table. In case that the UE monitors one or more DCI formats and the DCI formats use different TDRA tables, the set R is generated based on all TDRA tables.

Stage 0: Initialize $M_{A,c}$ as an empty set. Initialize k to 0. Initialize j to 0.

Stage 1: Select a K1 value having the kth (k=0) largest value from a configured K1 set (for example, if k=0, the largest K1 value is selected from the K1 set, and if k=1, the second largest K1 value is selected from the K1 set). The K1 values is referred to as $K_{1,k}$.

Stage 2: If a symbol corresponding to the start symbol and length information (SLIV) belonging to each row of the set R in a slot (slot $(n-K_{1,k})$) corresponding to the value of $K_{1,k}$ overlaps a symbol configured as an uplink symbol in a higher layer, the row may be excluded from the set R.

Stage 3-1 (in case that a UE has only UE capability capable of receiving a maximum of one unicast PDSCH in one slot): When the determined set R is not an empty set, j is added as a new PDSCH reception candidate occasion to a set $M_{A,c}$. Upon receiving one of the PDSCH candidates of set R, the UE may place the HARQ-ACK of the one PDSCH in the new PDSCH candidate occasion j. Increase j by 1.

Stage 3-2 (in case that a UE has UE capability capable of receiving two or more unicast PDSCHs in one slot): j is added as a new PDSCH reception candidate occasion to the set $M_{A,c}$ for an SLIV that ends first in the determined set R and SLIVs overlapping in time with the SLIV. Upon receiving one of the PDSCH candidates having the SLIV, the UE may place the HARQ-ACK of the one PDSCH in the new PDSCH candidate occasion j. Increase j by 1. Exclude the SLIVs from set R. Stage 3-2 is repeated until set R becomes an empty set.

Stage 4: Increase k by 1. If k is less than the cardinality of the K1 set, start again from stage 2, and if k is equal to or greater than the cardinality of the K1 set, pseudo-code 1 is ended.

[Pseudo-Code 1 End]

Figure 14A:
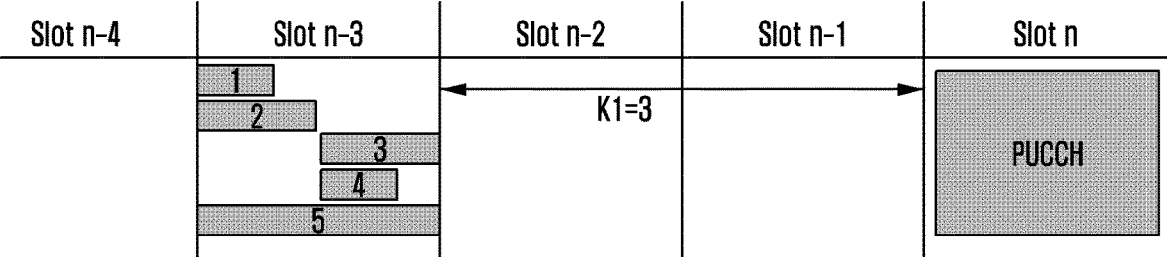
FIGS. 14A, 14B, and 14C illustrate an example for explaining a pseudo-code for generating a HARQ-ACK codebook for a PDSCH received in one slot according to various embodiments of the disclosure.
Figure 14B:
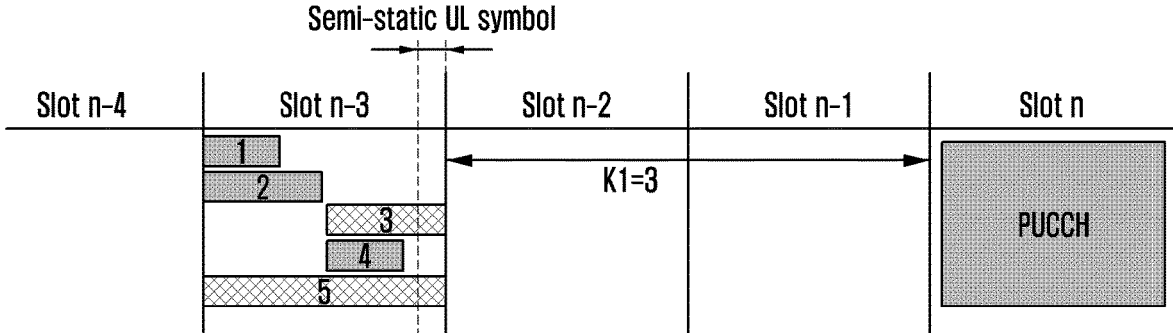
Figure 14C:
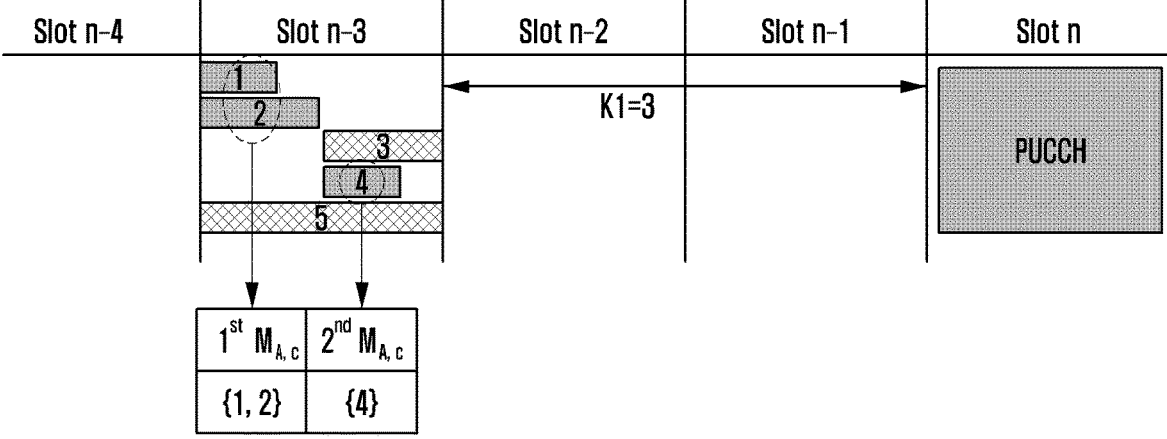

FIGS. 14A, 14B, and 14C is an example for explaining a pseudo-code for generating a HARQ-ACK codebook for a PDSCH received in one slot according to various embodiments of the disclosure.

Referring to FIGS. 14A to 14C, the aforementioned pseudo code 1 will be described. PUCCH transmission including HARQ-ACK information may be performed in slot n. For example, the HARQ-ACK information may be generated in the form of a Type-1 HARQ-ACK codebook.

It is assumed that K1=3 is configured as a K1 value for a UE. In addition, the TDRA table of the DCI format monitored by the UE may include 5 rows as shown in Table 27. For reference, a value of K0, a value of SLIV, or a PDSCH mapping type value may be configured in each row, but the PDSCH mapping type is omitted for convenience of explanation.

TABLE 27

| Index | K0 | SLIV (S, L) |
|-------|-----|--------------|
| 1 | 0 | SLIV 1 (0, 4) |
| 2 | 0 | SLIV 2 (0, 7) |
| 3 | 0 | SLIV 3 (7, 7) |
| 4 | 0 | SLIV 4 (7, 4) |
| 5 | 0 | SLIV 5 (0, 14) |

The UE may include each row of the TDRA table of Table 27 in the set R according to the preparation stage in the pseudo code 1. FIG. 14A shows SLIVs according to each row of Table 27. The UE may determine a PDSCH reception candidate occasion $M_{A,c}$ based on the K1 value and the set R. Referring to FIGS. 14A to 14C, pseudo code 1 may be interpreted as follows. In the following description, it is assumed that the UE has UE capability capable of receiving two or more unicast PDSCHs in one slot.

Stage 0: Initialize $M_{A,c}$ as an empty set. Initialize k to 0. Initialize j to 0.

Stage 1: Select a K1 value having the kth (k=0) largest value from a configured K1 set. The K1 has a value of $K_{1,0}$=3.

Stage 2: If a symbol corresponding to the start symbol and length information (SLIV) belonging to each row of set R in slot $(n-3)$ (slot $(n-K_{1,0})$=slot $(n-3)$) overlaps a symbol configured as an uplink symbol in a higher layer, the row may be excluded from set R. Referring to FIG. 14B, when some symbols of slot $(n-3)$ are semi-static UL symbols configured via a higher layer, rows including SLIVs overlapping with the symbols are excluded from set R. Referring to FIG. 14B, the last 2 symbols of slot $(n-3)$ may be semi-static uplink symbols. In this case, SLIV (7,7) of row 3 and SLIV (0,14) of row 5 overlap the semi-static uplink symbols, and thus SLIV (7,7) of row 3 and SLIV (0,14) of row 5 may be excluded from set R. Set R may include rows 1, 2, and 4.

Stage 3-2 (in case that a UE has UE capability capable of receiving two or more unicast PDSCHs in one slot):

j (j=0) is added as a new PDSCH reception candidate occasion to a set $M_{A,c}$ for an SLIV that ends first in the determined set R and SLIVs overlapping in time with the SLIV. Here, the SLIV that ends first is SLIV (0,4) of row 1, and the SLIV overlapping the SLIV is SLIV (0,7) of row 2. Therefore, when j (j=0) is added to $M_{A,c}$ and the UE receives a PDSCH scheduled to SLIV (0,4) in row 1 or SLIV (0,7) in row 2, the UE may include HARQ-ACK of the PDSCH in a position corresponding to a first (j=0) $M_{A,c}$ in the type-1 HARQ-ACK codebook. J is increased by 1 so that j has the value of 1 (j=1). The SLIVs of rows 1 and 2 are excluded from the set R, and thus the set R may be determined as {4} (R={4}). Since the set R is not an empty set, stage 3-2 is repeated.

j (j=1) is added as a new PDSCH reception candidate occasion to the set $M_{A,c}$ for the SLIV that ends first in the determined set R and the SLIVs overlapping in time with the SLIV. Here, the SLIV that ends first is SLIV (7,4) of row 4, and there is no SLIV overlapping the SLIV. Therefore, when j (j=1) is added to $M_{A,c}$ and the UE receives a PDSCH scheduled to SLIV (7,4) of row 4, the UE may include HARQ-ACK of the PDSCH in a position corresponding to a second (j=1) $M_{A,c}$ in the type-1 HARQ-ACK codebook. J is increased by 1 so that j has the value of 1 (j=1). The SLIV in row 4 above is excluded from the set R, and R becomes an empty set. Thus, stage 3-2 may be ended (I of FIGS. 14A to 14C).

Stage 4: k is increased by 1 and thus k has the value of 1 (k=1). Since k=1 is equal to 1, the cardinality of the K1 set, pseudo-code 1 ends.

Therefore, referring to FIGS. 14A to 14C, the UE may determine two PDSCH reception candidate occasions (=0 and j=1 $M_{A,c}$). The size of the Type-1 HARQ-ACK codebook may be determined according to the number of PDSCH reception candidate occasions. The actual number of bits per PDSCH reception candidate occasion may be determined according to the configuration such as the number of transport blocks included in each PDSCH, the number of code block groups (CBGs) included in each PDSCH, or spatial bundling.

<Type-1 HARQ-ACK Codebook for Single PDSCH Reception and Repeated PDSCH Reception>

A UE may receive a PDSCH carrying the same transport block (TB) in multiple slots from a base station. This may include a case in which pdsch-AggregationFactor is configured from a higher layer. For reference, when the UE is configured with the pdsch-AggregationFactor, a PDSCH scheduled for a first DCI format may be repeatedly received in multiple slots according to the pdsch-AggregationFactor, but a PDSCH scheduled for a second DCI format is may be received in one slot. Here, the first DCI format may be called non-fallback DCI or may be called a DCI format 1_1 or DCI format 1_2. The second DCI format may be called fallback DCI or may be called a DCI format 1_0.

Even if PDSCHs are received in the multiple slots, the PDSCHs received in the multiple slots transmit the same TB, and thus a UE may transmit HARQ-ACK information for the TB to a base station. In other words, the UE may not transmit respective pieces of HARQ-ACK information of the PDSCHs received in each slot to the base station.

When the pdsch-AggregationFactor is configured, the UE may generate a type-1 HARQ-ACK codebook assuming that a PDSCH is received in multiple slots. Here, the UE assumes that a PDSCH scheduled in the second DCI format is received in only one slot, but a PDSCH is received in multiple slots at the time of generating a type-1 HARQ-ACK codebook, like a PDSCH scheduled in the first DCI format.

At the time of transmitting a PUCCH or PUSCH carrying a Type-1 HARQ-ACK codebook in slot n, a pseudo-code for this is as follows.

[Pseudo-Code 2: (PDSCH Repeated Reception Configuration)]

Preparation stage: set R is a set of pieces of scheduling information (information of a slot to which a PDSCH is mapped (hereinafter referred to as a value of K0), and start symbol and length information (hereinafter referred to as starting and length value (SLIV)) configured in a time domain resource assignment (TDRA) table. In case that a UE monitors one or more DCI formats and the DCI formats use different TDRA tables, the set R is generated based on all TDRA tables. $N_{PDSCH}^{max}$ may be configured to be a value of pdsch-AggregationFactor.

Stage 0: Initialize $M_{A,c}$ as an empty set. Initialize k to 0. Initialize j to 0.

Stage 1: Select a K1 value having the kth (k=0) largest value from a configured K1 set (for example, if k=0, the largest K1 value is selected from the K1 set, and if k=1, the second largest K1 value is selected from the K1 set). The K1 values is referred to as $K_{1,k}$.

Stage 2: If a symbol corresponding to the start symbol and length information (SLIV) belonging to each row of the set R in each of slots corresponding to previous $N_{PDSCH}^{max}$ slots from a slot (slot $(n-K_{1,k})$) corresponding to the value of $K_{1,k}$, overlaps a symbol configured as an uplink symbol in a higher layer, the row may be excluded from the set R.

Stage 3-1 (in case that a UE has only UE capability capable of receiving a maximum of one unicast PDSCH in one slot): When the determined set R is not an empty set, j is added as a new PDSCH reception candidate occasion to a set $M_{A,c}$. Upon receiving one of the PDSCH candidates of set R (regardless of whether a PDSCH candidate is received repeatedly in multiple slots or received in one slot, if a slot last receiving the PDSCH candidate is a slot corresponding to a value of $K_{1,k}$ (slot $(n-K_{1,k})$, the UE may place the HARQ-ACK of the PDSCH in the new PDSCH candidate occasion j. Increase j by 1.

Stage 3-2 (in case that a UE has UE capability capable of receiving two or more unicast PDSCHs in one slot): j is added as a new PDSCH reception candidate occasion to the set $M_{A,c}$ for an SLIV that ends first in the determined set R and SLIVs overlapping in time with the SLIV. Upon receiving one of the PDSCH candidates having the SLIV (regardless of whether a PDSCH candidate is received repeatedly in multiple slots or received in one slot, if a slot last receiving the PDSCH candidate is a slot corresponding to a value of $K_{1,k}$ (slot $(n-K_{1,k})$, the UE may place the HARQ-ACK of the PDSCH in the new PDSCH candidate occasion j. Increase j by 1. Exclude the SLIVs from set R. Stage 3-2 is repeated until set R becomes an empty set.

Stage 4: Increase k by 1. If k is less than the cardinality
of the K1 set, start again from stage 2, and if k is equal
to or greater than the cardinality of the K1 set, pseudo-
code 2 is ended.

[Pseudo-Code 2 End]

Figure 15A:
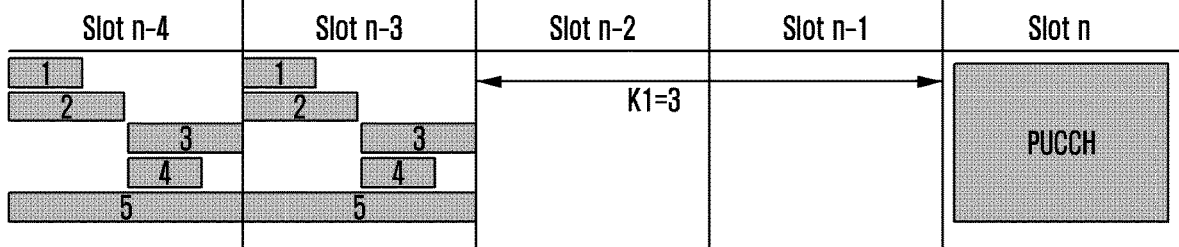
FIGS. 15A, 15B, and 15C illustrate an example for explaining a pseudo-code for generating a HARQ-ACK codebook for a PDSCH repeatedly received in multiple slots according to various embodiments of the disclosure.
Figure 15B:
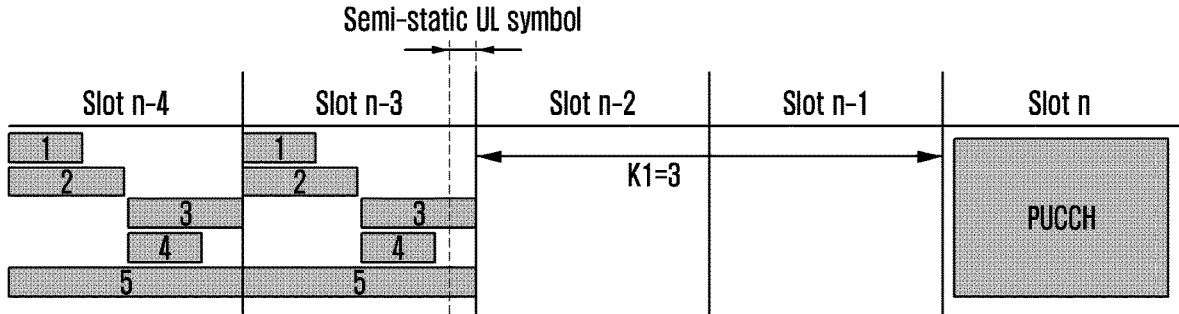
Figure 15C:
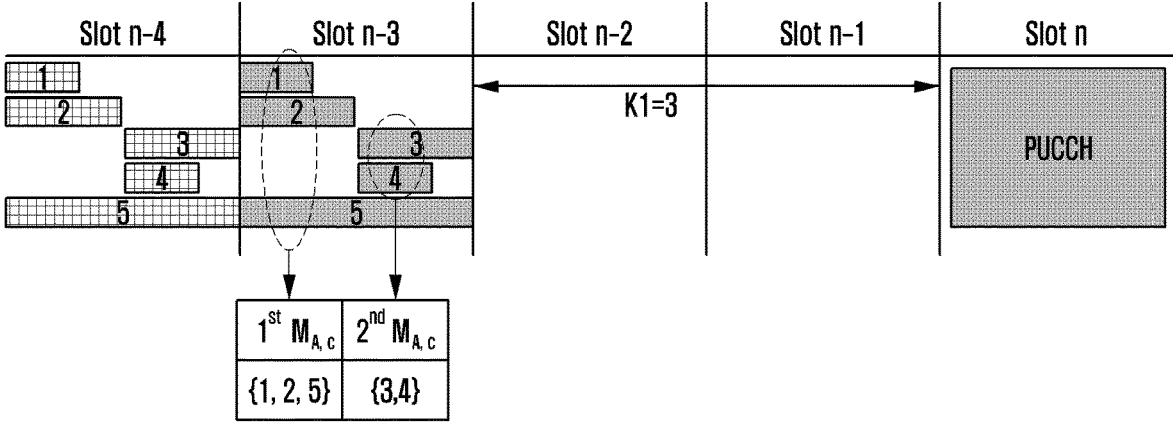

FIGS. 15A, 15B, and 15C is an example for explaining a
pseudo-code for generating a HARQ-ACK codebook for a
PDSCH repeatedly received in multiple slots according to
various embodiments of the disclosure.

Referring to FIGS. 15A to 15C, the aforementioned
pseudo code 2 will be described. PUCCH transmission
including HARQ-ACK information may be performed in a
slot n. For example, the HARQ-ACK information may be
generated in the form of a Type-1 HARQ-ACK codebook.

It is assumed that K1=3 is configured as a K1 value for a
UE. In addition, a TDRA table of a DCI format monitored
by the UE may include 5 rows as shown in Table 27. The UE
may include each row of the TDRA table of Table 27 in a set
R according to a preparation stage. For reference, in Table
27, some rows may belong to a TDRA table of a first DCI
format, and other rows may belong to a TDRA table of a
second DCI format. For example, rows of indices 1, 2, and
3 may belong to the TDRA table of the first DCI format, and
rows of indices 4 and 5 may belong to the TDRA table of the
second DCI format. However, the above set R is a union of
all rows regardless of a DCI format to which they belong.

Referring to FIG. 15A, it is assumed that $N_{PDSCH}^{max}$ is 2.
FIG. 15A shows SLIVs according to each row of Table 27.
Here, since it is assumed that $N_{PDSCH}^{max}$ is 2 at the time of
generating the Type-1 HARQ-ACK codebook, a PDSCH
may be considered to be repeatedly received in slot (n−3)
and slot (n−4).

The UE may determine a PDSCH reception candidate
occasion $M_{A,c}$ based on the K1 value, the set R, and
$N_{PDSCH}^{max}$. Referring to FIGS. 15A to 15C, pseudo code 2
may be interpreted as follows. In the following description,
it is assumed that the UE has UE capability capable of
receiving two or more unicast PDSCHs in one slot.

Stage 0: Initialize $M_{A,c}$ as an empty set. Initialize k to 0.
Initialize j to 0.

Stage 1: Select a K1 value having the kth (k=0) largest
value from a configured K1 set. The K1 has a value of
$K_{1,0}=3$.

Stage 2: If a symbol corresponding to the start symbol and
length information (SLIV) belonging to each row of set
R in each of two ($N_{PDSCH}^{max}=2$) previous slots (that is,
slot (n−3) and slot (n−4)) from slot (n−3) (slot
$(n-K_{1,0})$=slot (n−3)), overlaps a symbol configured as
an uplink symbol in a higher layer, the rows may be
excluded from set R. In other words, only in case that
a symbol corresponding to the start symbol and length
information (SLIV) belonging to each row of set R
overlaps, commonly (both) in the slot (n−3) and the slot
(n−4), with a symbol configured as an uplink symbol in
a higher layer, the corresponding row may be excluded
from the set R. Referring to FIG. 15B, a case, in which
the last 2 symbols of the slot (n−3) are configured as
semi-static uplink symbols, is assumed. In this case,
SLIV (7,7) of row 3 and SLIV (0,14) of row 5 overlap
the semi-static uplink symbols in the slot (n−3) but do
not overlap the semi-static uplink symbols in the slot
(n−4), and thus the corresponding row may not be
excluded from set R. Therefore, the set R may include
rows 1, 2, 3, 4, and 5.

Stage 3-2 (in case that a UE has UE capability capable of
receiving two or more unicast PDSCHs in one slot):

j (j=0) is added as a new PDSCH reception candidate
occasion to a set $M_{A,c}$ for an SLIV that ends first in the
determined set R and SLIVs overlapping in time with the
SLIV. Here, the SLIV that ends first is SLIV (0,4) of row 1,
and the SLIV overlapping the SLIV is SLIV (0,7) of row 2
and SLIV (0,14) of row 5. Therefore, when j (j=0) is added
to $M_{A,c}$ and the UE receives a PDSCH scheduled to SLIV
(0,4) of row 1, SLIV (0,7) of row 2, or SLIV (0,14) of row
5, the UE may include HARQ-ACK of the PDSCH in a
position corresponding to a first (j=0) $M_{A,c}$ in the type-1
HARQ-ACK codebook. J is increased by 1 so that j has the
value of 1 (j=1). The SLIVs of rows 1, 2, and 5 are excluded
from the set R, and thus the set R may be determined as
{3,4} (R={3,4}). Since the set R is not an empty set, stage
3-2 is repeated.

j (j=1) is added as a new PDSCH reception candidate
occasion to the set $M_{A,c}$ for the SLIV that ends first in the
determined set R and the SLIVs overlapping in time with the
SLIV. Here, the SLIV that ends first is SLIV (7,4) of row 4,
and SLIV (7,7) of row 3 overlaps the SLIV. Therefore, when
j (j=1) is added to $M_{A,c}$ and the UE receives a PDSCH
scheduled to SLIV (7,7) of row 3 or SLIV (7,4) of row 4, the
UE may include HARQ-ACK of the PDSCH in a position
corresponding to a second (j=1) $M_{A,c}$ of the type-1 HARQ-
ACK codebook. J is increased by 1 so that j has the value of
1 (j=1). The SLIVs of row 3 and row 4 above are excluded
from the set R, and R becomes an empty set. Thus, stage 3-2
may be ended (I of FIGS. 15A to 15C).

Stage 4: k is increased by 1 and thus k has the value of 1
(k=1). Since k=1 is equal to 1, the cardinality of the K1
set, pseudo-code 2 ends.

Therefore, referring to FIGS. 15A to 15C, the UE may
determine two PDSCH reception candidate occasions (=0
and j=1 $M_{A,c}$). The size of the Type-1 HARQ-ACK code-
book may be determined according to the number of
PDSCH reception candidate occasions. The actual number
of bits per PDSCH reception candidate occasion may be
determined according to the configuration such as the num-
ber of transport blocks included in each PDSCH, the number
of code block groups (CBGs) included in each PDSCH, or
spatial bundling.

In comparison with pseudo-code 1 (no PDSCH repetition
reception), the biggest difference of pseudo-code 2 (PDSCH
repetition reception configuration) is SLIVs excluded from
set R according to stage 2. Referring to FIG. 14B, in case
that a UE does not repeatedly receive a PDSCH, the UE may
receive the PDSCH only in one slot (n−3), and thus when an
SLIV of the PDSCH in the one slot overlaps a semi-static
uplink symbol, the SLIV may be excluded from set R. On
the other hand, referring to FIG. 15B, in case that a UE
repeatedly receives a PDSCH, the UE may receive the
PDSCH in multiple slots (e.g., slot (n−3) and slot (n−4)), and
thus when an SLIV of the PDSCH does not overlap the
semi-static uplink symbol in at least one slot among the
multiple slots, the SLIV may not be excluded from set R. In
other words, when the SLIV of the PDSCH overlaps the
semi-static uplink symbol in all slots, the SLIV may be
excluded from the set R. Therefore, in contrast to pseudo-
code 1, pseudo-code 2 may include more PDSCH reception
candidate occasions.

It has been described as that some indices in Table 27 may
belong to a TDRA table of a second DCI format. A PDSCH
scheduled by the second DCI format may be received in one
slot. However, a Type-1 HARQ-ACK codebook may be
generated assuming that a UE repeatedly receives all rows in
$N_{PDSCH}^{max}$ slots, as scheduled by the first DCI format. As
mentioned above, in a case of assuming repeated reception, since more PDSCH reception candidate occasions may be included, HARQ-ACK information of PDSCHs scheduled by the second PDSCH format may also be included in the Type-1 HARQ-ACK codebook.

The above pseudo-codes 1 and 2 are described in 9.1.2.1 of the 3GPP standard document TS38.213. In this disclosure, the pseudo-code of v16.6.0 of the standard document is described as a standard for explanation. Pseudo-code is shown in Table 28.

<Type-1 HARQ-ACK Codebook for Multi-Cell Multi-PDSCH Reception>

A UE may be configured with multi-cell multi-PDSCH scheduling. That is, the UE may be configured with a TDRA table having a row composed of multiple pieces of scheduling information. The detailed multi-cell multi-PDSCH scheduling has been described above.

The UE may receive PDSCHs carrying different TBs in multiple cells according to multi-cell multi-PDSCH sched-

TABLE 28

[TS38.213 v16.6.0 pseudo-code]
Set j = 0 - index of occasion for candidate PDSCH reception or SPS PDSCH release
Set B = Ø
Set $M_{A,c}$ = Ø
Set $\ell$ ($K_1$) to the cardinality of set $K_1$
Set k = 0 - index of slot timing values $K_{1,k}$, in descending order of the slot timing values, in set $K_1$ for serving cell c
while k < $\ell$ ($K_1$)
   if mod ($n_U$ – $K_{1,k}$ + 1,max($2^{\mu_{UL}-\mu_{DL}}$, 1))= 0
     Set $n_D$ = 0 - index of a DL slot within an UL slot
     while $n_D$ < max ($2^{\mu_{UL}-\mu_{DL}}$,1)
       Set R to the set of rows
       Set $\ell$ (R) to the cardinality of R
       Set r = 0 - index of row in set R
       if slot $n_U$ starts at a same time as or after a slot for an active DL BWP change on serving cell c or an active UL BWP change on the PCell and slot
       $\lfloor(n_U – K_{1,k})\cdot 2^{\mu_{UL}-\mu_{DL}}\rfloor$+ $n_D$ is before the slot for the active DL BWP change on serving cell c or the active UL BWP change on the PCell
        $n_D$ = $n_D$ + 1;
       else
        while r < $\ell$ (R)
         if the UE is provided tdd-UL-DL-ConfigurationCommon, or tdd-UL-DL-ConfigurationDedicated and, for each slot from slot $\lfloor(n_U – K_{1,k})\cdot 2^{\mu_{UL}-\mu_{DL}}\rfloor$ + $n_D$ – $N_{PDSCH}^{repeat,max}$ + 1 to slot $\lfloor(n_U – K_{1,k})\cdot 2^{\mu_{UL}-\mu_{DL}}\rfloor$ + $n_D$, at least one symbol of the PDSCH time resource derived by row r is configured as UL where $K_{1,k}$ is the k-th slot timing value in set $K_1$,
          R = R\r ;
         else
          r = r + 1 ;
         end if
        end while
       if the UE does not indicate a capability to receive more than one unicast
        PDSCH per slot and R ≠ Ø,
        $M_{A,c}$ = $M_{A,c}$ ∪ j ;
        j = j + 1 ;
       else
        Set $\ell$ (R) to the cardinality of R
        Set m to the smallest last OFDM symbol index, as determined by the SLIV, among all rows of R
        while R ≠ Ø
         Set r = 0
         while r < $\ell$ (R)
          if S ≤ m for start OFDM symbol index S for row r
           $b_{r,k,n_D}$ = j ; - index of occasion for candidate PDSCH reception or SPS PDSCH release associated with row r
           R = R\r ;
           B = B∪$b_{r,k,n_D}$ ;
          else
           r = r + 1 ;
          end if
         end while
         $M_{A,c}$ = $M_{A,c}$ ∪ j;
         j = j + 1 ;
         Set m to the smallest last OFDM symbol index among all rows of R ;
        end while
       end if
       $n_D$ = $n_D$ + 1;
     end if
     end while
   end if
   k = k + 1 ;
end while In addition, the definition of the symbol of the above pseudo-code may be identified in 3GPP standard document TS38.213.

uling. Since the PDSCHs received in the multiple cells transmit different TBs, the UE may transmit HARQ-ACK information for each of the TBs to a base station. In other words, the UE should transmit each HARQ-ACK information of each of the PDSCHs received in each slot to the base station.

First, as shown in Table 29, a UE may be configured with a TDRA table having a row composed of multiple pieces of scheduling information. Table 29 is only an example to help understanding of the disclosure, and does not limit the technical scope of the disclosure. Accordingly, a TDRA table may be configured in which each row includes one piece of scheduling information or three or more pieces of scheduling information, or different rows include different numbers of scheduling information.

TABLE 29

| Index | First scheduling information | Second scheduling information |
|---|---|---|
| 1 | cell index 1__1 = 0, K0 1__1 = 1 SLIV 1__1 | cell index 1__2 = 1, K0 1__2 = 5 SLIV 1__2, |
| 2 | cell index 2__1 = 0 K0 2__1 = 2 SLIV 2__1 | cell index 2__2 = 1 K0 2__2 = 2 SLIV 2__2 |

Figure 16:
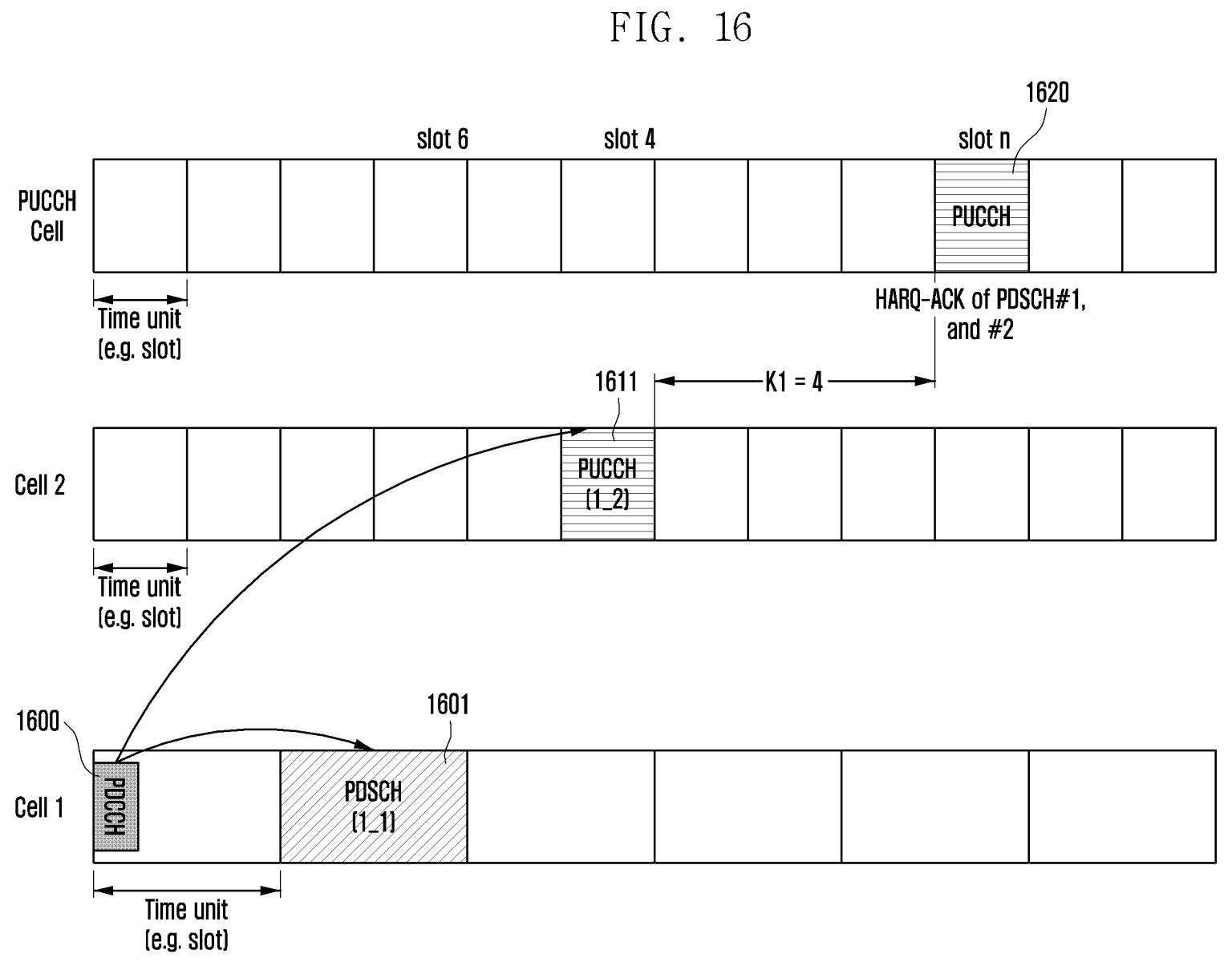

FIG. 16 is an example illustrating PDSCHs based on index 1 of a TDRA table including multiple pieces of scheduling information according to an embodiment of the disclosure. FIG. 16 shows SLIVs of PDSCHs that may be received according to index 1 of the TDRA table of Table 29 above. In the example of FIG. 16, a UE may receive a PDCCH 1600 for scheduling PDSCH 1_1 1601 and PDSCH 1_2 1611 according to index 1. For reference, X_Y in FIG. 16 may indicate an SLIV according to the Y-th scheduling information of the row index X of the TDRA table. Here, it is assumed that the value of K1 is 4 and the HARQ-ACK of the PDSCHs is transmitted in uplink slot n 1620. In addition, it is assumed that a reference PUCCH slot (a slot corresponding to the value of K1 (K1=0)) is determined based on the last received PDSCH. That is, the temporally latest slot among uplink slots overlapping with a slot of PDSCH 1_2 1611 may be referred to as a reference PUCCH slot. That is, a reference PUCCH slot corresponding to PDSCH 1_2 1611 of the second (last) scheduling information according to the TDRA table appears in slot (n−4) corresponding to a value of slot (n−K1). In addition, when a reference PUCCH slot is determined based on PDSCH 1_1 1601 of the first scheduling information, the reference PUCCH slot may appear in slot (n−6). Accordingly, when PDSCH 1_1 is scheduled by single-cell scheduling, the value of K1 corresponds to 6.

Figure 17:
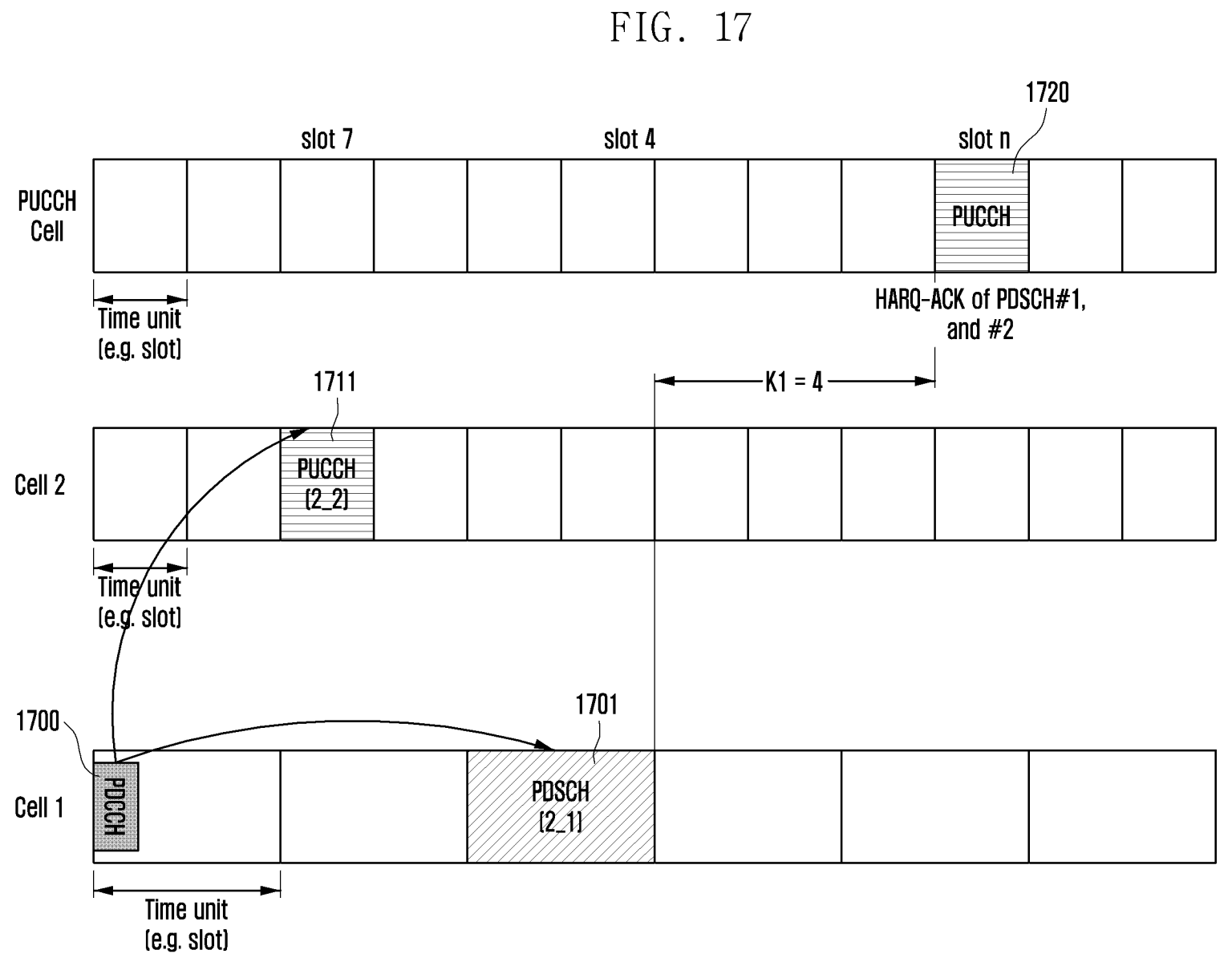

FIG. 17 is an example illustrating PDSCHs based on index 2 of a TDRA table including multiple pieces of scheduling information according to an embodiment of the disclosure. FIG. 17 shows SLIVs of PDSCHs that may be received according to index 2 of the TDRA table of Table 29 above. In the example of FIG. 17, a UE may receive a PDCCH 1700 for scheduling PDSCH 2_1 1701 and PDSCH 2_2 1711 according to index 2. For reference, X_Y in FIG. 17 may indicate an SLIV according to the Y-th scheduling information of the row index X of the TDRA table. Here, it is assumed that the value of K1 is 4 and the HARQ-ACK of the PDSCHs is transmitted in uplink slot n 1720. In addition, it is assumed that a reference PUCCH slot (a slot corresponding to the value of K1 (K1=0)) is determined based on the last received PDSCH. That is, the temporally latest slot among uplink slots overlapping with a slot of PDSCH 2_1 1701 may be referred to as a reference PUCCH slot. That is, a reference PUCCH slot corresponding to PDSCH 2_1 1701 of the first (last) scheduling information according to the TDRA table appears in slot (n−4) corresponding to a value of slot (n−K1). In addition, when a reference PUCCH slot is determined based on PDSCH 2_2 1711 of the second scheduling information, the reference PUCCH slot may appear in slot (n−7). Accordingly, when PDSCH 2_2 is scheduled by single-cell scheduling, the value of K1 corresponds to 7.

The base station may determine a K1 set for each cell. For reference, the K1 value configured by the base station for the UE is 4, and the K1 set for each cell may be determined based on the value of 4, the cell index value of the TDRA table, the subcarrier spacing of each cell, and the value of K0.

Referring to FIGS. 16 and 17, PDSCHs that may be scheduled for cell 1 according to the TDRA table correspond to PDSCH 1_1 and PDSCH 2_1. In addition, K1 values corresponding to the PDSCHs are 4 and 6. Therefore, the K1 set of cell 1 may be determined as {4,6}.

Referring to FIGS. 16 and 17, PDSCHs that may be scheduled for cell 2 according to the TDRA table correspond to PDSCH 1_2 and PDSCH 2_2. In addition, K1 values corresponding to the PDSCHs are 4 and 7. Therefore, the K1 set of cell 2 may be determined as {4,7}.

More specifically, a UE may obtain a K1 set for each cell through the following process and equation. For convenience, suppose that $\mu_{PUCCH}$ is a subcarrier spacing configuration of a cell for transmitting a PUCCH, $\mu_{lasPDSCH}$ is a subcarrier spacing configuration of a cell in which the last PDSCH is received, and $\mu_{cell\_i}$ is a subcarrier spacing configuration of cell i. Assume that a value of K1 configured by a base station for a UE is k1. Assume that a PDSCH scheduled for cell i in one row of the TDRA table has K0_i, and K0_last is configured for the last PDSCH. The k1 value is converted into a value corresponding to the PDSCH scheduled for cell i, and may be included in the K1 set of the same cell i.

k1_i=k1+(A−B)

"A" is the index of the reference PUCCH slot determined based on the slot of the last PDSCH. A=n−k1.

"B" is the index of the reference PUCCH slot determined based on the slot of the last PDSCH of cell i.

Therefore, k1_i=n−B.

For example, referring to FIG. 16, the index of the reference PUCCH slot determined based on the slot of the last PDSCH 1_2 is equal to n−4 (A=n−4), and the index of the reference PUCCH slot determined based on the slot of PDSCH 1_1 of cell 1 is equal to n−6 (B=n−6). Therefore, it may be seen that k1_1 of cell 1 is equal to 6 (k1_1=6).

Referring to FIG. 17, the index of the reference PUCCH slot determined based on the slot of the last PDSCH 2_1 is equal to n−4 (A=n−4), and the index of the reference PUCCH slot determined based on the slot of PDSCH 2_1 of cell 1 is equal to n−4 (B=n−4). Therefore, it may be seen that k1_1 of cell 1 is equal to 4 (k1_1=4). Therefore, k1=4 may be determined as the K1 set {4, 6} of cell 1.

For example, referring to FIG. 16, the index of the reference PUCCH slot determined based on the slot of the last PDSCH 1_2 is equal to n−4 (A=n−4), and the index of the reference PUCCH slot determined based on the slot of PDSCH 1_2 of cell 2 is equal to n−4 (B=n−4). Therefore, it may be seen that k1_2 of cell 2 is equal to 4 (k1_2=4). Referring to FIG. 17, the index of the reference PUCCH slot determined based on the slot of the last PDSCH 2_1 is equal to n−4 (A=n−4), and the index of the reference PUCCH slot determined based on the slot of PDSCH 2_2 of cell 2 is equal to n−7 (B=n−7). Therefore, it may be seen that k1_2 of cell 2 is equal to 7 (k1_2=7). Therefore, k1=4 may be determined as the K1 set {4, 7} of cell 1.

The UE may determine SLIVs scheduled for each cell. A set R_i may be generated by collecting SLIVs scheduled for cell i in the TDRA table. Referring to Table 29, SLIVs that may be scheduled for cell 1 are SLIV 1_1 and SLIV 2_1. It may be seen that SLIVs that may be scheduled for cell 2 are SLIV 1_2 and SLIV 2_2. Therefore, it may be seen that R_1={SLIV 1_1, SLIV 2_1} and R_2={SLIV 1_2, SLIV 2_2}.

The UE may generate a Type-1 HARQ-ACK codebook based on the K1 set for each cell and the SLIV set for each cell. For reference, the Type-1 HARQ-ACK codebook is generated based on the K1 set and the SLIV set for each cell in ascending order of cell indices. That is, a Type-1 HARQ-ACK codebook may be generated based on a K1 set of and an SLIV set of a cell having the lowest index, and then the Type-1 HARQ-ACK codebook may be generated based on a K1 set and an SLIV set of a cell having the second lowest index.

[Pseudo-Code 3: (Mult-Cell Multi-PDSCH Scheduling)]

The following processes may be performed for cell index i. Cell index i may be incremented in ascending order to run a pseudo-code below. In case that the following process is performed for all cell indices, pseudo-code 3 is ended. Initialize $M_{A,c}$ as an empty set. Initialize j to 0.

Preparation stage: set R_i is a set composed of pieces of information for single-PDSCH scheduling (SLIVs) by separating multiple pieces of scheduling information (information of a slot to which a PDSCH is mapped (hereinafter referred to as a value of K0), and start symbol and length information (hereinafter referred to as starting and length value (SLIV)) configured in a time domain resource assignment (TDRA) table. In addition, a K1 set of cell i according to the TDRA table is obtained.

Stage 0: Initialize k to 0.

Stage 1: Select a K1 value having the kth largest value from a K1 set of cell i (for example, if k=0, the largest K1 value is selected from the K1 set, and if k=1, the second largest K1 value is selected from the K1 set). The K1 values is referred to as $K_{1,k}$.

Stage 2: If a symbol corresponding to the start symbol and length information (SLIV) belonging to each row of the set R_i in a slot (slot (n–$K_{1,k}$)) corresponding to the value of $K_{1,k}$ overlaps a symbol configured as an uplink symbol in a higher layer or, if the SLIV of slot (n–$K_{1,k}$) does not correspond to HARQ-ACK information transmitted in slot n, the row may be excluded from the set R_i.

Stage 3-1 (in case that a UE has only UE capability capable of receiving a maximum of one unicast PDSCH in one slot): When the determined set R_i is not an empty set, j is added as a new PDSCH reception candidate occasion to a set $M_{A,c}$. Upon receiving one of the PDSCH candidates of set R_i, the UE may place the HARQ-ACK of the PDSCH in the new PDSCH candidate occasion j. Increase j by 1.

Stage 3-2 (in case that a UE has UE capability capable of receiving two or more unicast PDSCHs in one slot): j is added as a new PDSCH reception candidate occasion to the set $M_{A,c}$ for an SLIV that ends first in the determined set R_i and SLIVs overlapping in time with the SLIV. Upon receiving one of the PDSCH candidates having the SLIV, the UE may place the HARQ-ACK of the PDSCH in the new PDSCH candidate occasion j. Increase j by 1. Exclude the SLIVs from set R_i. Stage 3-2 is repeated until set R_i becomes an empty set.

Stage 4: Increase k by 1. If k is less than the cardinality of the K1 set, start again from stage 2, and if k is equal to or greater than the cardinality of the K1 set, HARQ-ACK codebook generation of cell i is ended.

[Pseudo-Code 3 End]

Figure 18:
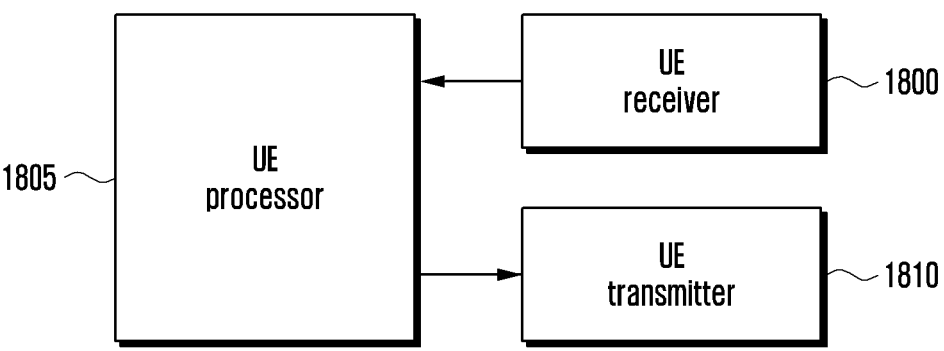
FIG. 18 illustrates the structure of a UE in a wireless communication system according to an embodiment of the disclosure.

FIG. 18 illustrates the structure of a UE in a wireless communication system according to an embodiment of the disclosure.

Referring to FIG. 18, a UE may include a transceiver referring to a UE receiver 1800 and a UE transmitter 1810, a memory (not shown), and a UE processor 1805 (or a UE controller or processor). According to the communication method of the UE described above, the transceiver 1800, 1810, the memory, and the UE processor 1805 of the UE may operate. However, the elements of the UE are not limited to the above-described examples. For example, the UE may include more or fewer elements than the aforementioned elements. In addition, the transceiver, memory, and processor may be implemented in a single chip form.

The transceiver may transmit/receive a signal to/from a base station. Here, the signal may include control information and data. To this end, the transceiver may include an RF transmitter configured to up-convert and amplify the frequency of a transmitted signal, and an RF receiver configured to perform low-noise amplification of a received signal and down-convert the frequency thereof. However, this is only one embodiment of the transceiver, and elements of the transceiver are not limited to the RF transmitter and the RF receiver.

In addition, the transceiver may receive a signal through a wireless channel, output the signal to the processor, and transmit a signal output from the processor through the wireless channel.

The memory may store programs and data required for operation of the UE. In addition, the memory may store control information or data included in signals transmitted and received by the UE. The memory may include a storage medium such as a read only memory (ROM), a random access memory (RAM), a hard disk, a compact disc-ROM (CD-ROM), and a digital versatile disc (DVD), or a combination of storage media. In addition, there may be multiple memories.

In addition, the processor may control a series of processes so that the UE may operate according to the above-described embodiment. For example, the processor may control elements of the UE so as to receive DCI configured by two layers and simultaneously receive multiple PDSCHs. There may be multiple processors, and the processor may perform operation of controlling elements of the UE by executing a program stored in a memory.

Figure 19:
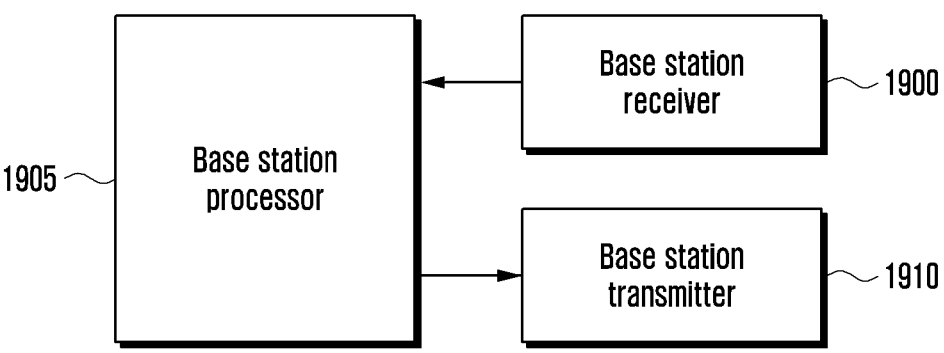
FIG. 19 illustrates the structure of a base station in a wireless communication system according to an embodiment of the disclosure.

FIG. 19 illustrates the structure of a base station in a wireless communication system according to an embodiment of the disclosure.

Referring to FIG. 19, a base station may include a transceiver referring to a base station receiver 1900 and a base station transmitter 1910, a memory (not shown), and a base station processor 1905 (or a base station controller or processor). According to the communication method of the base station described above, the transceiver 1900, 1910, the memory, and the base station processor 1905 of the base station may operate. However, the elements of the base station are not limited to the above-described examples. For example, the base station may include more or fewer elements than the aforementioned elements. In addition, the transceiver, memory, and processor may be implemented in a single chip form.

The transceiver may transmit/receive a signal to/from a UE. Here, the signal may include control information and data. To this end, the transceiver may include an RF transmitter configured to up-convert and amplify the frequency of a transmitted signal, and an RF receiver configured to perform low-noise amplification of a received signal and down-convert the frequency thereof. However, this is only one embodiment of the transceiver, and elements of the transceiver are not limited to the RF transmitter and the RF receiver.

In addition, the transceiver may receive a signal through a wireless channel, output the signal to the processor, and transmit a signal output from the processor through the wireless channel.

The memory may store programs and data required for operation of the base station. In addition, the memory may store control information or data included in signals transmitted and received by the base station. The memory may include a storage medium such as a ROM, a RAM, a hard disk, a CD-ROM, and a DVD, or a combination of storage media. In addition, there may be multiple memories.

The processor may control a series of processes so that the base station operates according to the above-described embodiment of the disclosure. For example, the processor may control each element of the base station so as to configure and transmit two layers of DCI including allocation information for multiple PDSCHs. There may be multiple processors, and the processor may perform operation of controlling elements of the base station by executing a program stored in a memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Moreover, although the above embodiments have been described based on the FDD LTE system, other variants based on the technical idea of the embodiments may also be implemented in other systems such as TDD LTE, 5G, and NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Furthermore, in methods of the disclosure, some or all of the contents of each embodiment may be implemented in combination without departing from the essential spirit and scope of the disclosure.

While the disclosure has been shown and described with reference to various embodiments thereof, it will be understood by those skilled in the art that various changes in form and details may be made herein without departing from the spirit and scope of the disclosure as defined by the appended claims and their equivalents.

What is claimed is:

1. A method performed by a user equipment (UE) in a communication system, the method comprising:
   receiving, from a base station, downlink control information (DCI) scheduling a set of physical downlink shared channels (PDSCHs) in multiple cells;
   identifying a hybrid automatic repeat request-acknowledgement (HARQ-ACK) feedback timing value based on the DCI;
   identifying a reference uplink slot based on a PDSCH ending last among the set of PDSCHs in multiple cells;
   identifying an uplink slot for HARQ-ACK information of the set of PDSCHs in multiple cells based on the HARQ-ACK feedback timing value and the reference uplink slot; and
   transmitting, to the base station, a physical uplink control channel (PUCCH) including the HARQ-ACK information in the uplink slot,
   wherein, in case that two or more PDSCHs among the set of PDSCHs in multiple cells end last, the reference uplink slot is identified based on the lowest subcarrier spacing (SCS) of the two or more PDSCHs.

2. The method of claim 1, wherein the reference uplink slot is identified based on SCSs of the set of PDSCHs in multiple cells.

3. The method of claim 2, wherein the reference uplink slot is identified based on a PDSCH received in a cell having a same SCS with a cell in which the PUCCH is transmitted.

4. The method of claim 2, wherein the reference uplink slot is identified based on a PDSCH received in a cell having a same SCS with a cell in which a physical downlink control channel (PDCCH) is received.

5. A method performed by a base station in a communication system, the method comprising:

transmitting, to a user equipment (UE), downlink control information (DCI) scheduling a set of physical downlink shared channels (PDSCHs) in multiple cells; and receiving, from the UE, a physical uplink control channel (PUCCH) including hybrid automatic repeat request-acknowledgement (HARQ-ACK) information in an uplink slot, wherein the uplink slot for the HARQ-ACK information of the set of PDSCHs in multiple cells is based on a feedback timing value and a reference uplink slot, wherein the feedback timing value is included in the DCI, wherein the reference uplink slot is defined based on a PDSCH ending last among the set of PDSCHs in multiple cells, and wherein, in case that two or more PDSCHs among the set of PDSCHs in multiple cells end last, the reference uplink slot is defined based on the lowest SCS of the two or more PDSCHs.

6. The method of claim 5, wherein the reference uplink slot is defined based on SCSs of the set of PDSCHs in multiple cells.

7. The method of claim 6, wherein the reference uplink slot is defined based on a PDSCH received in a cell having a same SCS with a cell in which the PUCCH is received.

8. The method of claim 6, wherein the reference uplink slot is defined based on a PDSCH received in a cell having a same SCS with a cell in which a physical downlink control channel (PDCCH) is transmitted.

9. A user equipment (UE) in a communication system, the UE comprising:

a transceiver; and a controller configured to:

receive, from a base station, downlink control information (DCI) scheduling a set of physical downlink shared channels (PDSCHs) in multiple cells, identify a hybrid automatic repeat request-acknowledgement (HARQ-ACK) feedback timing value based on the DCI, identify a reference uplink slot based on a PDSCH ending last among the set of PDSCHs in multiple cells, identify an uplink slot for HARQ-ACK information of the set of PDSCHs in multiple cells based on the HARQ-ACK feedback timing value and the reference uplink slot, and transmit, to the base station, a physical uplink control channel (PUCCH) including the HARQ-ACK information in the uplink slot, wherein, in case that two or more PDSCHs among the set of PDSCHs in multiple cells end last, the reference uplink slot is identified based on the lowest subcarrier spacing (SCS) of the two or more PDSCHs.

10. The UE of claim 9, wherein the reference uplink slot is identified based on SCSs of the set of PDSCHs in multiple cells.

11. The UE of claim 10, wherein the reference uplink slot is identified based on a PDSCH received in a cell having a same SCS with a cell in which the PUCCH is transmitted.

12. The UE of claim 10, wherein the reference uplink slot is identified based on a PDSCH received in a cell having a same SCS with a cell in which a physical downlink control channel (PDCCH) is received.

13. A base station in a communication system, the base station comprising:

a transceiver; and a controller configured to:

transmit, to a user equipment (UE), downlink control information (DCI) scheduling a set of physical downlink shared channels (PDSCHs) in multiple cells, and receive, from the UE, a physical uplink control channel (PUCCH) including hybrid automatic repeat request-acknowledgement (HARQ-ACK) information in an uplink slot, wherein the uplink slot for the HARQ-ACK information of the set of PDSCHs in multiple cells is based on a feedback timing value and a reference uplink slot, wherein the feedback timing value is included in the DCI, wherein the reference uplink slot is defined based on a PDSCH ending last among the set of PDSCHs in multiple cells, and wherein, in case that two or more PDSCHs among the set of PDSCHs in multiple cells end last, the reference uplink slot is defined based on the lowest SCS of the two or more PDSCHs.

14. The base station of claim 13, wherein the reference uplink slot is defined based on SCSs of the set of PDSCHs in multiple cells.

15. The base station of claim 14, wherein the reference uplink slot is defined based on a PDSCH received in a cell having a same SCS with a cell in which the PUCCH is received.

16. The base station of claim 14, wherein the reference uplink slot is defined based on a PDSCH received in a cell having a same SCS with a cell in which a physical downlink control channel (PDCCH) is transmitted.

* * * * *